US008714404B2

(12) United States Patent
Raghunathan et al.

(10) Patent No.: US 8,714,404 B2
(45) Date of Patent: May 6, 2014

(54) REFUSE CONTAINER

(75) Inventors: Narayan Raghunathan, Mississauga (CA); Basil Thompson Martheenal, Brampton (CA)

(73) Assignee: Orbis Canada Limited, Toronto (CA)

( * ) Notice: Subject to any disclaimer, the term of this patent is extended or adjusted under 35 U.S.C. 154(b) by 231 days.

(21) Appl. No.: 12/580,116

(22) Filed: Oct. 15, 2009

(65) Prior Publication Data

US 2011/0049152 A1 Mar. 3, 2011

Related U.S. Application Data

(63) Continuation-in-part of application No. 12/217,536, filed on Jul. 7, 2008, now Pat. No. 8,485,381.

(30) Foreign Application Priority Data

Mar. 7, 2008 (CA) ..................................... 2624658
Mar. 7, 2008 (CA) ..................................... 2624663
Jun. 27, 2008 (CA) ..................................... 2636306

(51) Int. Cl.
*B65D 25/32* (2006.01)
*A47J 47/18* (2006.01)
*B65F 1/06* (2006.01)

(52) U.S. Cl.
USPC ............ 220/770; 220/759; 220/762; 220/908

(58) Field of Classification Search
CPC ....... A47J 47/18; A47J 45/065; A47J 45/071; B44D 3/123; B44D 3/122; B65D 23/108; B65D 25/32
USPC .............. 220/212.5, 244, 263, 318, 322, 326, 220/4.22, 831, 833–835, 843, 908, 770, 220/751, 762, 759, 324; 292/194, 200, 292/DIG. 11; 74/551.8
See application file for complete search history.

(56) References Cited

U.S. PATENT DOCUMENTS 3,825,150 A 7/1974 Taylor
4,182,530 A 1/1980 Hodge
4,349,121 A 9/1982 Lafferty
4,753,367 A 6/1988 Miller et al.

(Continued)

FOREIGN PATENT DOCUMENTS

| | | |
|---|---|---|
| CA | ID-125054 | 4/2009 |
| CA | ID-126678 | 4/2009 |
| GB | 2453055 | 3/2009 |

*Primary Examiner* — J. Gregory Pickett
*Assistant Examiner* — Kaushikkkumar Desai
(74) *Attorney, Agent, or Firm* — Ungaretti & Harris LLP

(57) ABSTRACT

A refuse container has a bin defining a cavity and a lid selectively inhibiting access to the cavity. A pair of opposing brackets is located below the lid. The brackets are in laterally spaced relationship such that a space is located between portions of the brackets. Each bracket has opposing inner and outer face portions with an interior gap formed between therebetween. The interior gap is fluidly isolated from the cavity. A rib is located within the interior gaps such that each rib extends inwardly relative to the space between the brackets. A retention bar is coupled to each bracket and spans the space from one bracket to the other bracket wherein opposing ends of the retention bar extend into the interior gap of each bracket, and an exposed portion of the retention bar spans the space between the brackets. The end portions of the retention bar abut the ribs.

11 Claims, 76 Drawing Sheets

(56) References Cited

U.S. PATENT DOCUMENTS

| | | | | |
|---|---|---|---|---|
| 5,160,063 | A | 11/1992 | Bailey | |
| 5,184,836 | A | 2/1993 | Andrews, Jr. | |
| D347,095 | S | 5/1994 | Apps et al. | |
| 5,377,858 | A | 1/1995 | Morris, Sr. | |
| D355,741 | S | 2/1995 | Craft et al. | |
| 5,445,397 | A | 8/1995 | Evans | |
| 5,555,996 | A | 9/1996 | Lang-Ree et al. | |
| 5,585,419 | A * | 12/1996 | Prout et al. | 523/221 |
| D388,577 | S | 12/1997 | Rehrig et al. | |
| D398,120 | S | 9/1998 | Rehrig et al. | |
| 5,881,901 | A | 3/1999 | Hampton | |
| 5,899,468 | A | 5/1999 | Apps et al. | |
| 5,947,295 | A | 9/1999 | Lutin | |
| D445,228 | S | 7/2001 | Apps et al. | |
| D465,348 | S | 11/2002 | Lucatello | |
| D491,328 | S | 6/2004 | Aiken et al. | |
| 6,918,508 | B2 | 7/2005 | Hwang | |
| D515,313 | S | 2/2006 | Uffner et al. | |
| 7,017,773 | B2 | 3/2006 | Gruber et al. | |
| 7,048,346 | B2 | 5/2006 | Saravis | |
| 7,114,631 | B2 | 10/2006 | Aiken | |
| 7,121,564 | B2 | 10/2006 | Hassell | |
| D532,173 | S | 11/2006 | Aiken et al. | |
| D535,448 | S | 1/2007 | Kilduff et al. | |
| 7,287,665 | B2 | 10/2007 | Meissen et al. | |
| D600,943 | S | 9/2009 | Austin et al. | |
| D600,944 | S | 9/2009 | McConnell et al. | |
| D624,723 | S | 9/2010 | Raghunathan et al. | |
| D654,723 | S | 2/2012 | Gormezano | |
| D656,730 | S | 4/2012 | Son | |
| 2004/0074913 | A1 * | 4/2004 | McDade et al. | 220/908.1 |
| 2005/0029763 | A1 * | 2/2005 | Hassell | 280/47.26 |
| 2006/0065657 | A1 | 3/2006 | Wong | |
| 2006/0076260 | A1 | 4/2006 | Luburic | |
| 2006/0236612 | A1 | 10/2006 | Sheng et al. | |

* cited by examiner

REFUSE CONTAINER

CROSS-REFERENCE TO RELATED APPLICATIONS

This application is a continuation-in-part of application Ser. No. 12/217,536 filed Jul. 7, 2008 which claimed priority from Canadian Patent Application Nos. 2,636,306, 2,624,663, 2,624,658, filed on Jun. 27, 2008, Mar. 7, 2008, and Mar. 7, 2008, respectively. All these applications are incorporated by reference as if fully set forth herein.

FEDERALLY SPONSORED RESEARCH OR DEVELOPMENT

N/A

TECHNICAL FIELD

The present invention relates to containers for storing refuse, and particularly to containers configured for facilitating easier filling and emptying.

BACKGROUND OF THE INVENTION

In modern, urban communities, refuse containers are used to store accumulated household refuse until such household refuse can be collected by garbage trucks or the like. Typically, such refuse containers includes a lid for concealing the household refuse collected therein, as well as to prevent wild animals from accessing this household refuse. With some containers, the lid is integrally mounted to a storage bin which contains the collected household refuse. Such containers, however, are awkward to use. For example, available latching mechanisms continue to be prone to opening by wild animals.

SUMMARY OF THE INVENTION

A first aspect of the invention is directed to a refuse container comprising a container assembly. The container assembly comprises a bin defining a cavity, a lid, a pair of brackets, a pair of receivers, and a retention bar. The lid is rotatably coupled to the bin at a first end of the lid, and is movable relative to the bin between an open position providing access to the cavity and a closed position inhibiting access to the cavity. The pair of opposing brackets are integrally formed with the bin and located below a second end of the lid opposite the first end of the lid and between uppermost and lowermost extremes of the container assembly. Each bracket extends outwardly from an external surface of the bin and has opposing inner face portions in laterally spaced relationship such that a space is located between the inner face portions of the brackets. The pair of receivers are located at least partially along a corresponding inner face portion of each bracket and spaced outwardly from the bin relative to the exterior surface of the bin. Each receiver comprises an aperture in a portion of the corresponding inner face portion and extends inwardly into a body portion of the bracket located between the inner face and an outer face of the bracket such that an interior gap is formed within the body portion of each bracket between the inner face and the outer face of each bracket. Each of the pair of ribs is located within a corresponding bracket between the inner face portion and the outer face portion of the corresponding bracket and integrally formed with the outer face portion of the corresponding bracket such that each rib extends inwardly relative to the space between the brackets. The retention bar is fixedly coupled to the container assembly by the opposing brackets and completely external to the cavity. The retention bar has opposing ends located within the receivers such that the retention bar spans a length of the space between the inner face portions of the brackets. Each end of the retention bar passes through a corresponding aperture and abuts a corresponding rib of the pair of ribs located within the corresponding bracket. The retention bar is spaced outwardly from the external surface of the bin from which each bracket extends, is substantially horizontally aligned, is in complete fluid isolation from the cavity, is configured to be hooked by a lifting mechanism for automated emptying of the cavity, is rotational within the receivers.

This aspect may include one or more of the following features alone or in combination. The refuse container may further comprise a locking mechanism for maintaining the lid in the closed position and for providing a visual signal when the lid is in an unlocked condition. The locking mechanism may comprise a detent acting between the lid and the bin and a latch comprising a handle wherein the latch is moveable between a locked lid position and the unlocked lid position. The latch may be retained in the substantially upright unlocked position to generate a first visual signal indicating to a refuse collector that the refuse container is laden and a second visual indicating the laden container may be automatically emptied by a refuse collection vehicle having automated refuse container handling equipment without further user interaction with the refuse container. The latch may be configured to move from the locked lid position to the unlocked lid position in response to application of an unlocking force to the handle. When the latch is disposed in the unlocked lid position and the lid is disposed in the closed position, the lid may be configured to move from the closed position to the open position in response to an application of a lid-opening force to the handle. The unlocking force may include a horizontal component and a vertical component, and the lid-opening force may include a horizontal component and a vertical component. The direction of the horizontal component of the lid-opening force may be substantially opposite to the direction of the horizontal component of the unlocking force. The retention bar may be produced from a material dissimilar to a material from which each bracket is formed.

Another aspect of the present invention is directed to a refuse container comprising a container assembly. The container assembly comprises a bin defining a cavity, a lid, a pair of opposing brackets, and a retention bar. The lid is rotatably coupled to the bin and movable relative to the bin between an open position providing access to the cavity and a closed position inhibiting access to the cavity. The pair of opposing brackets are located below the lid between uppermost and lowermost extremes of the container assembly. Each bracket extends outwardly relative to an external surface of the bin and in laterally spaced relationship such that a space is located between portions of the brackets. A retention bar is coupled to each bracket and spans the space from one bracket to the other bracket. The retention bar is spaced outwardly from the external surface of the bin from which each bracket extends, an entire length of the retention bar is fluidly isolated from the cavity.

This aspect of the invention may further include the following features alone or in any combination. The lid may be rotatably coupled to the bin at a first end, and the brackets may be then located below a second end of the lid opposite the first end of the lid. The retention bar may be produced from a material dissimilar to a material from which each bracket is formed. The brackets may be integrally formed with the bin. The refuse container may further comprise a pair of receivers. Each receiver may be with a corresponding bracket wherein opposing portions of the retention bar are received by the receivers to retain the retention bar to the refuse container. The refuse container may still further comprise a pair of ribs. Each rib may be associated with a corresponding receiver and may be located within a corresponding bracket between an inner face portion and an outer face portion of the corresponding bracket and integrally formed with the outer face portion of the corresponding bracket such that each rib extends inwardly relative to the space between the brackets. Each receiver may be located at least partially along a corresponding face portion of each bracket and spaced outwardly from the bin relative to the exterior surface of the bin. Each receiver may comprise an aperture in a portion of the corresponding face portion and extending inwardly into a body portion of the bracket located between the corresponding inner face and a corresponding outer face of the bracket such that an interior gap is formed within the body portion of each bracket between the inner face and the outer face of each bracket and opposing end portions of the retention bar fit within the apertures such that each opposing end portion abuts a corresponding rib within the interior gap of the associated bracket. The retention bar may be fixedly coupled to the container assembly by the opposing brackets and completely external to the cavity. The retention bar may be substantially horizontally aligned. The retention bar may be rotational within the receivers.

Another aspect of the invention is also directed to a refuse container. The refuse container comprises a container assembly which comprises a bin, a lid, a pair of receivers, and a retention bar. The bin has an external surface and an opposing interior surface defining a cavity and in fluid communication therewith. The lid is rotatably coupled to the bin and is movable relative to the bin between an open position providing access to the cavity and a closed position inhibiting access to the cavity. The pair of receivers is located below the lid between uppermost and lowermost extremes of the container assembly. Each receiver is positioned outwardly relative to the external surface of the bin and in laterally spaced relationship such that a space is located between portions of the receivers. The retention bar is in complete fluid isolation from the cavity and spans the space between the portions of the pair of receivers. The retention bar has opposing portions each engaged with a corresponding receiver to couple the retention bar to the refuse container.

This aspect of the invention may further comprise the following features alone or in any combination. A first aperture may be located on one of the pair of receivers, and a second aperture may be located on the other of the pair of receivers. The first and second apertures may be oriented towards one another such that opposing end portions of the retention bar pass into corresponding apertures. A pair of opposing brackets may be integrally formed with the bin and located between uppermost and lowermost extremes of the container assembly. Each bracket may extend outwardly from an external surface of the bin and have opposing inner face portions in laterally spaced relationship such that a space is located between the face portions of the brackets. Each of the pair of receivers may be located at least partially along a corresponding face portion of each bracket. Each aperture may be located in a portion of the corresponding face portion and extend inwardly into a body portion of the bracket located between the corresponding inner face portion and a corresponding outer face portion of each bracket such that an interior gap is formed within the body portion of each bracket between the inner face and the outer face of each bracket. The interior gaps of each corresponding bracket may be in complete fluid isolation from the cavity. The refuse container may comprise a pair of ribs. Each rib may be located within a corresponding bracket between the inner face portion and the outer face portion of the corresponding bracket and integrally formed with the outer face portion of the corresponding bracket such that each rib extends inwardly relative to the space between the brackets. Each end of the retention bar may pass through the corresponding aperture and abut a corresponding rib of the pair of ribs located within the corresponding bracket. The retention bar may be substantially horizontally aligned. The retention bar may be configured to be hooked by a lifting mechanism for automated emptying of the cavity. The retention bar may be rotational within the receivers.

Another aspect of the invention is also directed to a refuse container comprising a container assembly. The container assembly comprises a bin, a lid, and a retention bar. The bin has an external surface and an opposing interior surface defining a cavity and in fluid communication therewith. The lid is rotatably coupled to the bin and movable relative to the bin between an open position providing access to the cavity and a closed position inhibiting access to the cavity. The retention bar is coupled to the bin and spaced outwardly relative to the external surface of the bin. The retention bar is located approximately at a midpoint between uppermost and lowermost extremes of the container assembly and in complete fluid isolation from the cavity.

This aspect of the invention may further comprise one or more of the following features alone or in combination. The pair of receivers is located below the lid between uppermost and lowermost extremes of the container assembly. Each receiver is positioned outwardly relative to the external surface of the bin and in laterally spaced relationship such that a space is located between portions of the receivers. The retention bar is in complete fluid isolation from the cavity and spans the space between the portions of the pair of receivers. The retention bar has opposing portions each engaged with a corresponding receiver to couple the retention bar to the refuse container.

This aspect of the invention may further comprise the following features alone or in any combination. A pair of receivers may be located below the lid between uppermost and lowermost extremes of the container assembly. Each receiver may be positioned outwardly relative to the external surface of the bin and in laterally spaced relationship such that a space is located between portions of the receivers. The retention bar may be coupled to the bin through cooperation with the receivers, and may span the space between the portions of the pair of receivers. The retention bar may have opposing portions each engaged with a corresponding receiver to couple the retention bar to the refuse container. A first aperture may be located on one of the pair of receivers, and a second aperture may be located on the other of the pair of receivers. The first and second apertures may be oriented towards one another such that opposing end portions of the retention bar pass into corresponding apertures. A pair of opposing brackets may be integrally formed with the bin and located between uppermost and lowermost extremes of the container assembly. Each bracket may extend outwardly from the external surface of the bin and have opposing inner face portions in laterally spaced relationship such that a space is located between the face portions of the brackets. Each of the pair of receivers may be located at least partially along a corresponding face portion of each bracket. Each aperture may be located in a portion of the corresponding face portion and extend inwardly into a body portion of the bracket located between the corresponding inner face portion and a corresponding outer face portion of each bracket such that an interior gap is formed within the body portion of each bracket between the inner face and the outer face of each bracket. The interior gaps of each corresponding bracket may be in complete fluid isolation from the cavity. The refuse container may comprise a pair of ribs. Each rib may be located within a corresponding bracket between the inner face portion and the outer face portion of the corresponding bracket and integrally formed with the outer face portion of the corresponding bracket such that each rib extends inwardly relative to the space between the brackets. Each end of the retention bar may pass through the corresponding aperture and abut a corresponding rib of the pair of ribs located within the corresponding bracket. The retention bar may be substantially horizontally aligned. The retention bar may be configured to be hooked by a lifting mechanism for automated emptying of the cavity. The retention bar may be rotational within the receivers.

BRIEF DESCRIPTION OF THE DRAWINGS

The invention will be better understood when consideration is given to the following detailed description thereof. Such description makes reference the annexed drawings wherein.

DETAILED DESCRIPTION OF PREFERRED EMBODIMENTS

Figure 1:
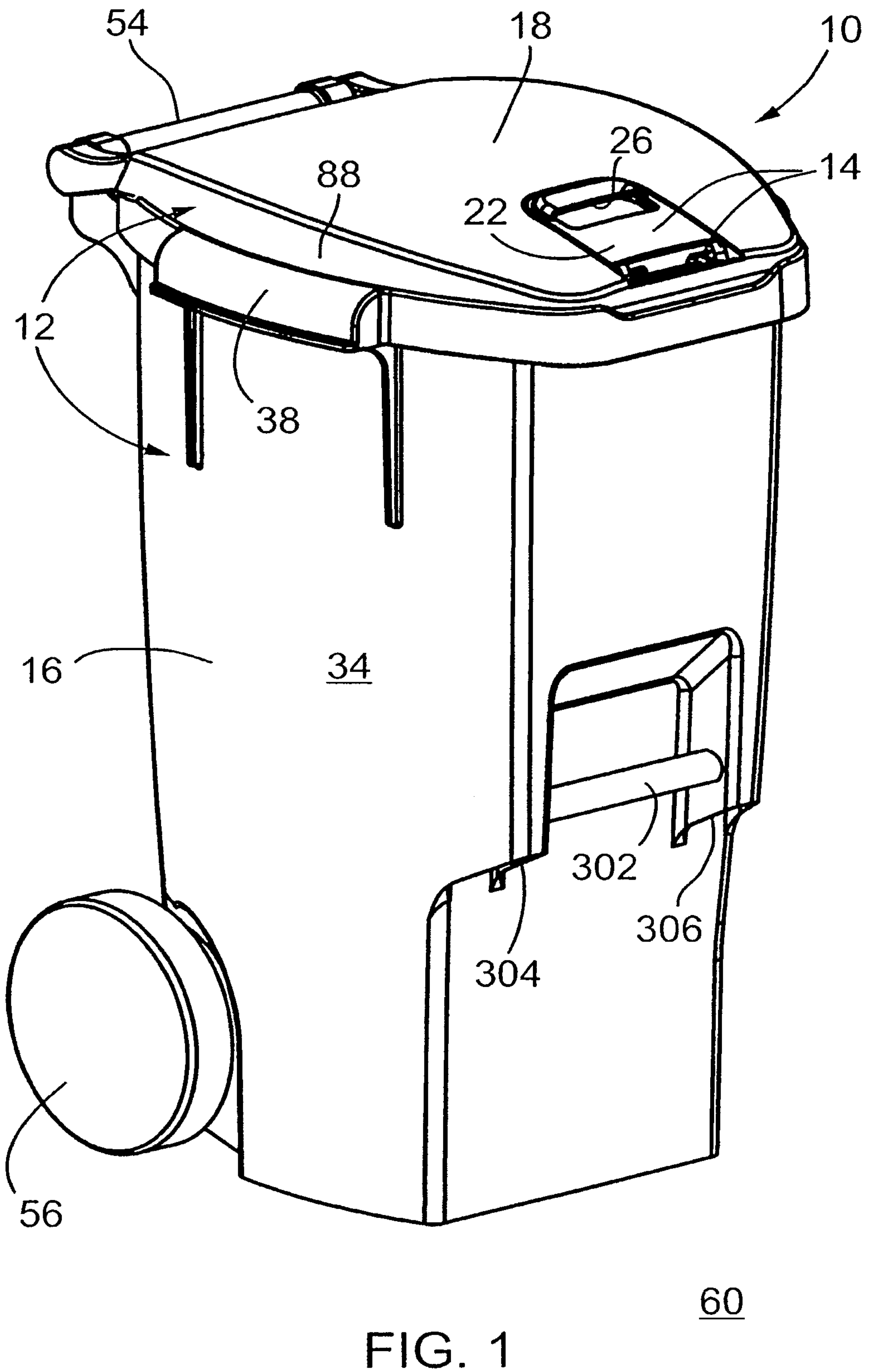
FIG. 1 is a front perspective view of a first embodiment of a refuse container.
Figure 2:
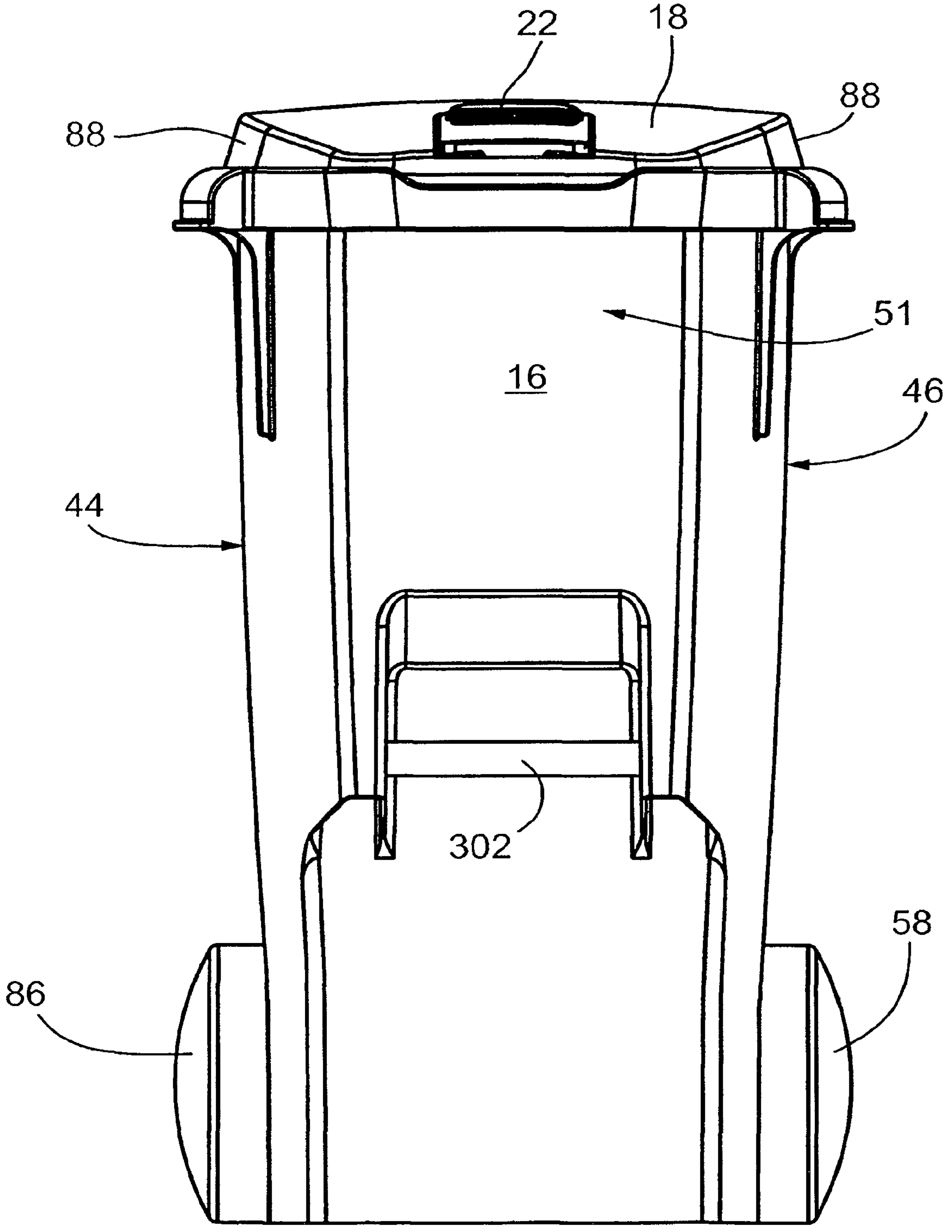
FIG. 2 is a front elevation view of the refuse container in FIG. 1.
Figure 3:
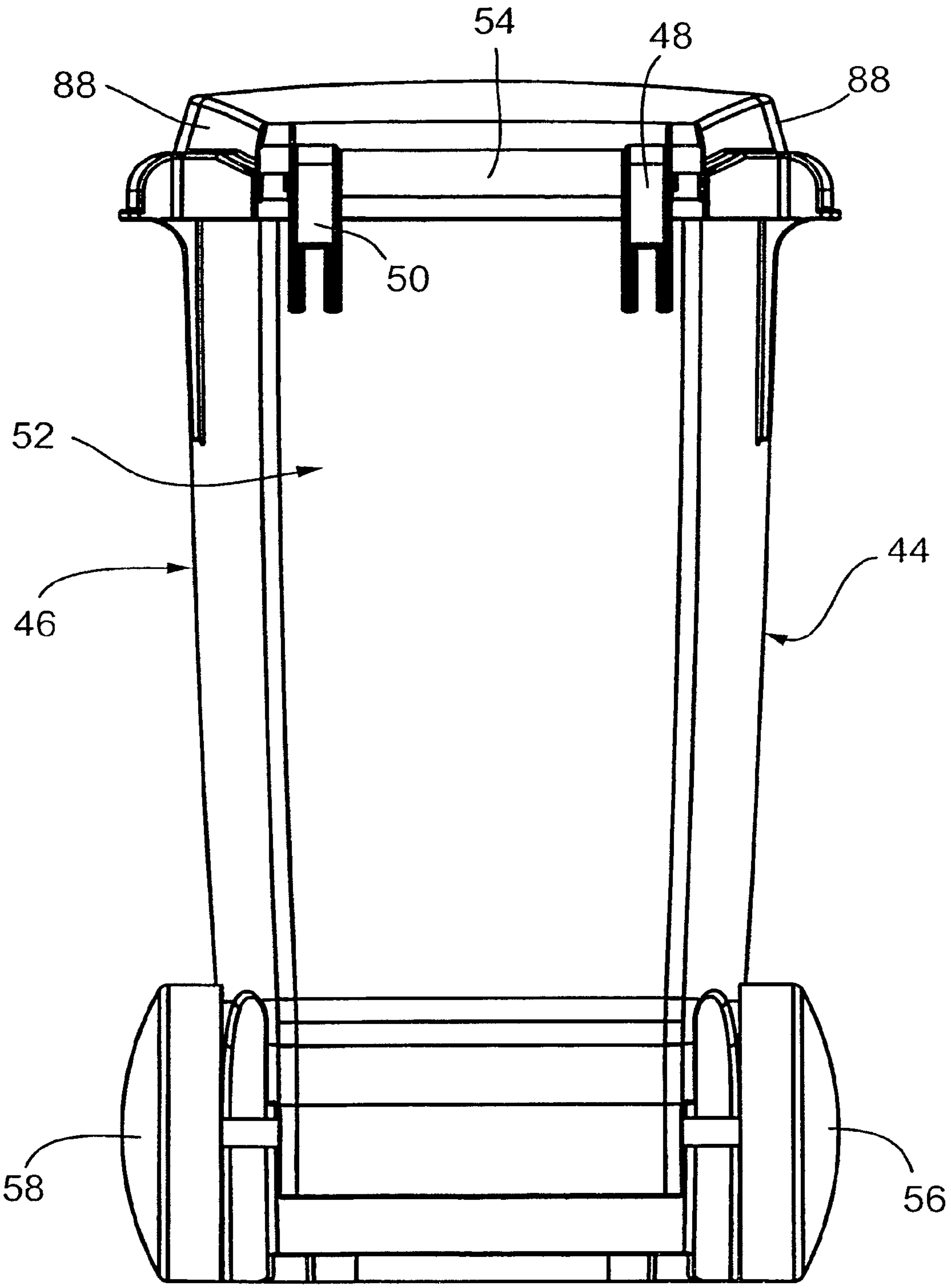
FIG. 3 is a rear elevation view of the refuse container in FIG. 1.
Figure 4:
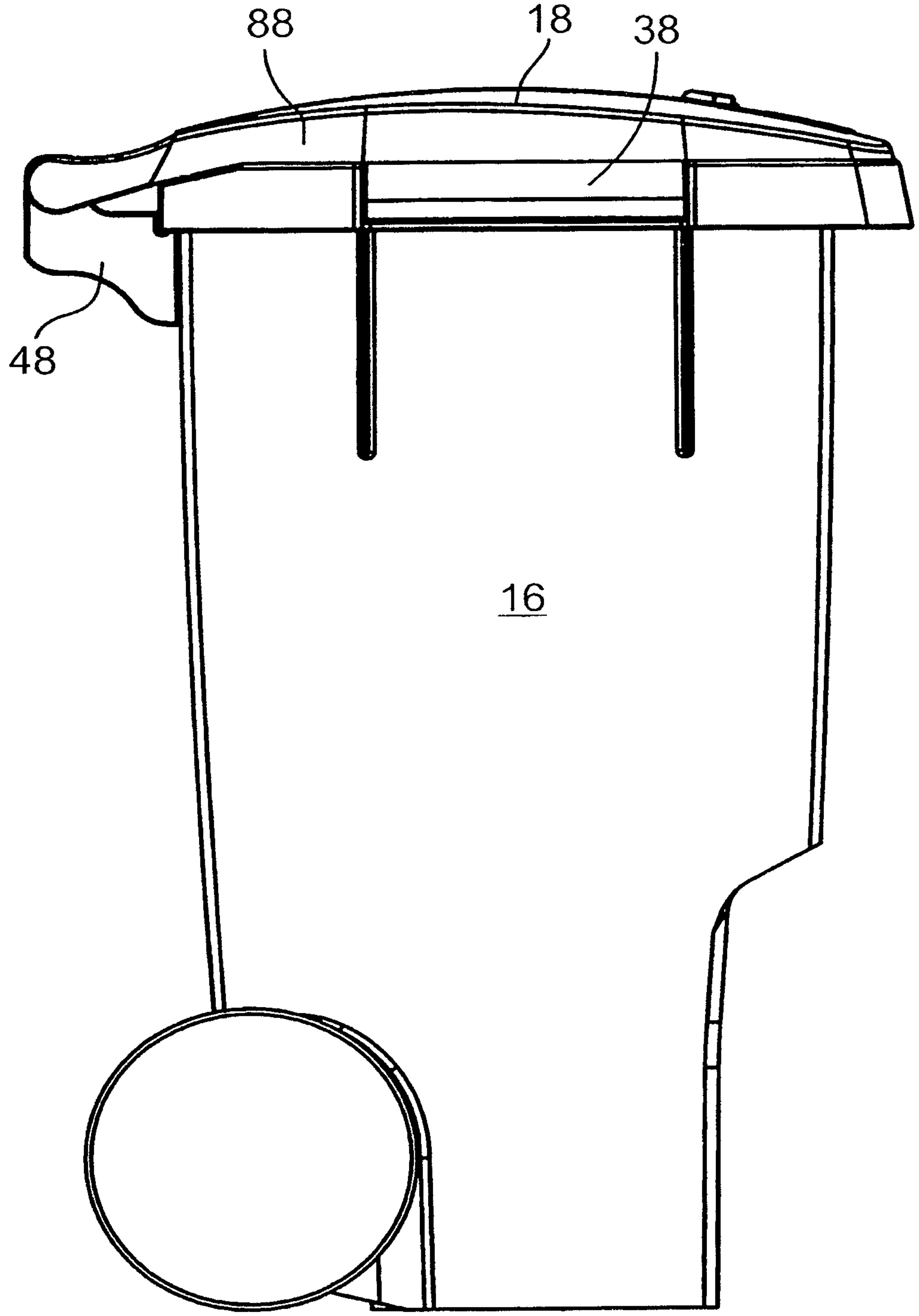
FIG. 4 is a side elevation view of one side of the refuse container in FIG. 1.
Figure 5:
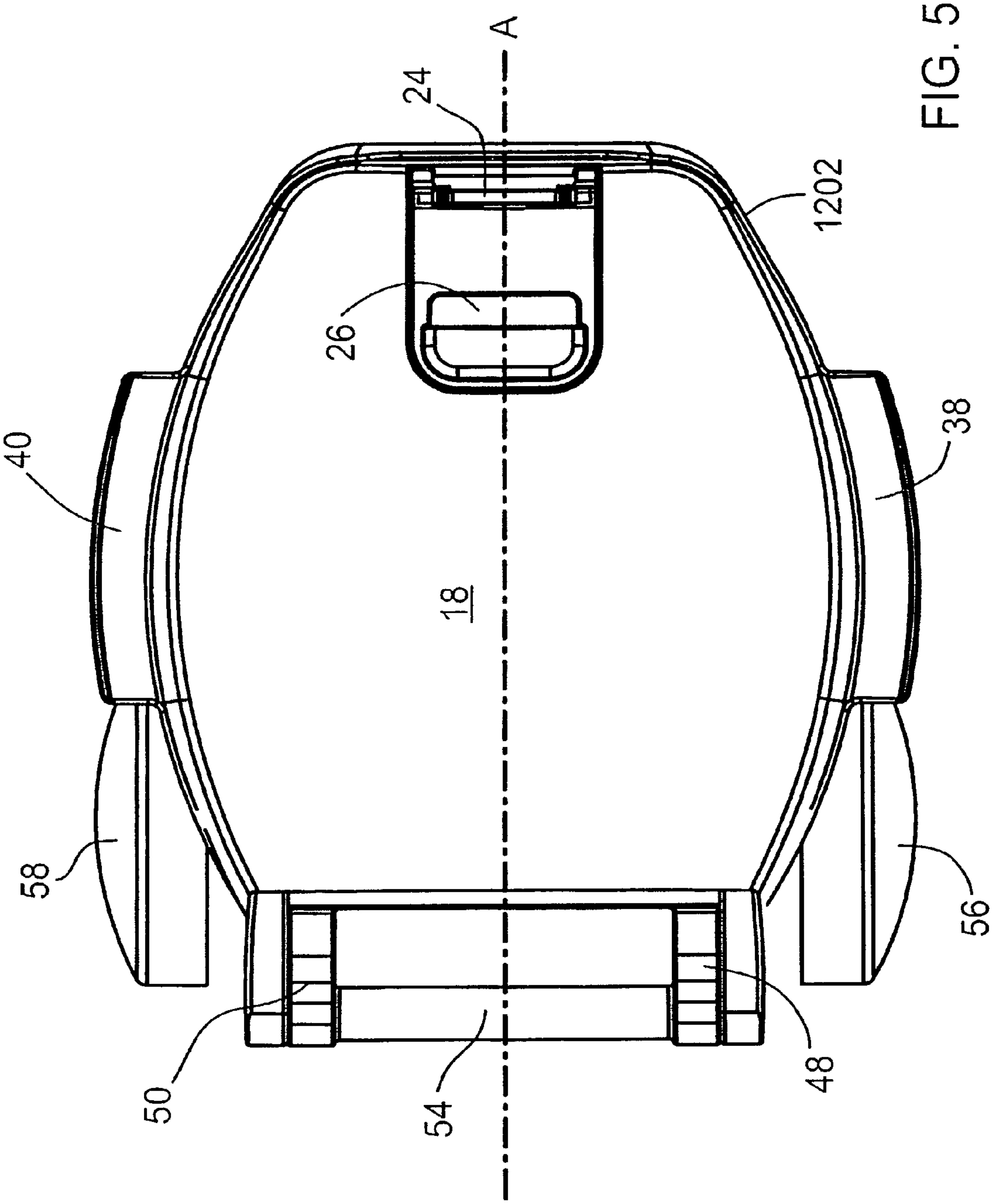
FIG. 5 is a top plan view of the refuse container in FIG. 1.
Figure 6:
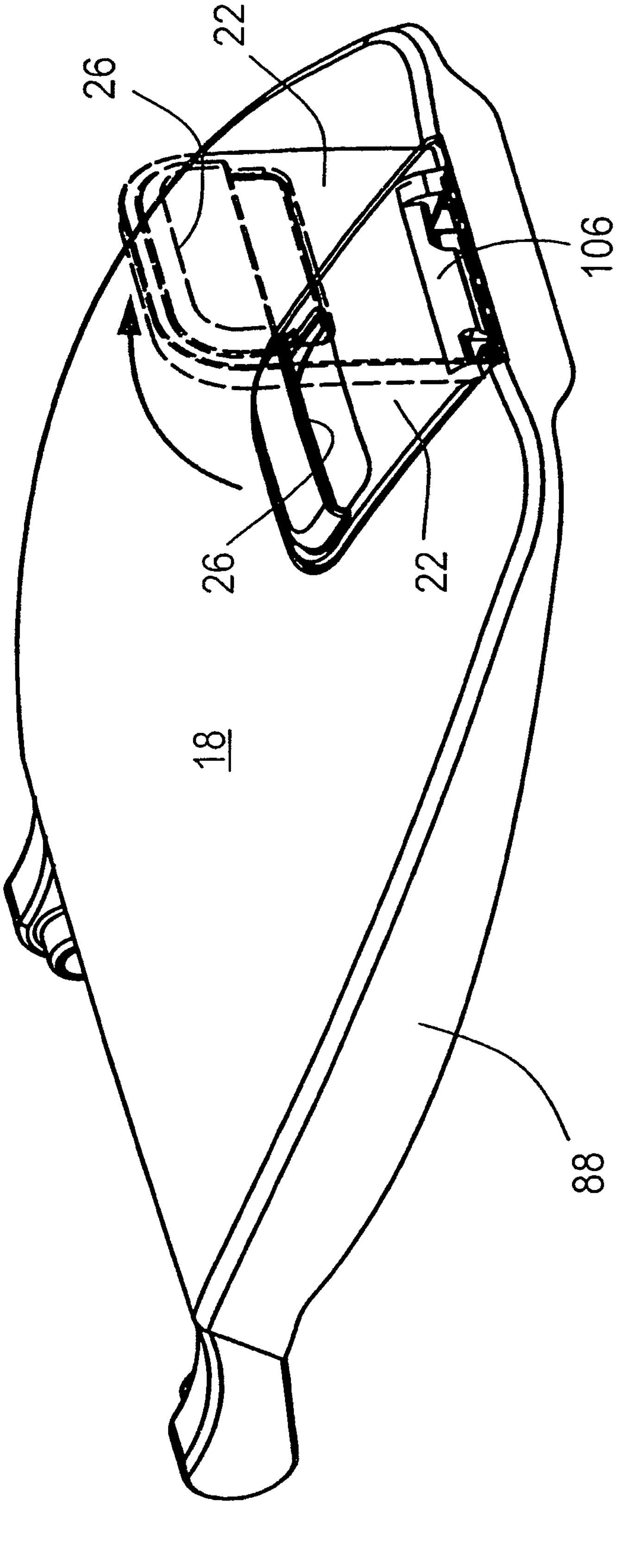
FIG. 6 is a top perspective view of the lid and the latch of the container in FIG. 1, illustrating the latch in the locked lid position and in the unlocked indication position.
Figure 32:
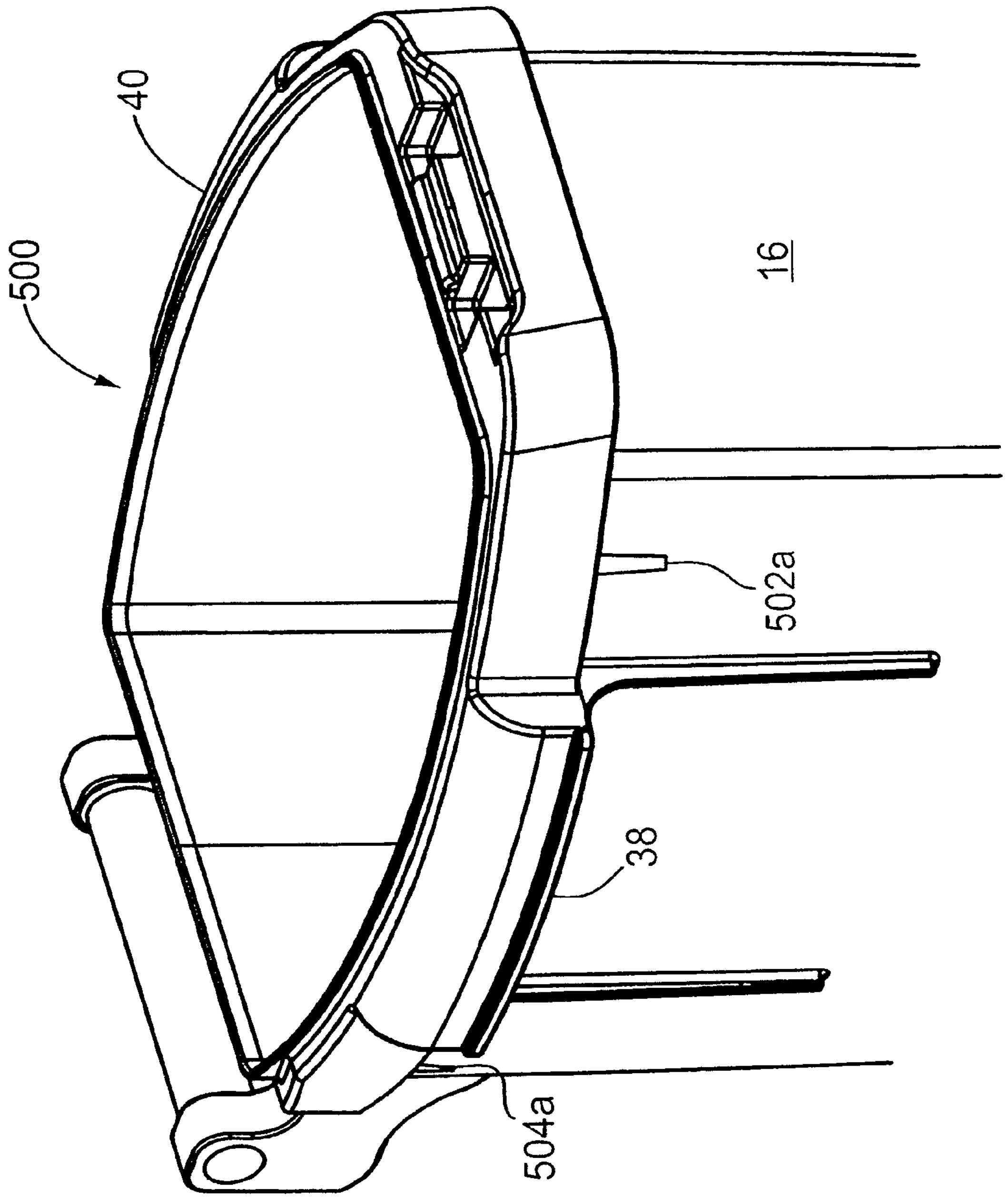
FIG. 32 is a top perspective view of one side of a second embodiment of a refuse container, taken from the front.
Figure 33:
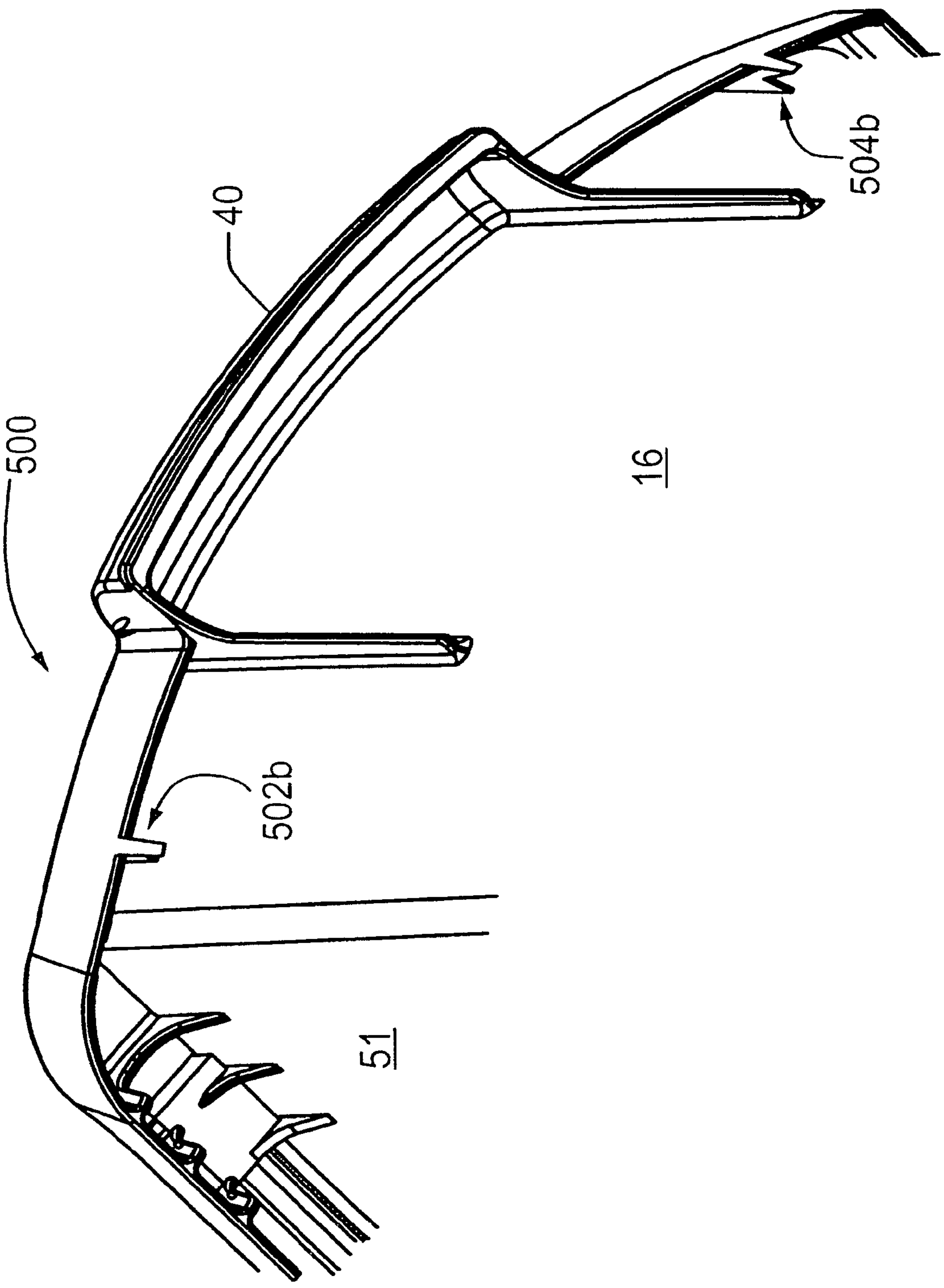
FIG. 33 is a bottom perspective view of the other side of the refuse container of FIG. 32, taken from the front.
Figure 34:
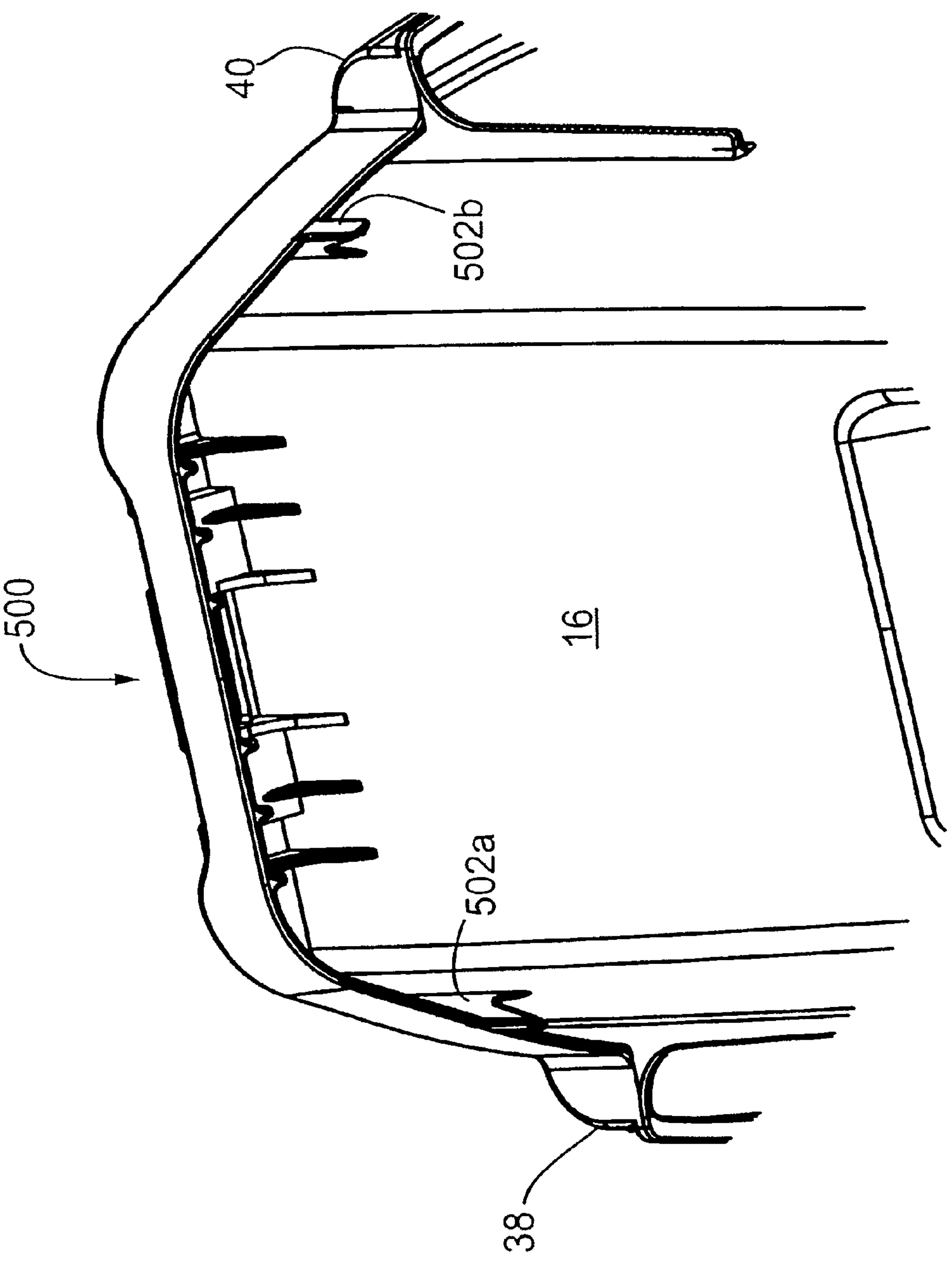
FIG. 34 is a bottom perspective view of the refuse container of FIG. 32, taken from the front and from a perspective where the leading edges of each one of the sides of the container is visible.
Figure 35:
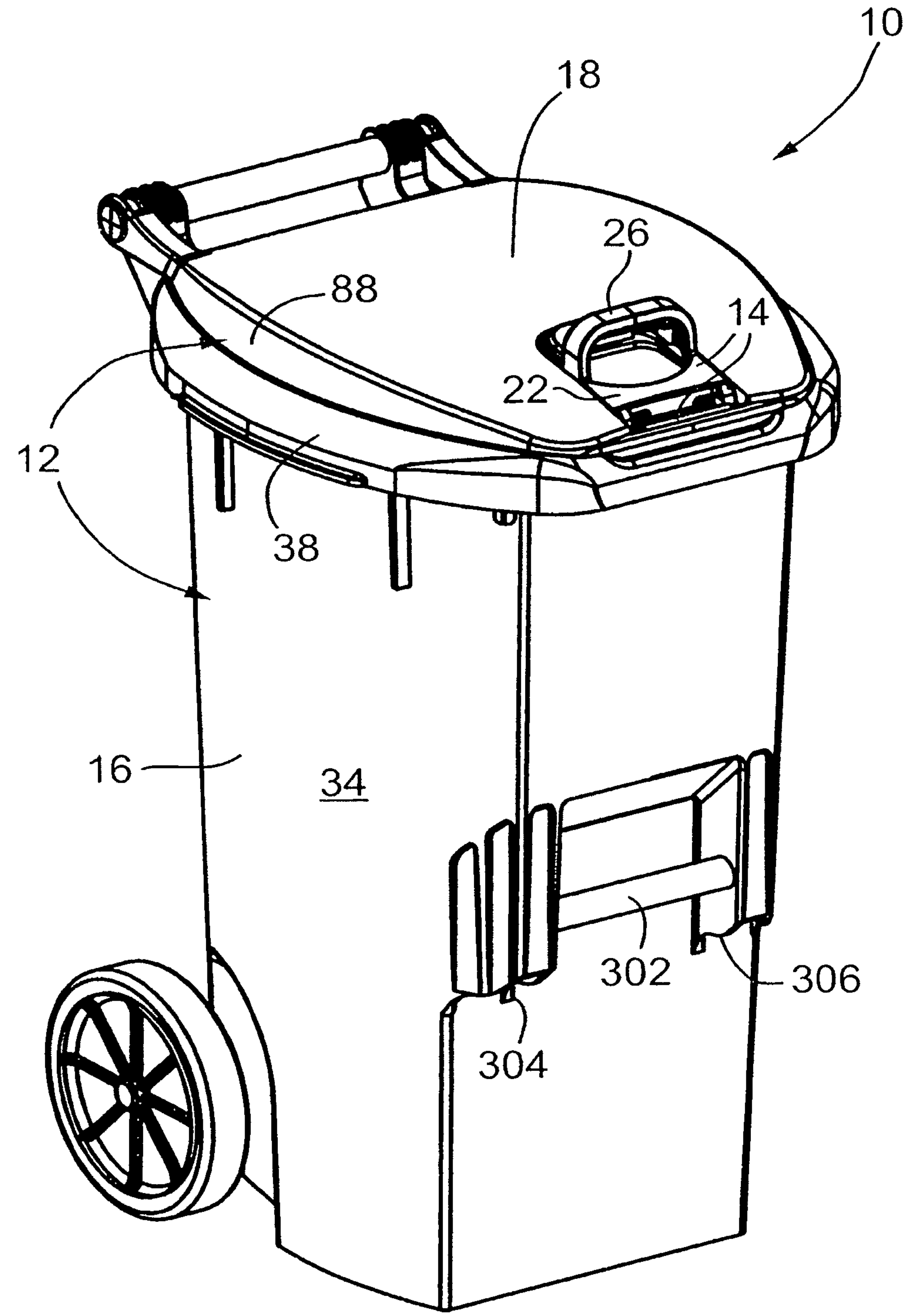
FIG. 35 is a front perspective view of a third embodiment of a refuse container.
Figure 36:
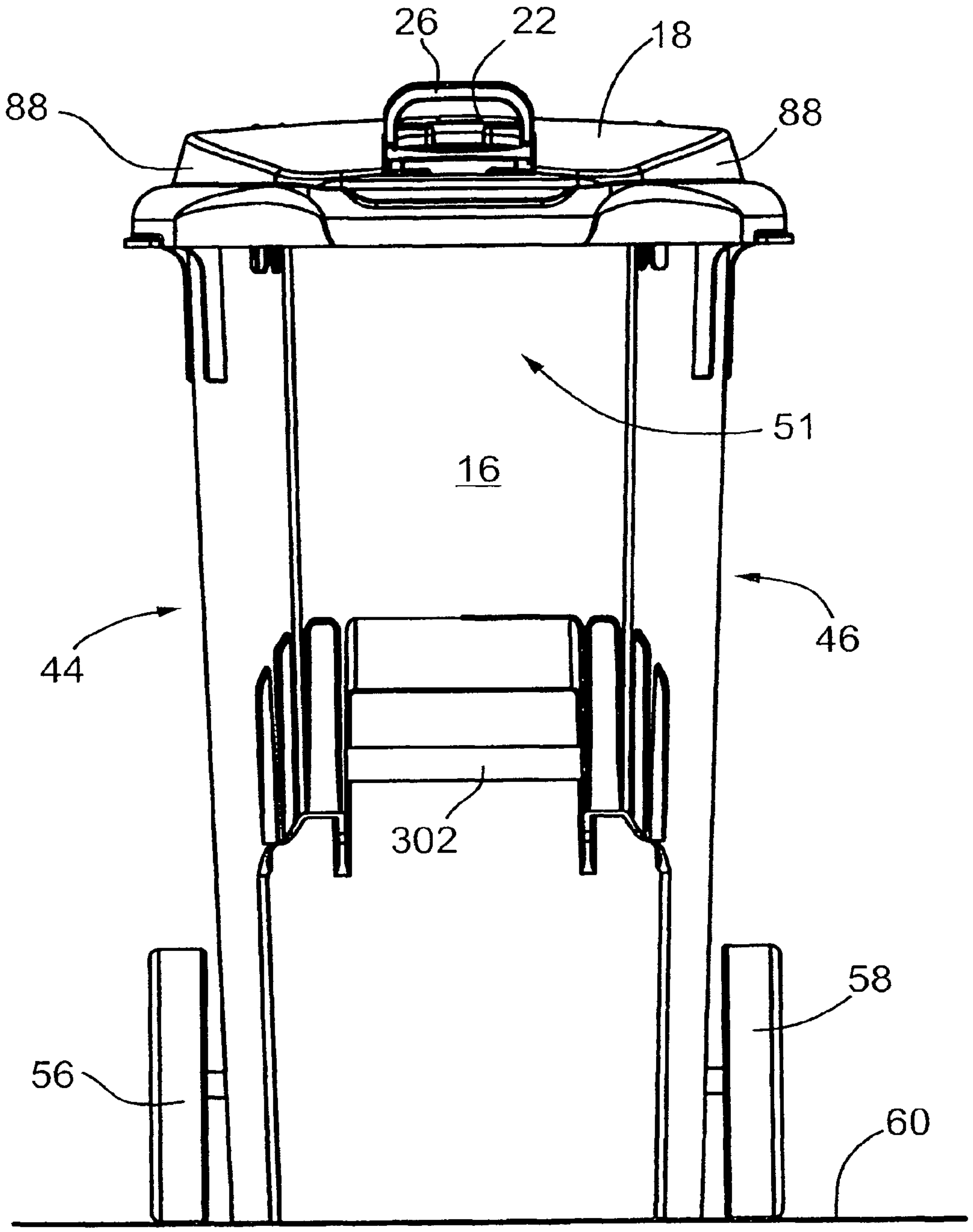
FIG. 36 is a front elevation view of the refuse container in FIG. 35.
Figure 37:
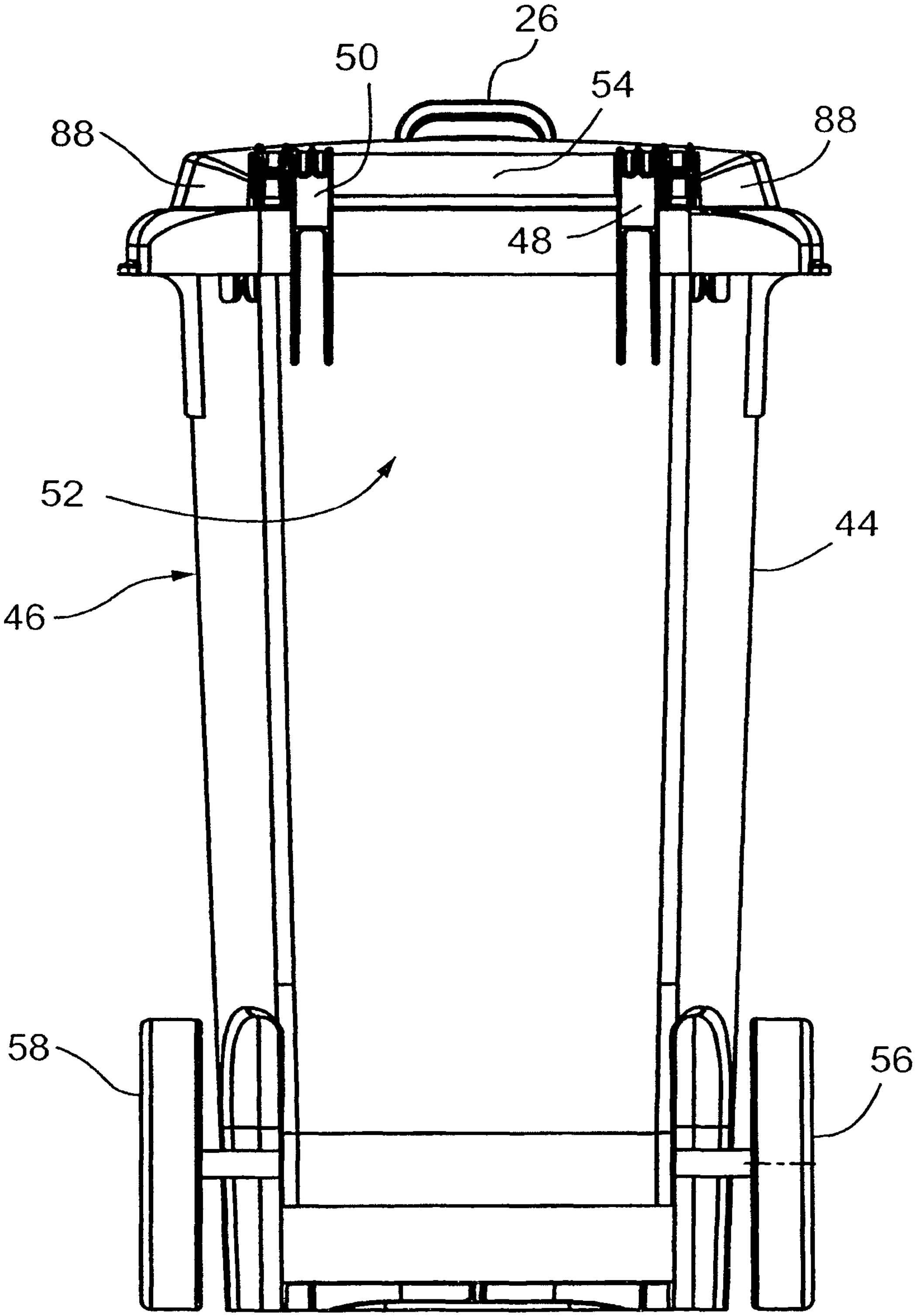
FIG. 37 is a rear elevation view of the refuse container in FIG. 35.
Figure 38:
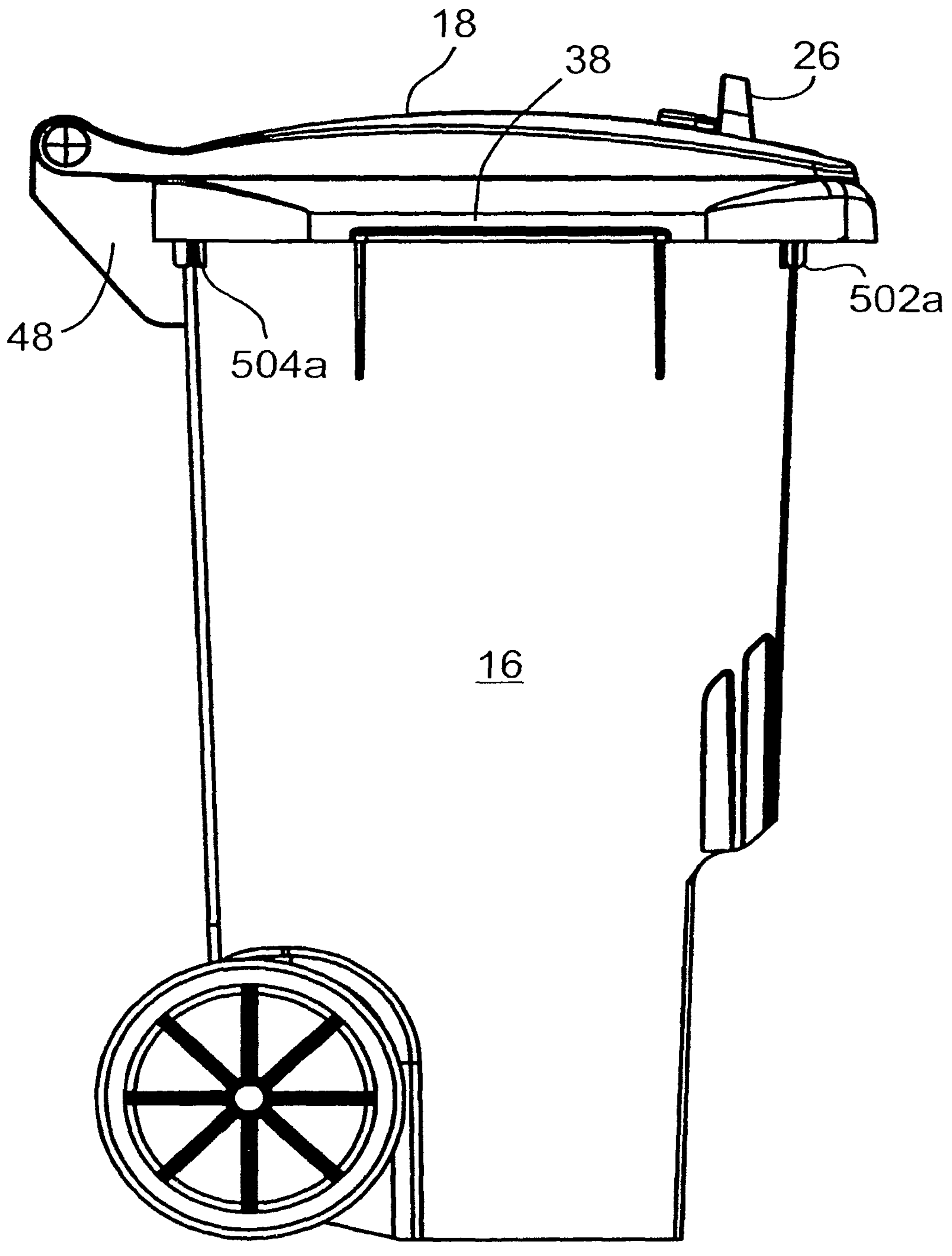
FIG. 38 is a side elevation view of one side of the refuse container in FIG. 35.
Figure 39:
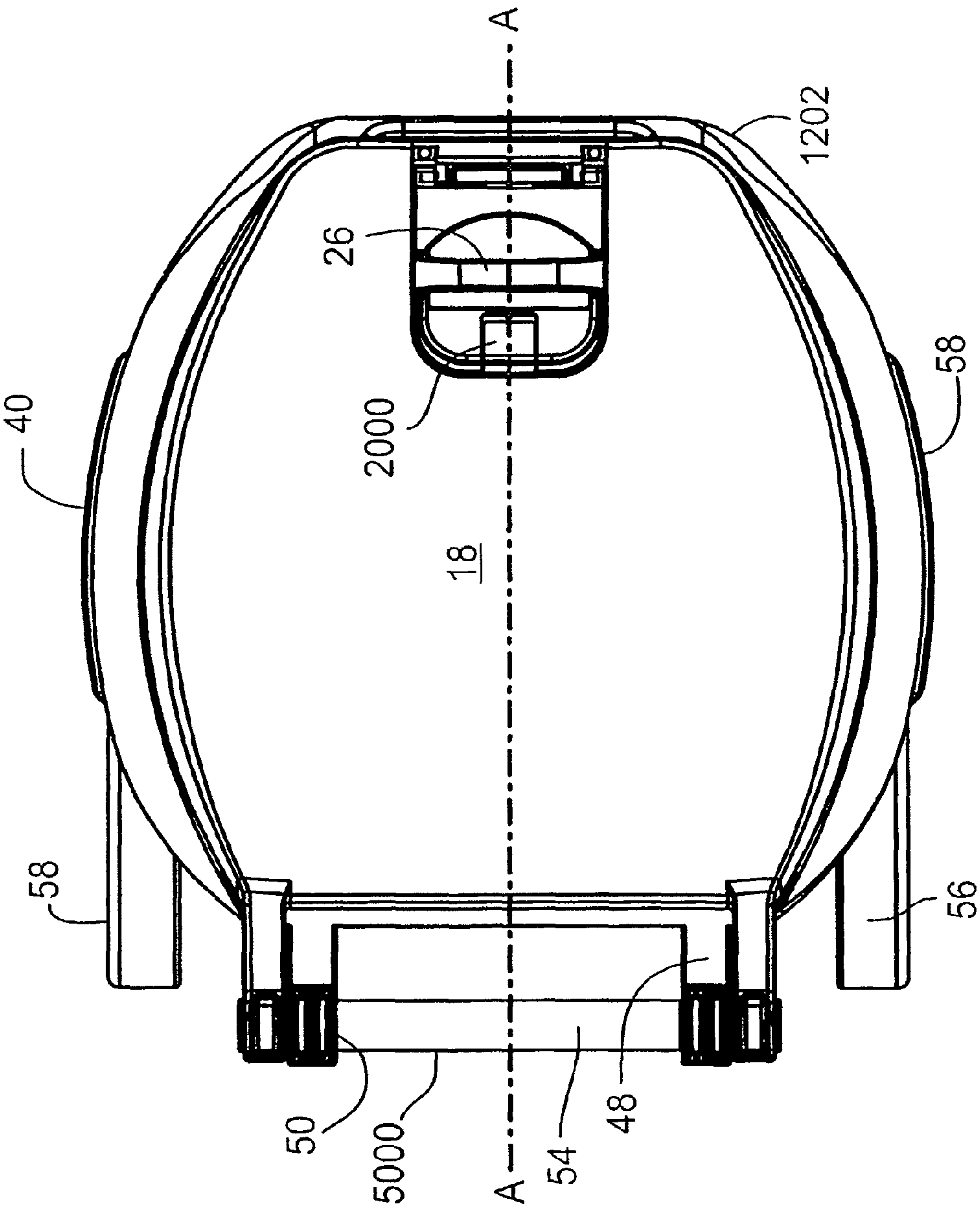
FIG. 39 is a top plan view of the refuse container in FIG. 35.
Figure 40:
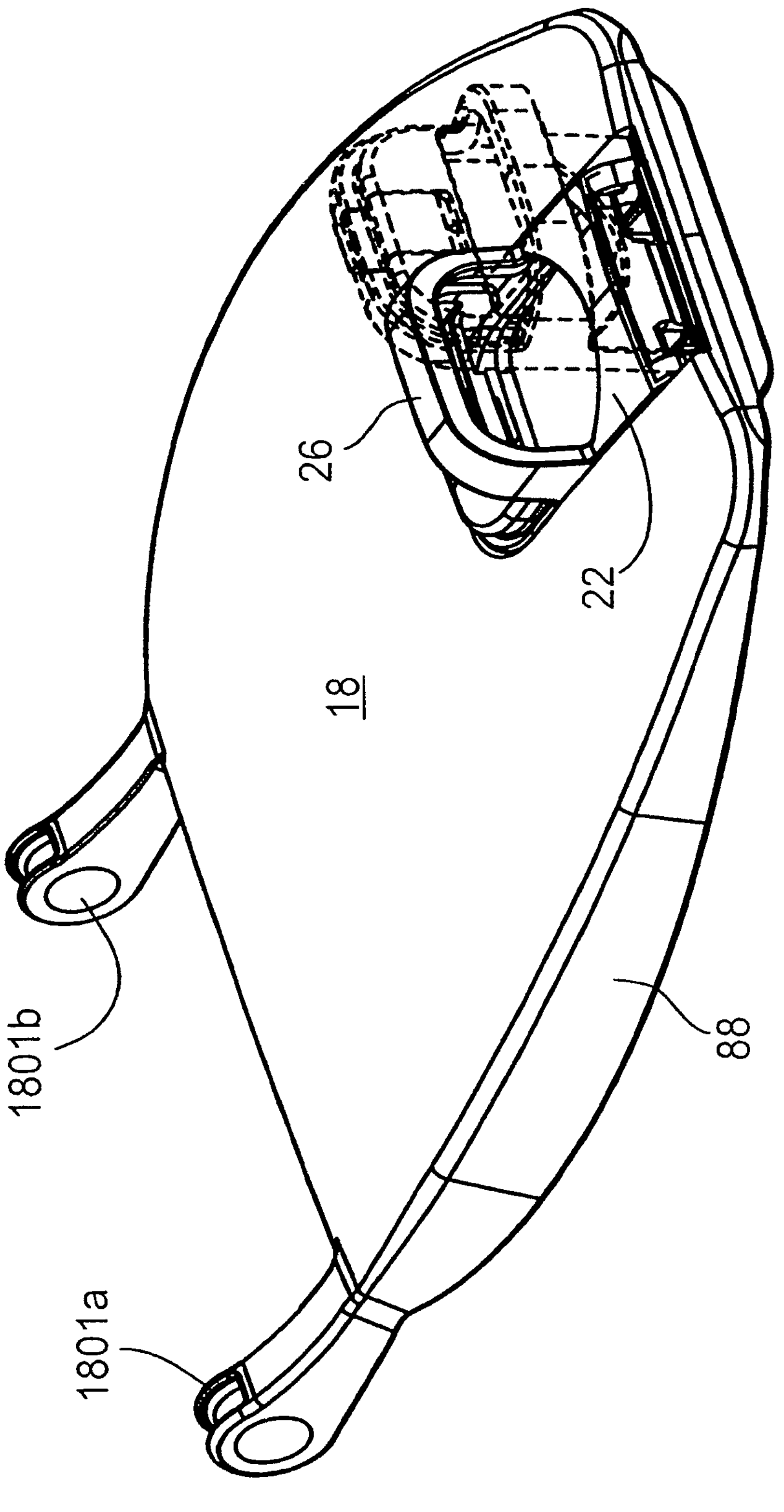
FIG. 40 is a top perspective view of the lid, and the latch, and the latch locking mechanism of the container in FIG. 35, illustrating the latch in the locked position and in the unlocked indication position.
Figure 41:
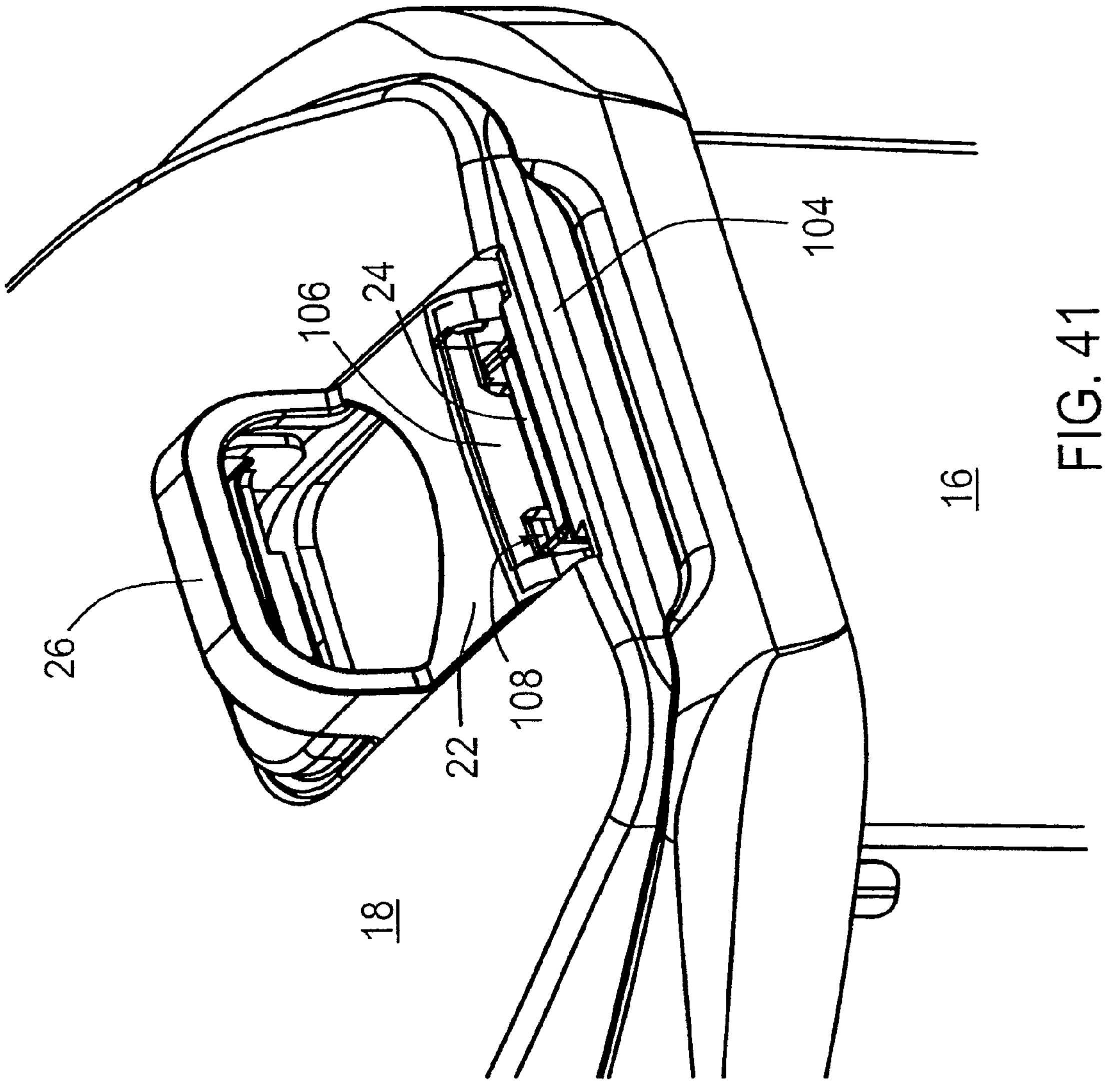
FIG. 41 is a top perspective view of a front detail of the container in FIG. 35, illustrating the latch in the locked position.
Figure 42:
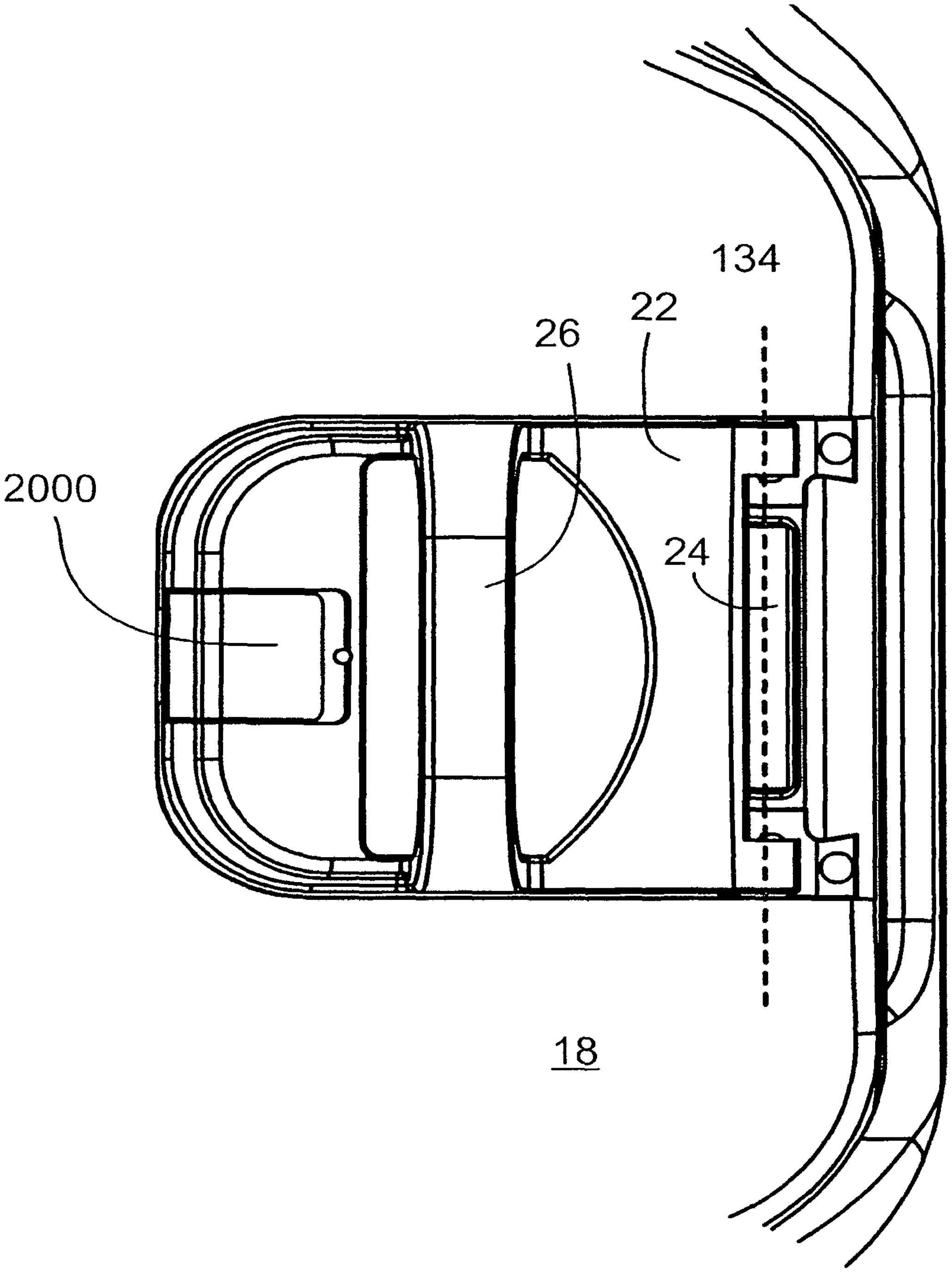
FIG. 42 is a top plan view of a front detail of the container in FIG. 35, illustrating the latch in the locked lid position.
Figure 43:
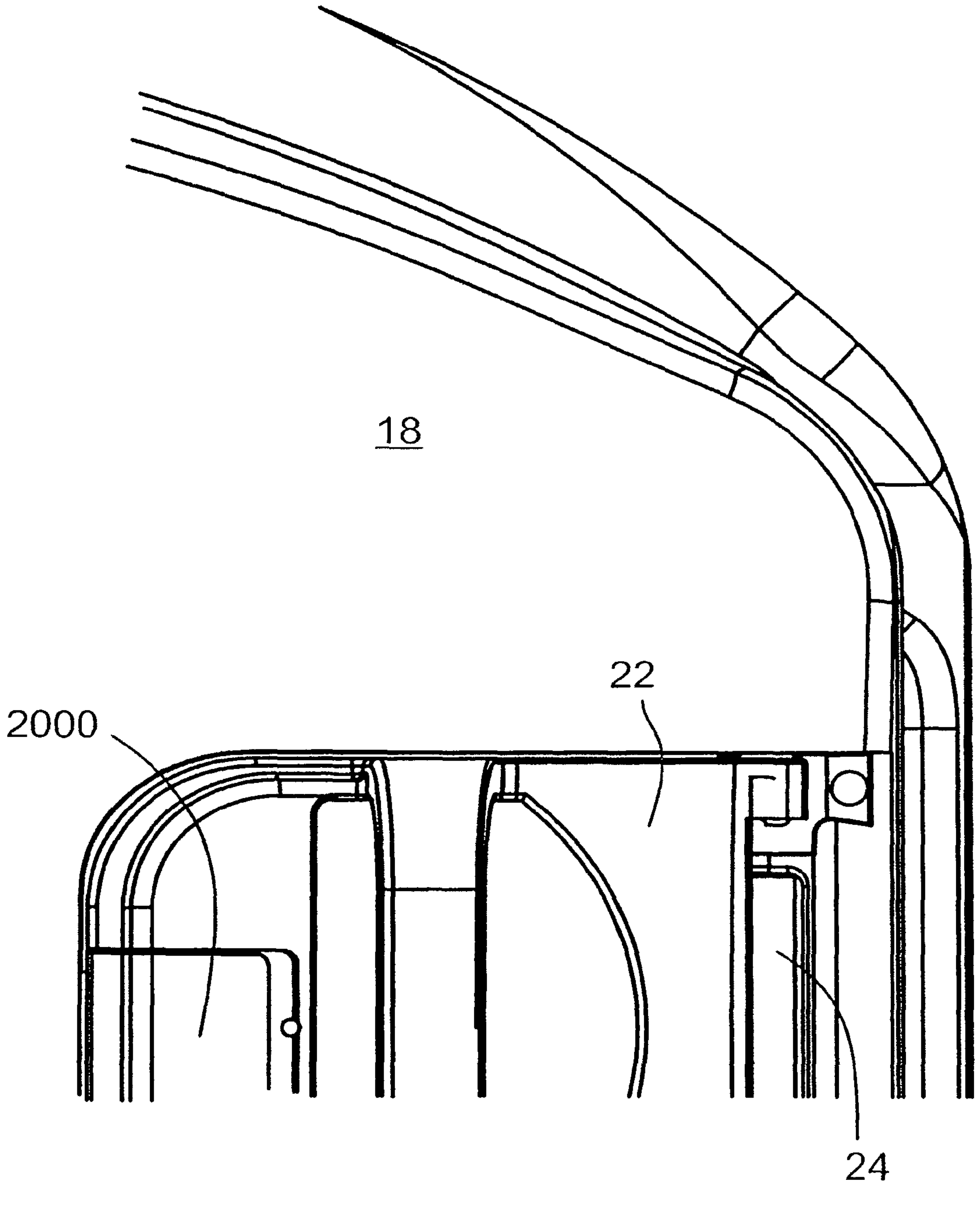
FIG. 43 is a further detail of the top plan view in FIG. 42.

There is provided a refuse container 10. A first embodiment is illustrated in FIGS. 1 to 31. A second embodiment is illustrated in FIGS. 32 to 34. A third embodiment is illustrated in FIGS. 35 to 68. Like elements are identified with like reference numerals. Descriptions of spatial disposition one element relative to another are provided in the context of a refuse container 10 disposed in a vertically upright and self-supporting position, and disposed on a substantially horizontal reaction surface 60, such as, for example, the container 10 illustrated in FIG. 2.

The refuse container 10 includes a container assembly 12 and a locking mechanism 14. For example, the container is manufactured by high pressure injection moulding.

The container assembly 12 includes a bin 16 and a lid 18. The lid 18 is coupled to the bin 16. For example, the material of the bin 16 and the lid 18 is high density polyethylene.

The bin 16 defines a cavity 20. The bin 16 includes a lip 74 which defines an opening 36 for effecting communication between the cavity 20 and the environment external to the bin 16 when the lid 18 is in an open position (see below). For example, the cavity 20 is configured for storing material including household organic waste.

For example, with respect to the bin 16, the bin 16 includes a floor 32 and a continuous upstanding sidewall 34 extending between the floor 32 and the lip 74. For example, with respect to the continuous sidewall 34, the continuous sidewall 34 includes interior and exterior surfaces 41, 42. A rim 28 extends peripherally about the perimeter of the lip 74. For example, the rim 28 includes a seating surface 30 configured to co-operate with the lid 18, as will be explained below. For example, the seating surface 30 extends peripherally about the perimeter of the lip 74.

For example, with respect to the interior surface 41 of the continuous sidewall, the interior surface is tapered so as to facilitate nesting of an identical container within the container 10, and thereby facilitate stacking of multiple identical containers 10.

For example, with respect to the external surface 42 of the continuous sidewall 34, a pair of handles 38, 40 are mounted on opposite sides 44, 46 of the external surface 42 of the continuous sidewall 34. The handles 38, 40 are configured to be grasped by a human operator for effecting lifting of the container 10.

For example, with further respect to the external surface 42 of the continuous sidewall 34, a pair of brackets 48, 50 are mounted to a rear section 52 of the external surface 42 of the continuous sidewall 34. A handle 54 extends between the brackets 48, 50. The handle 54 is provided for grasping by a human operator for effecting lifting of the container. Alternatively, where the container 10 is provided with wheels 56, 58, the handle 54 facilitates grasping by a human operator for effecting rolling movement of the container 10 across a reaction surface 60.

For example, the lid 18 is rotatably coupled to the bin 16. For example, such rotational coupling can be accomplished by pivots incorporated in one of the lid 18 or the bin 16 and received within respective receptacles in the other one of the lid 18 or the bin 16, or through external pivots received within receptacles provided in each one of the lid 18 and the bin 16.

Figure 10:
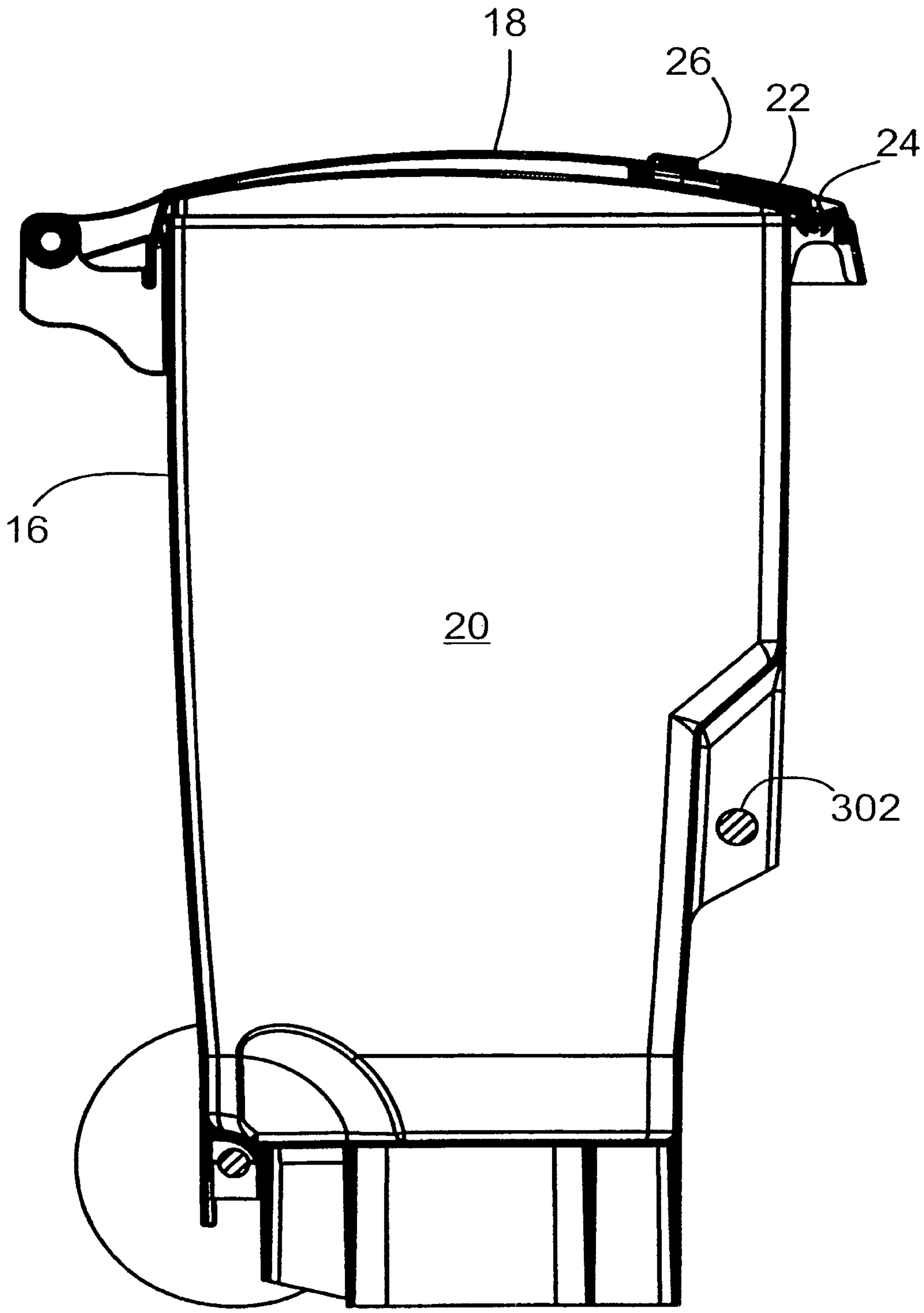
FIG. 10 is a sectional side elevation view of the container, taken along the lines A-A in FIG. 5, illustrating the latch in the locked lid position.
Figure 12:
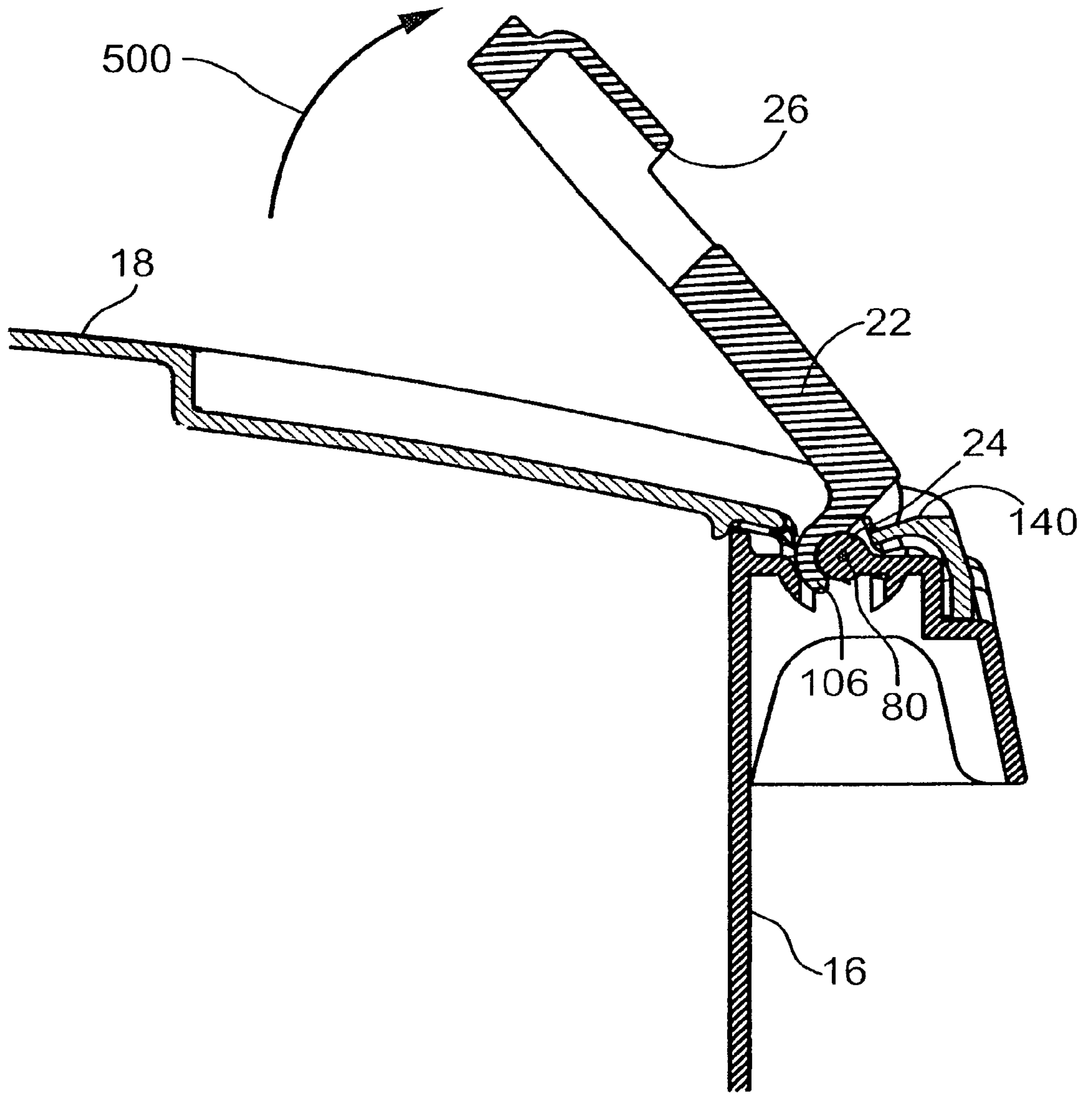
FIG. 12 is a front detail of a sectional side elevation view of the container, taken along the lines A-A in FIG. 5, illustrating the latch in the unlocked lid position.
Figure 13:
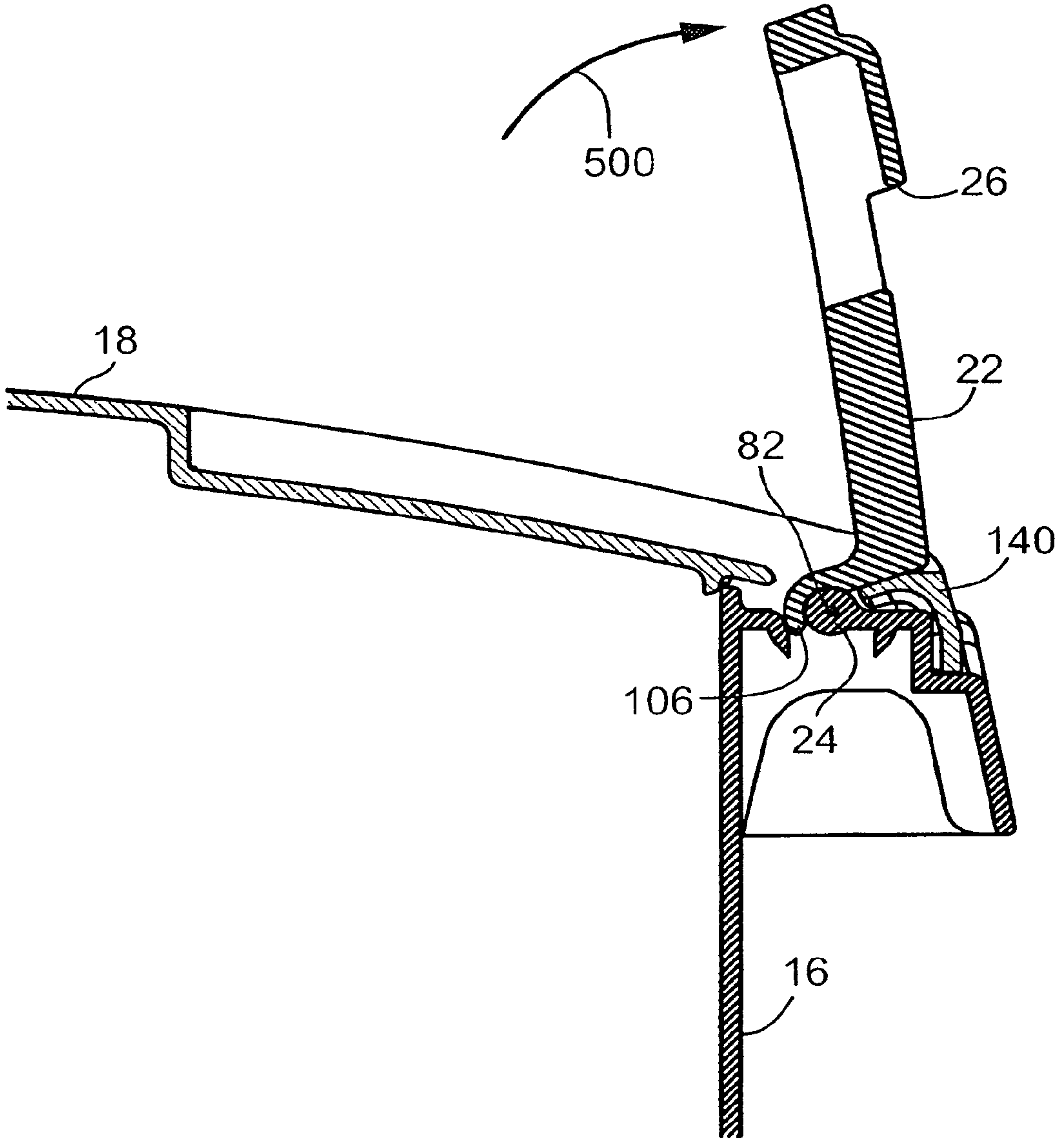
FIG. 13 is a front detail of a sectional side elevation view of the container, taken along the lines A-A in FIG. 5, illustrating the latch in the unlocked indication position.
Figure 14:
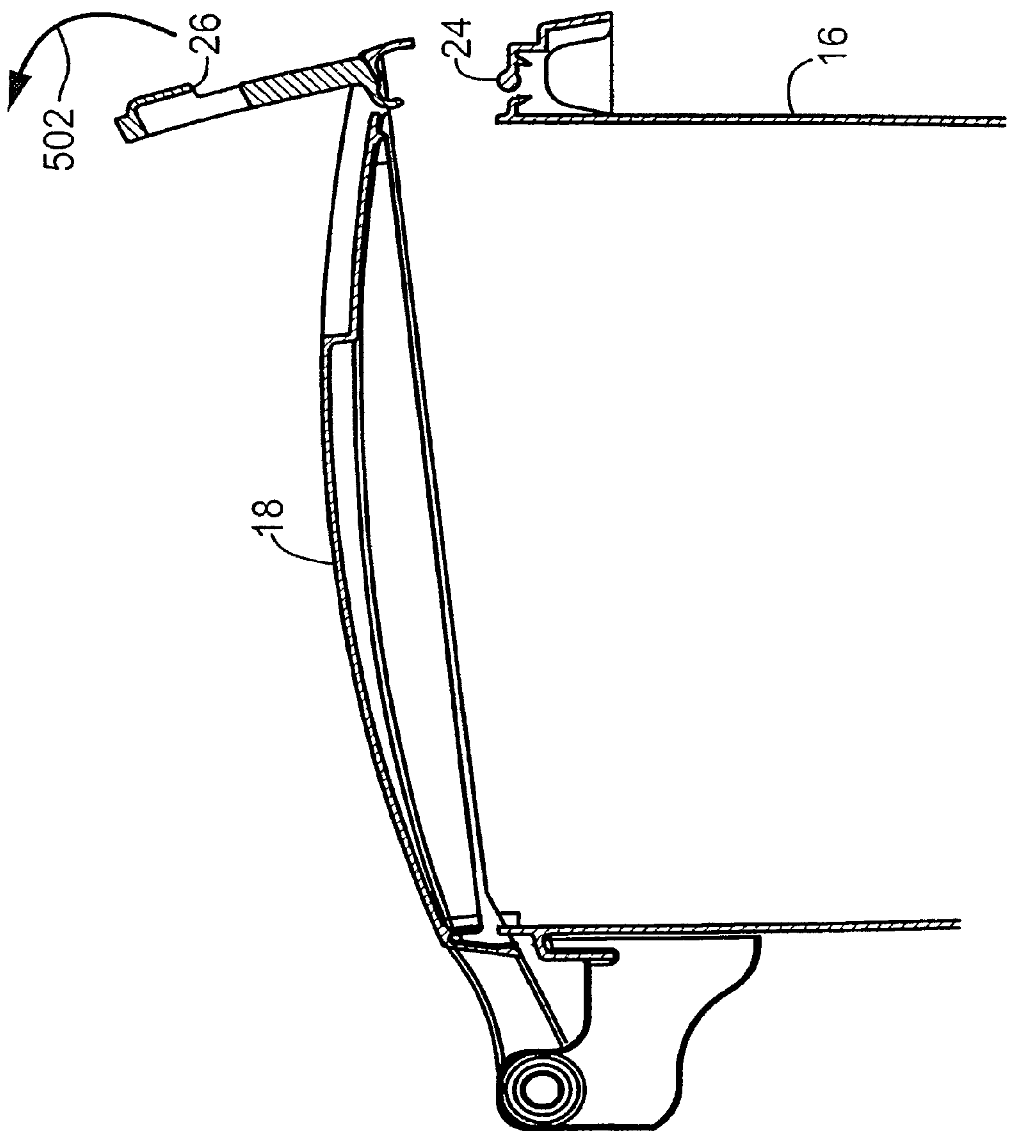
FIG. 14 is a top detail of a sectional side elevation view of the container, taken along the lines A-A in FIG. 5, illustrating the lid in an open position.
Figure 44:
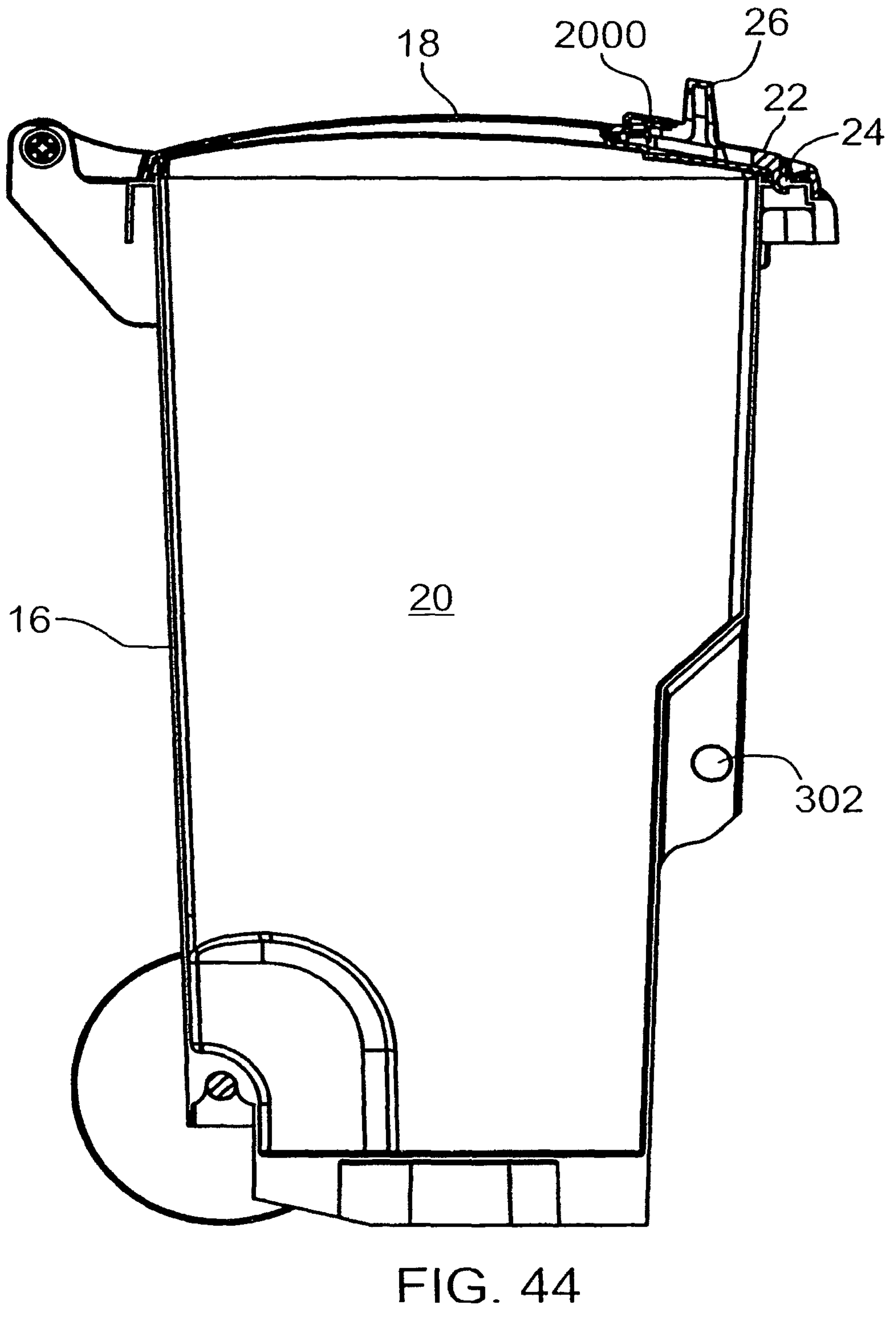
FIG. 44 is a sectional side elevation view of the container, taken along the lines A-A in FIG. 39, illustrating the latch in the locked lid position.
Figure 46:
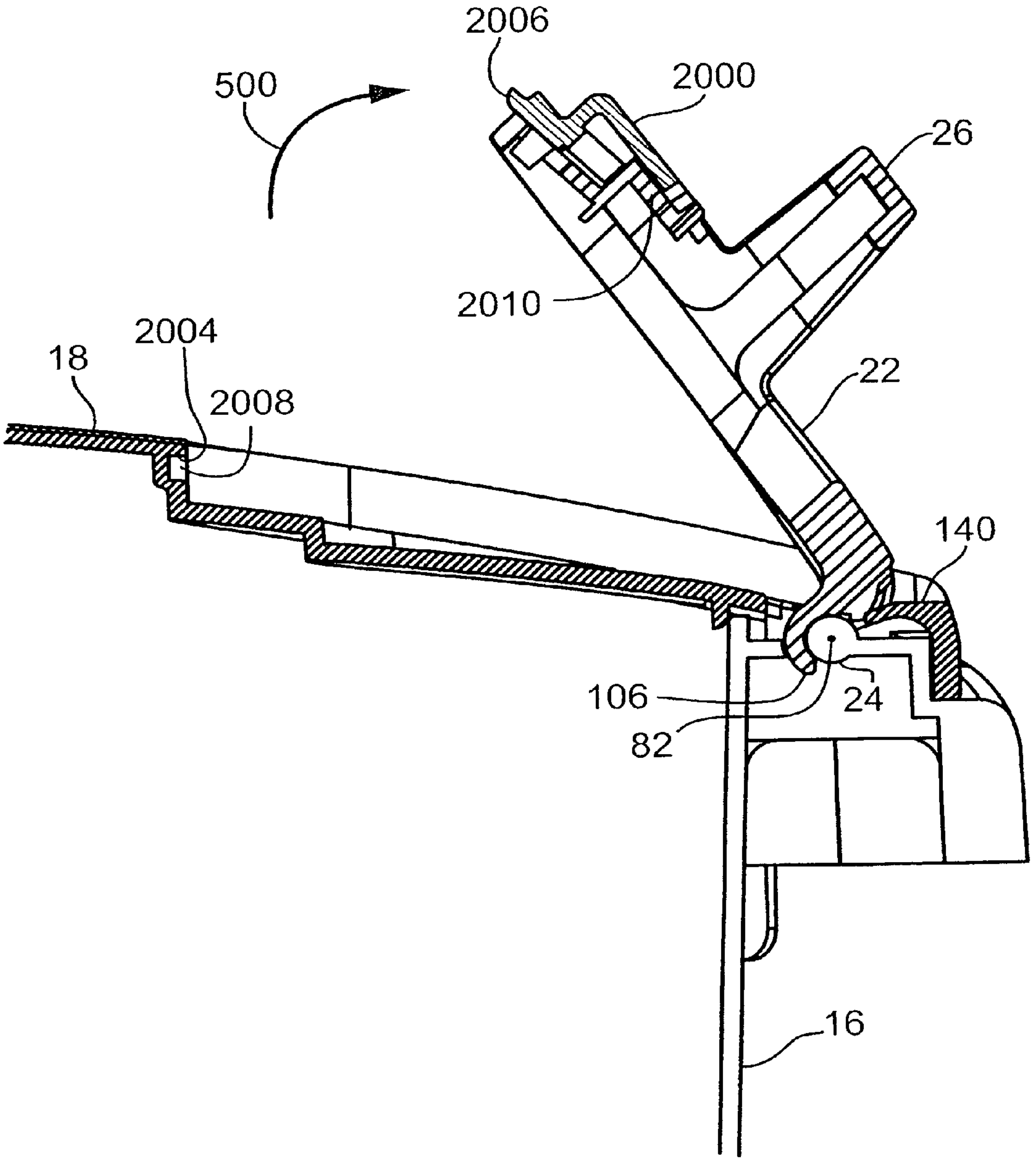
FIG. 46 is a front detail of a sectional side elevation view of the container, taken along the lines A-A in FIG. 39, illustrating the latch in the unlocked lid position.
Figure 47:
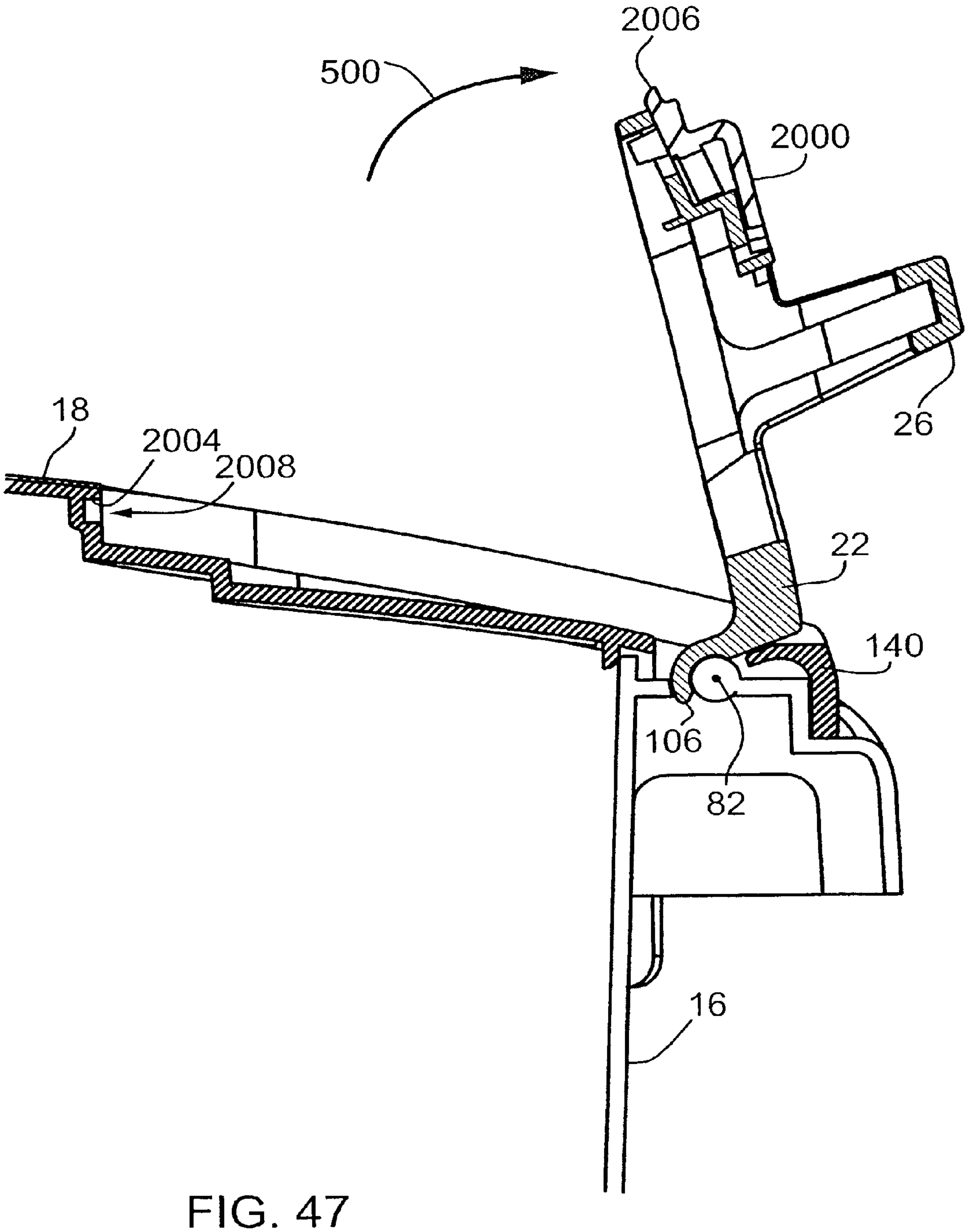
FIG. 47 is a front detail of a sectional side elevation view of the container, taken along the lines A-A in FIG. 39, illustrating the latch in the unlocked indication position.
Figure 48:
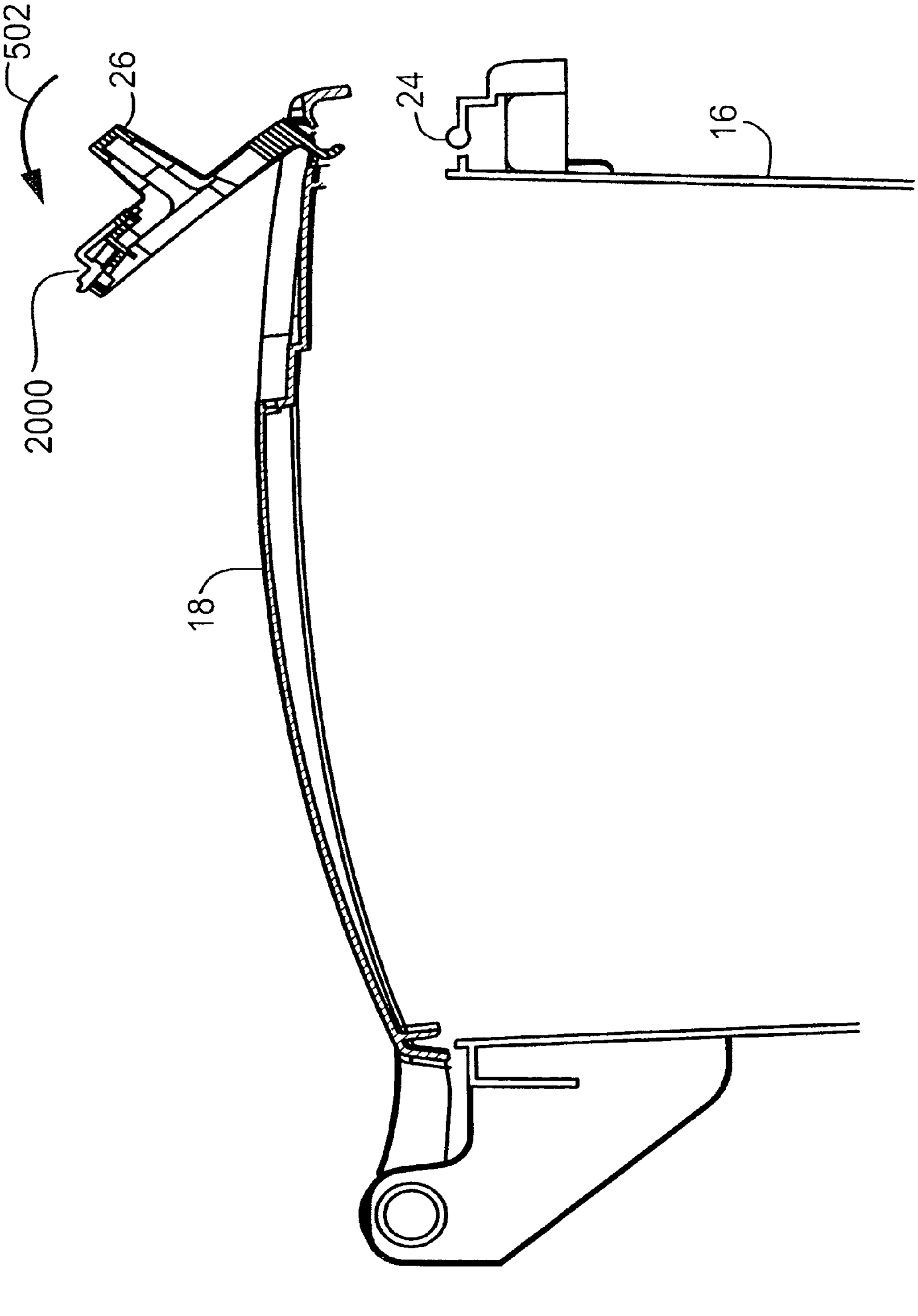
FIG. 48 is a top detail of a sectional side elevation view of the container, taken along the lines A-A in FIG. 39, illustrating the lid in an open position.

The lid 18 is configured for movement, relative to the bin 16, between an open position (see FIG. 14 for the first embodiment, and FIG. 48 for the third embodiment) and a closed position—(see FIGS. 10, 12, and 13 for the first embodiment, and FIGS. 44, 46, and 47 for the third embodiment). For example, the lid extends between and is rotatably coupled to each one of the brackets 48, 50. In this respect, for example, the lid in the first embodiment includes pins 76, 78 extending from opposite sides. Each one of the pins 76, 80 is received within a respective aperture of a respective one of the brackets 48, 50. In the third embodiment, the lid 18 is rotatably coupled to each one of the brackets 48, 50 with a hinge pin 3000 (which also functions as handle 54). The hinge pin 3000 is press-fit through receiving apertures 1801*a*, 1801*b* provided on either side of the lid and through receiving apertures 481, 501 provided on the brackets 48, 50.

For example, with respect to the lid 16, when the lid 16 is in the open position, depositing of household organic waste into the cavity 20 can be effected. As a further example, when the lid 16 is open, removal, from the cavity 20, of the contents of the cavity 20 is enabled. For example, when the lid 18 is in the closed position, removal or egress, from the cavity 20, of the contents of the cavity 20 is inhibited. As a further example, when the lid 18 is in the closed position, the contents of the cavity 20 are hidden from view. As a further example, when the lid 18 is in the closed position, egress of odors, from the cavity 20, and from the materials within the cavity 20, is inhibited.

Figure 24:
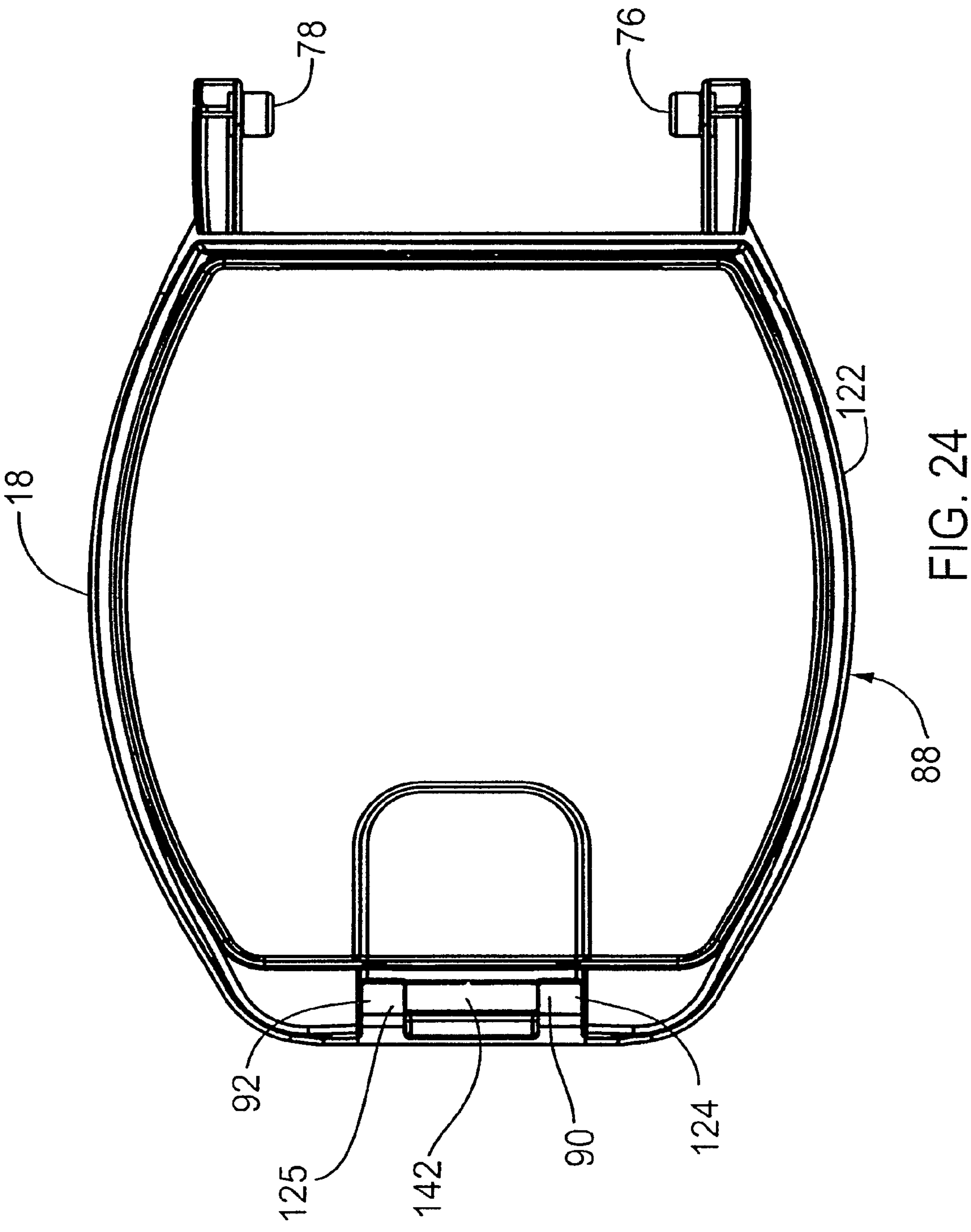
FIG. 24 is a bottom plan view of a lid of the container in FIG. 1.
Figure 25:
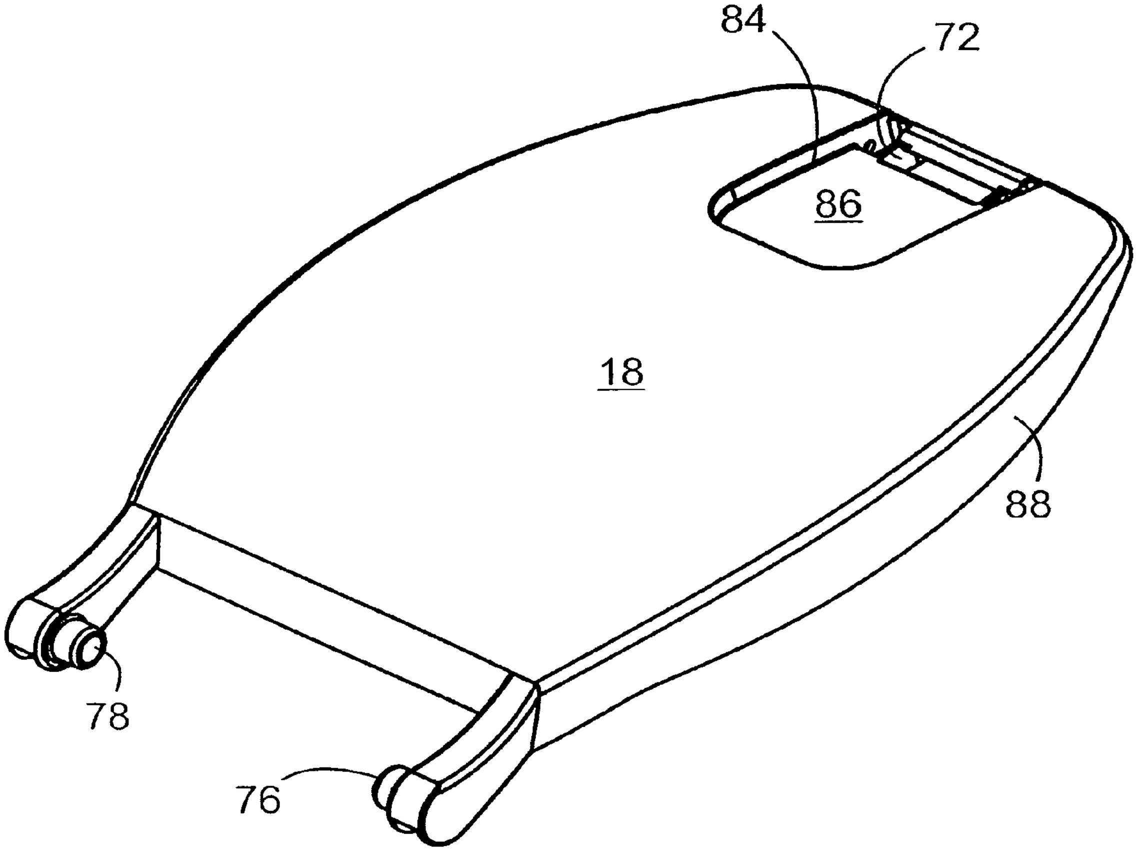
FIG. 25 is a top perspective of the lid of the container in FIG. 1, taken from the rear.
Figure 26:
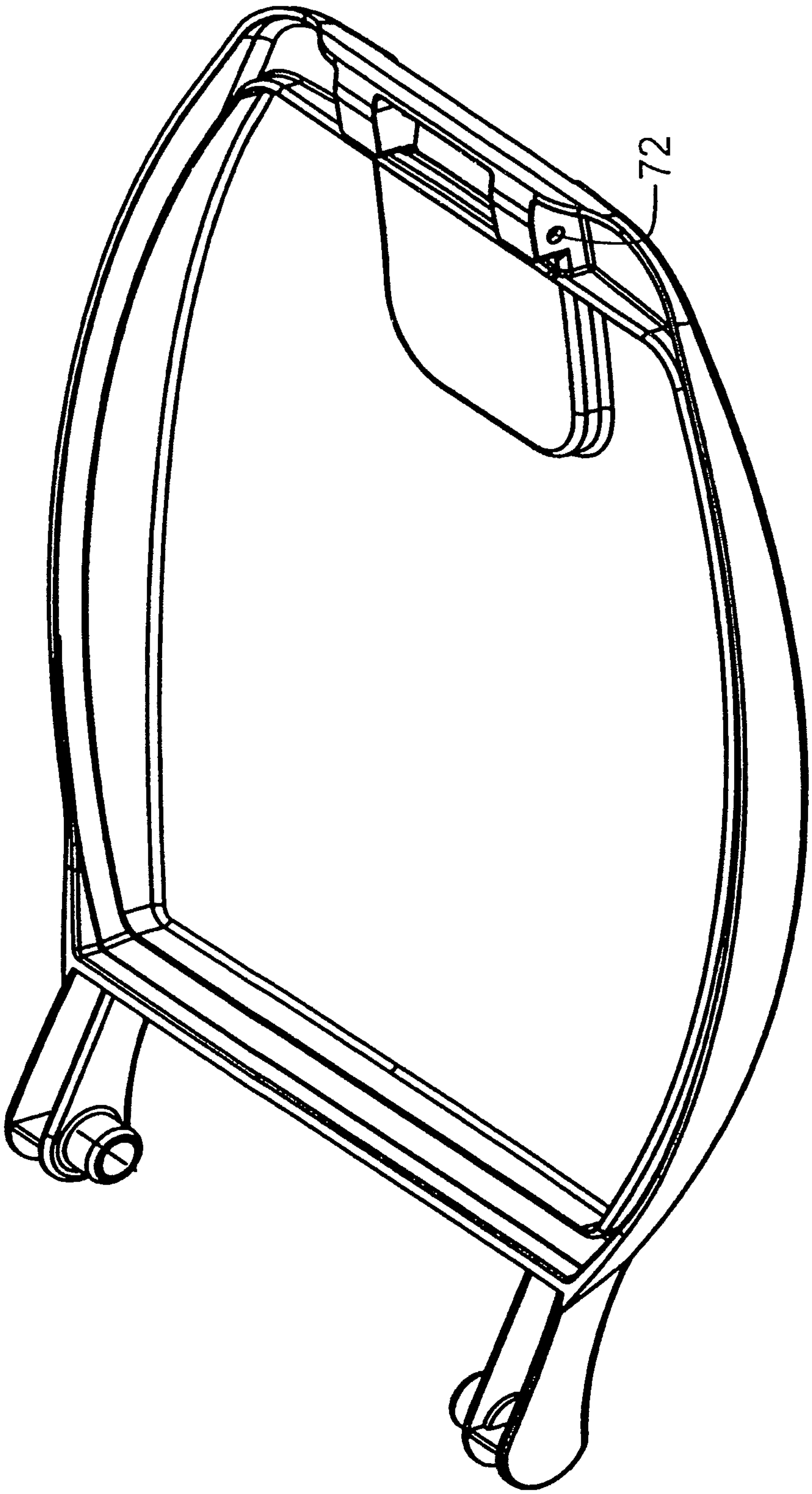
FIG. 26 is a bottom perspective view of the lid of the container in FIG. 1, taken from the rear.
Figure 28:
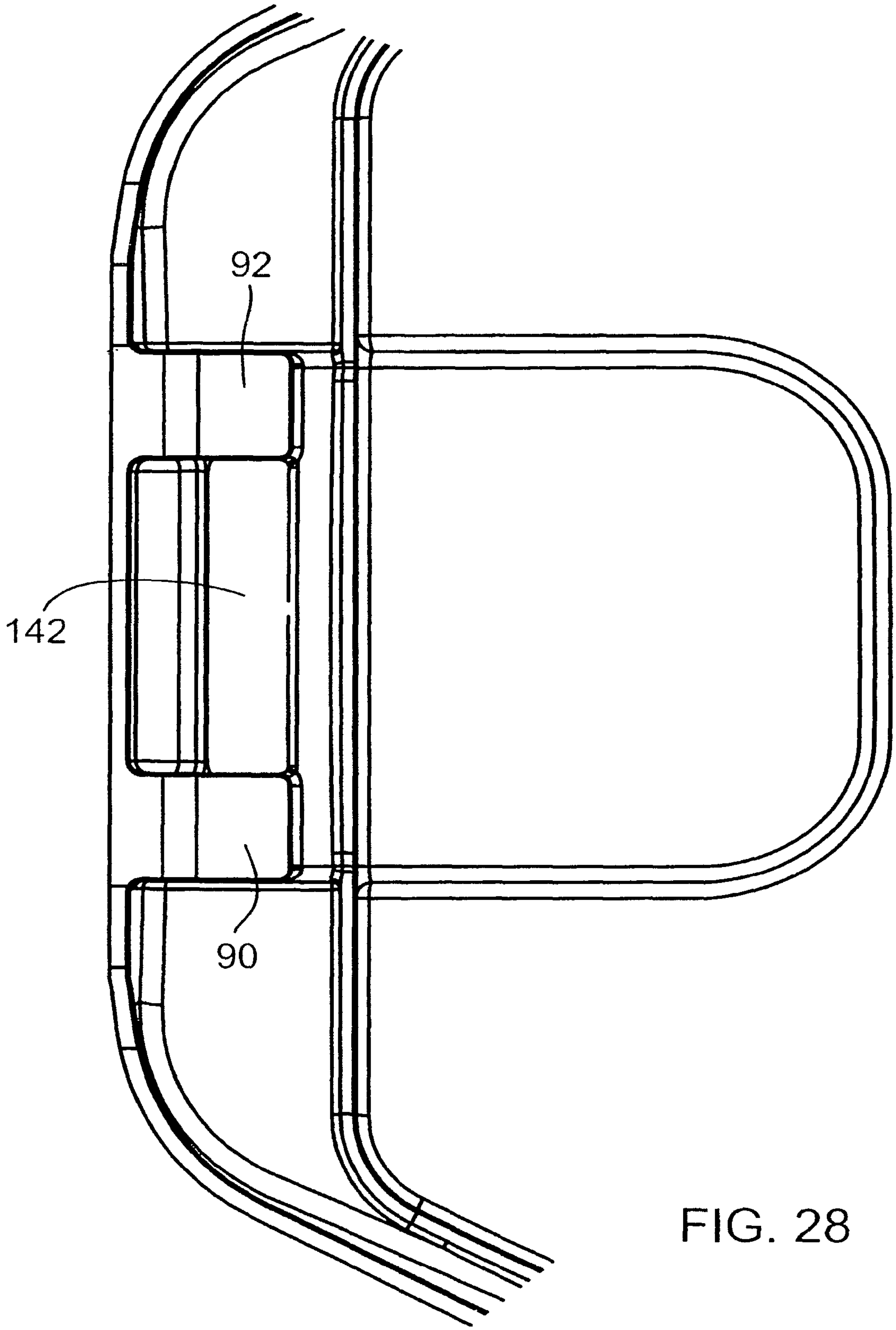
FIG. 28 is a bottom plan view of a front detail of the lid of the container in FIG. 1.
Figure 29:
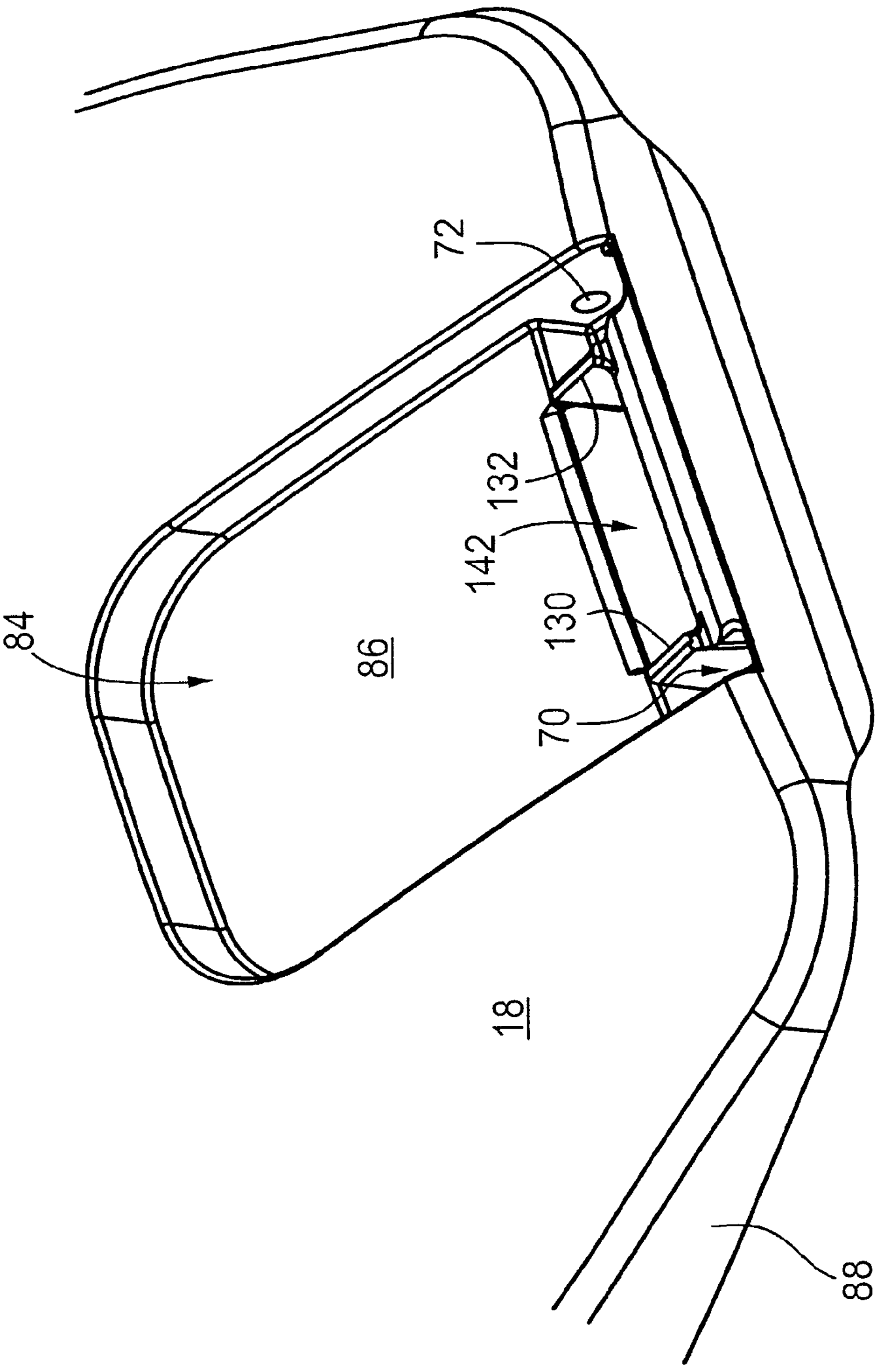
FIG. 29 is top perspective view of a front detail of the lid of the container in FIG. 1.
Figure 58:
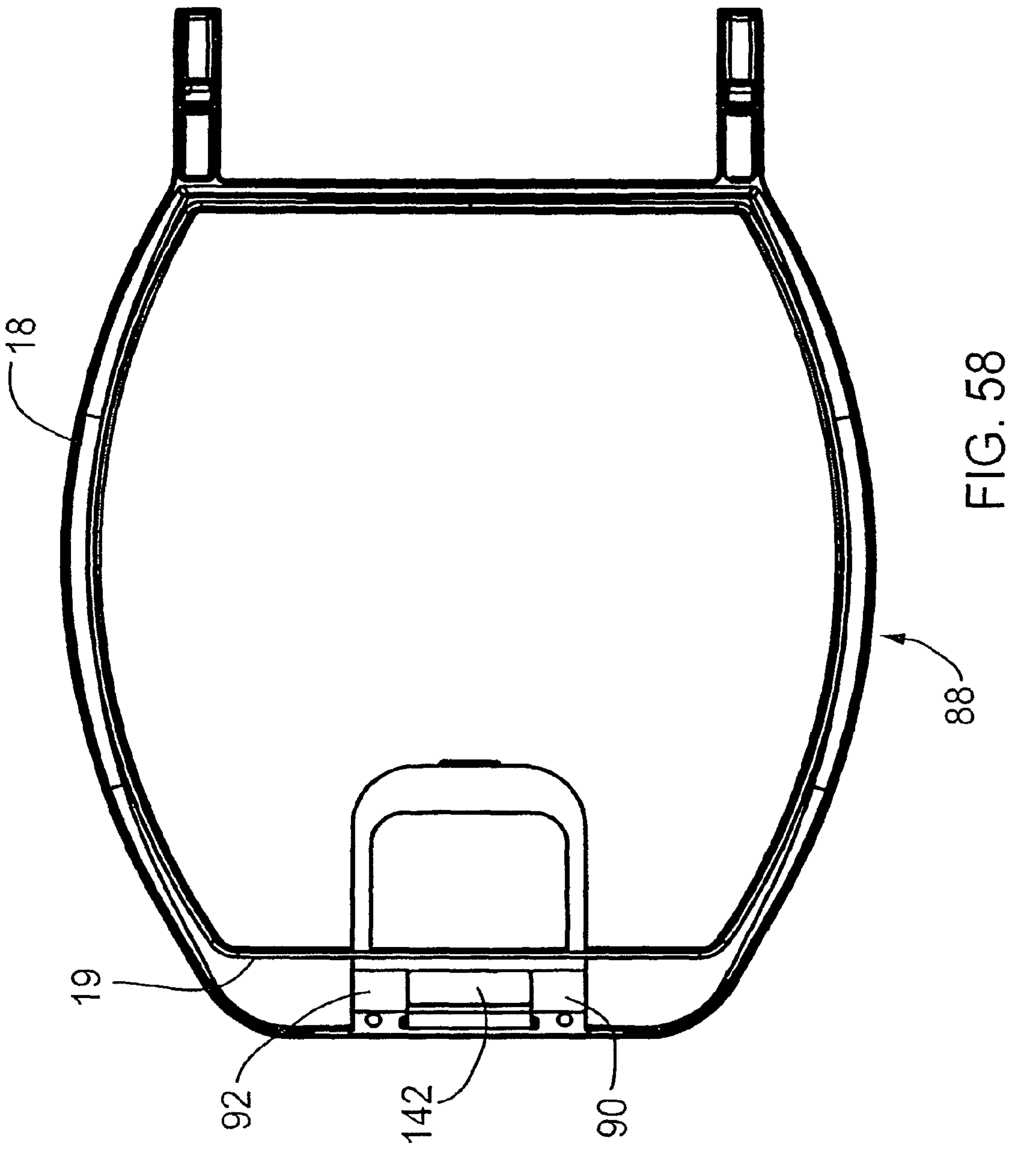
FIG. 58 is a bottom plan view of a lid of the container in FIG. 35.
Figure 59:
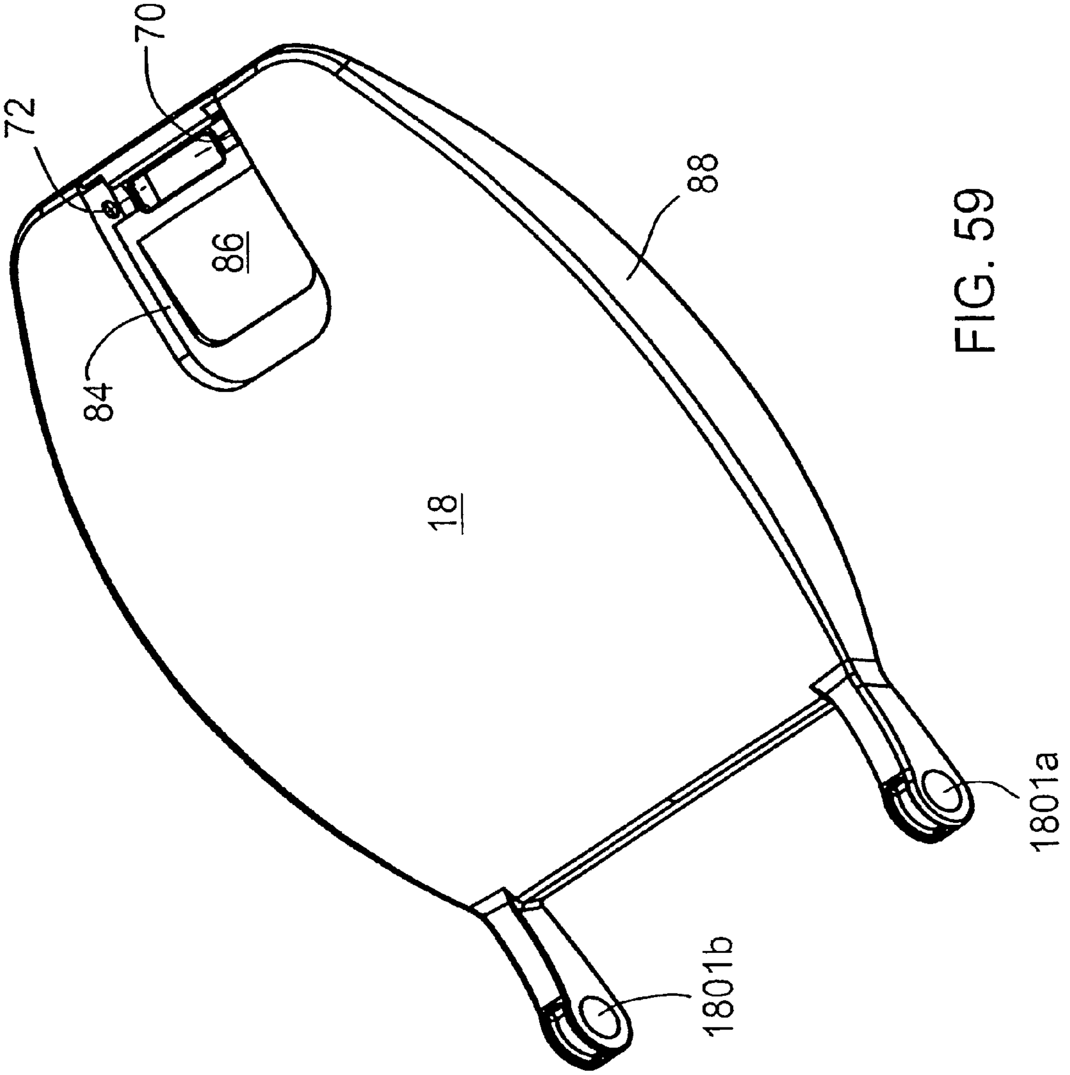
FIG. 59 is a top perspective of the lid of the container in FIG. 35, taken from the rear.
Figure 60:
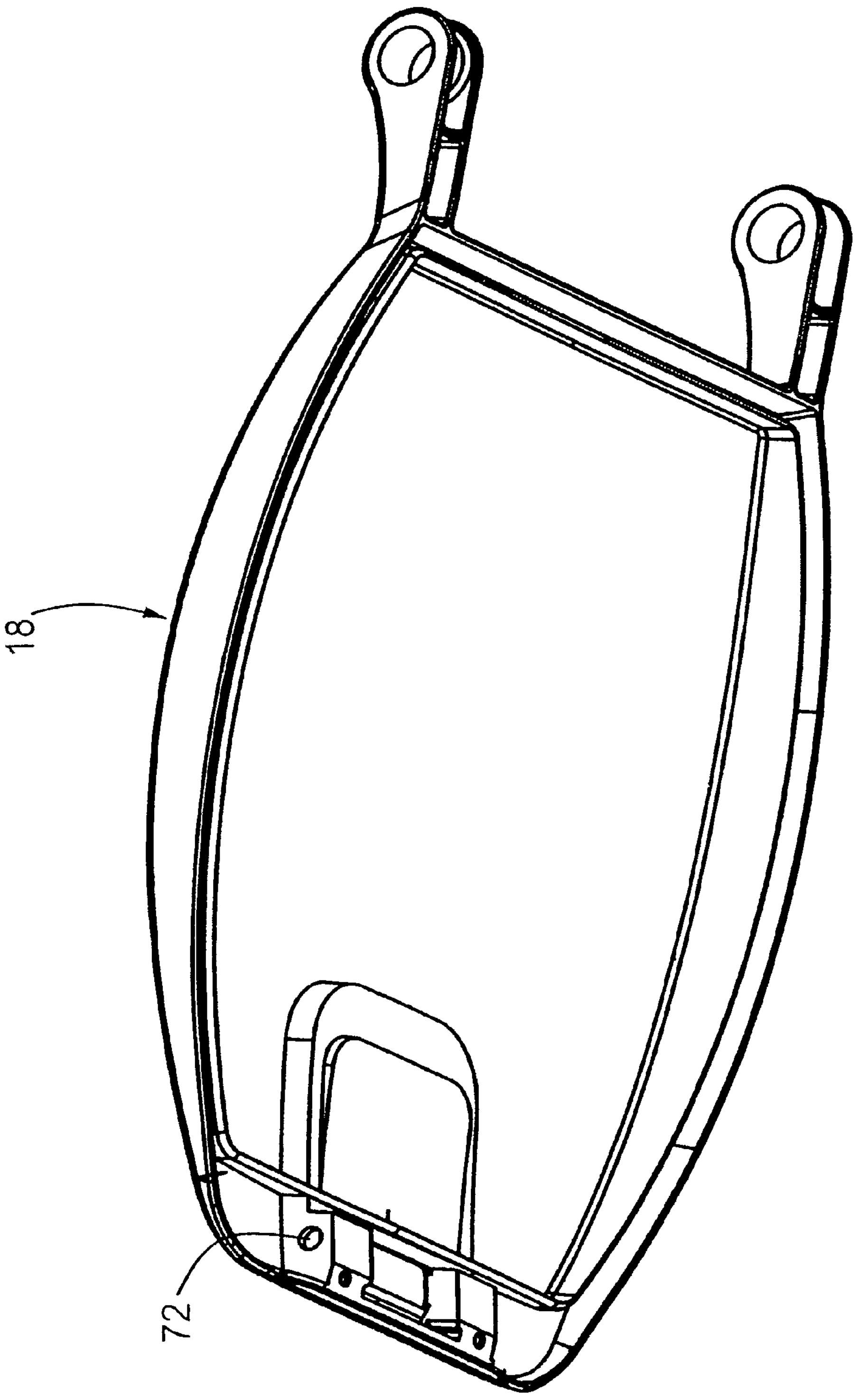
FIG. 60 is a bottom perspective view of the lid of the container in FIG. 35, taken from the rear.
Figure 62:
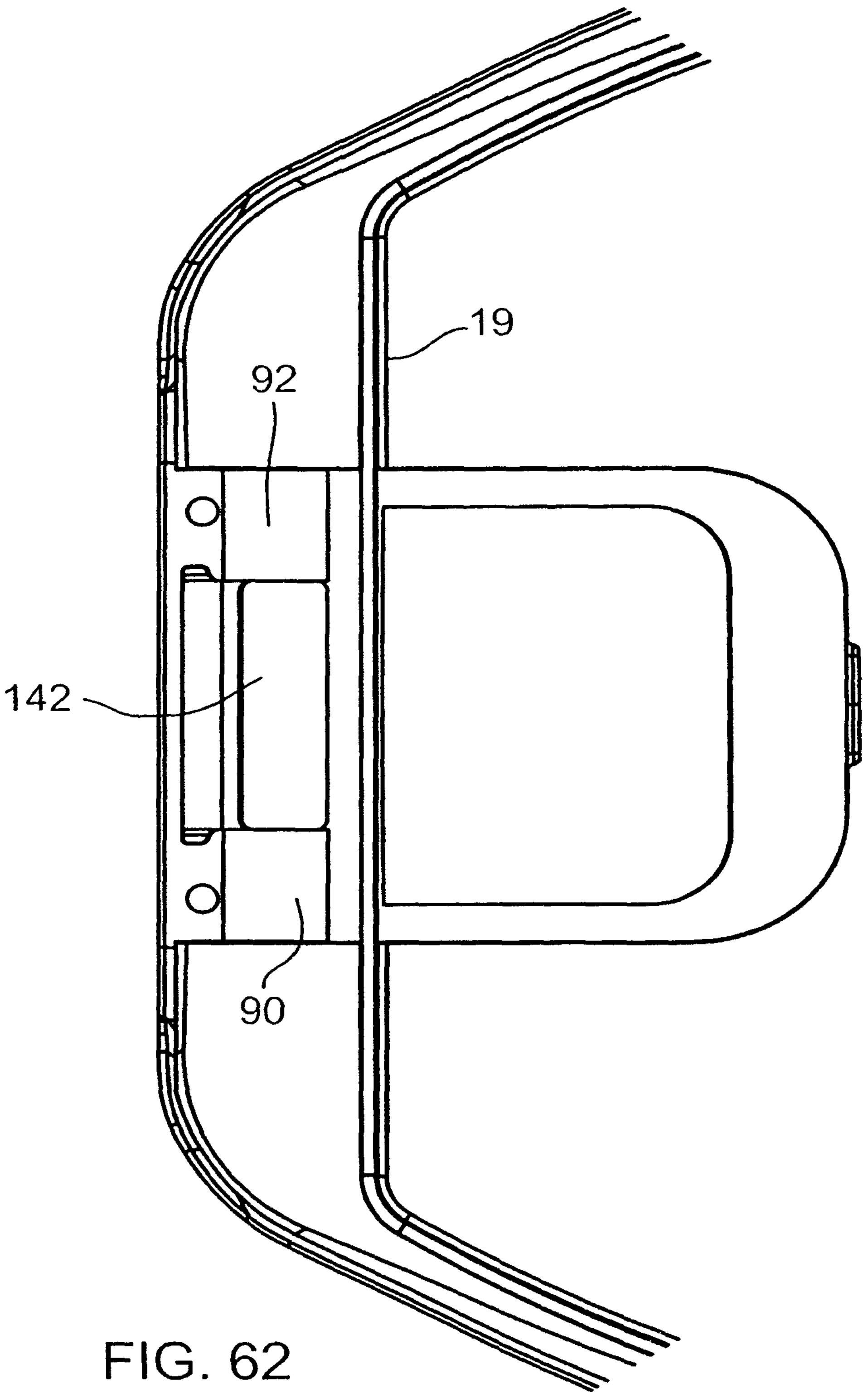
FIG. 62 is a bottom plan view of a front detail of the lid of the container in FIG. 35.
Figure 63:
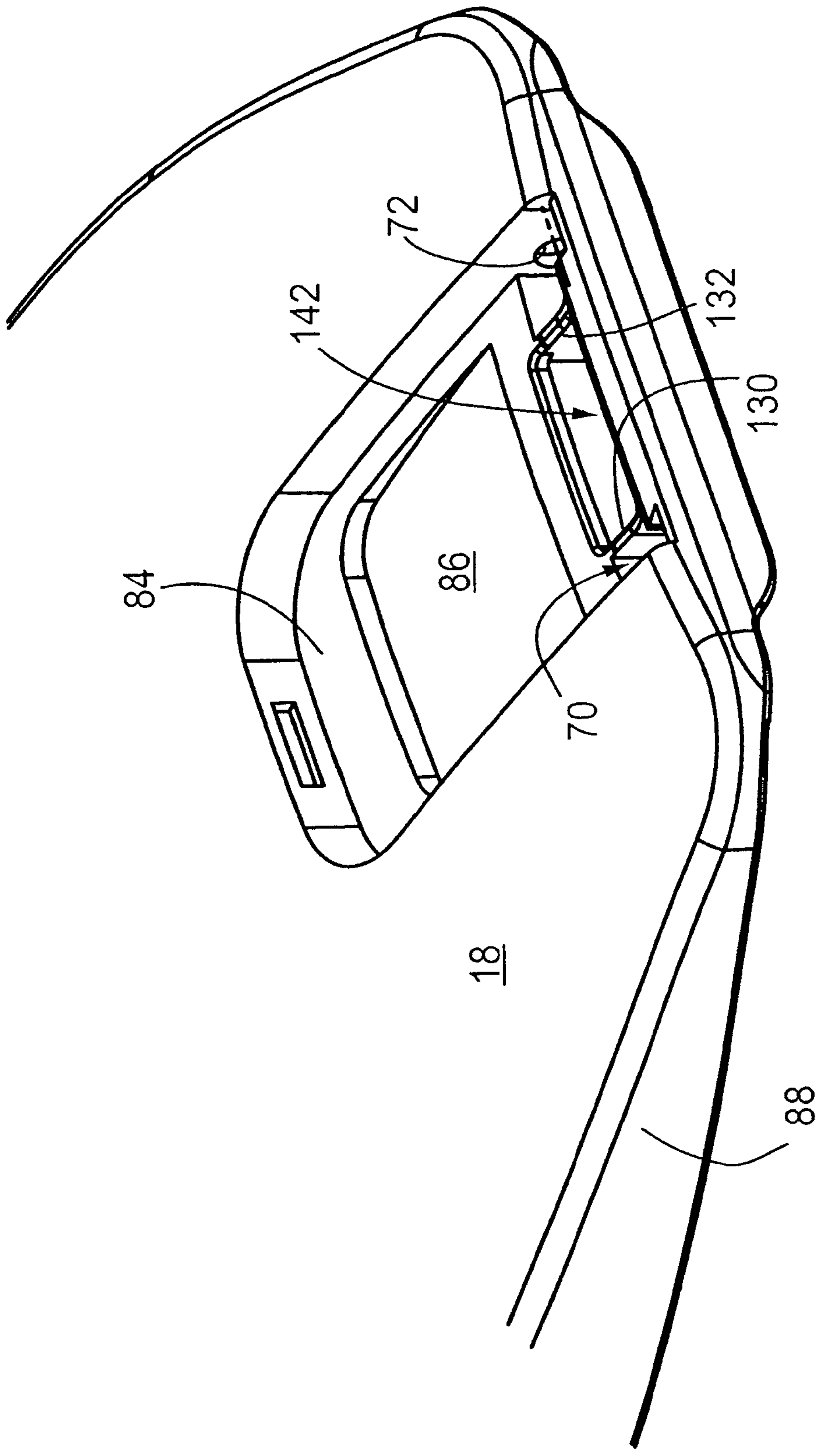
FIG. 63 is top perspective view of a front detail of the lid of the container in FIG. 35.

Referring to FIGS. 24 and 28 for the first embodiment and FIGS. 58 and 62 for the third embodiment, for example, with respect to the lid 16, the lid 16 includes a downwardly extending rib 19. For example, the rib 19 extends internally about the perimeter of the lid 16.

The rib 19 is configured to be disposed opposite to an interior surface of the lip 74 (see FIGS. 18 and 20 for the first embodiment, and FIGS. 52, 54 for the third embodiment) when the lid 16 is in the closed position. As well, the lid 16 includes a skirt 88. For example, the skirt extends peripherally about the perimeter of the lid 16. The skirt 88 is configured to be seated or supported on the seating surface 30 of the rim 28 when the lid 16 is in the closed position. The lid 16 also includes one or more impact pads (two impact pads 90, 92 are shown in FIGS. 24 and 28 for the first embodiment, and FIGS. 58 and 62 for the third embodiment) which are also configured to be seated or supported on a respective one of pad seating surfaces 94, 96 provided on the rim 28 (see FIGS. 18 and 20 for the first embodiment, and FIGS. 52 and 54 for the third embodiment). For example, each one of the seating surfaces 94, 96 is provided in a respective one of receiving wells 98, 100 also provided on the rim 28.

The locking mechanism includes a latch 22 and a detent 24. The latch 22 is coupled (for example, mounted) to one of the bin 16 and the lid 18. The detent 24 is coupled (for example, mounted) to the other one of the bin 16 and the lid 18. For example, the latch 22 is coupled (for example, mounted) to the lid 18 (see FIG. 6 for the first embodiment, and FIG. 40 for the third embodiment), and the detent is provided on the bin (see FIGS. 18, 20, 21, and 22 for the first embodiment, and FIGS. 52, 54, 55 and 56 for the third embodiment). For example, the latch 22 is made from nylon, and the detent 24 is made from the same material as the bin (e.g. high density polyethylene). For example, the latch 22 includes a pair of pins 66, 68 disposed on opposite sides of the latch 22 (see FIGS. 15, 16, and 17 for the first embodiment, and FIGS. 49, 50, and 61 for the third embodiment). Each one of the pins 66, 68 is received within a respective one of latch apertures 70, 72 provided in the surface of the lid 18. In this respect, the latch 22 is snap-fit into the latch apertures 70, 72 (see FIGS. 25 and 26 for the first embodiment, and FIGS. 59 and 61 for the third embodiment) of the lid 18.24 and the detent 24 is coupled (for example, mounted) to the bin 16.

For example, with respect to the latch 22, the latch 22 is rotatably coupled to the lid 18. For example, such rotational coupling can be accomplished by pivots incorporated in one of the lid 18 or the latch 22 and received within respective receptacles in the other one of the lid 18 or the latch 22, or through external pivots received within receptacles provided in each one of the lid 18 and the latch 22.

For example, with respect to the detent 24, the detent 24 is mounted to the rim 28 of the bin 16. For example, the detent 24 is mounted to the rim 28 at a front section 51 of the bin 16. For example, the detent 24 is mounted peripherally of the lip 74 of the rim 28.

Figure 15:
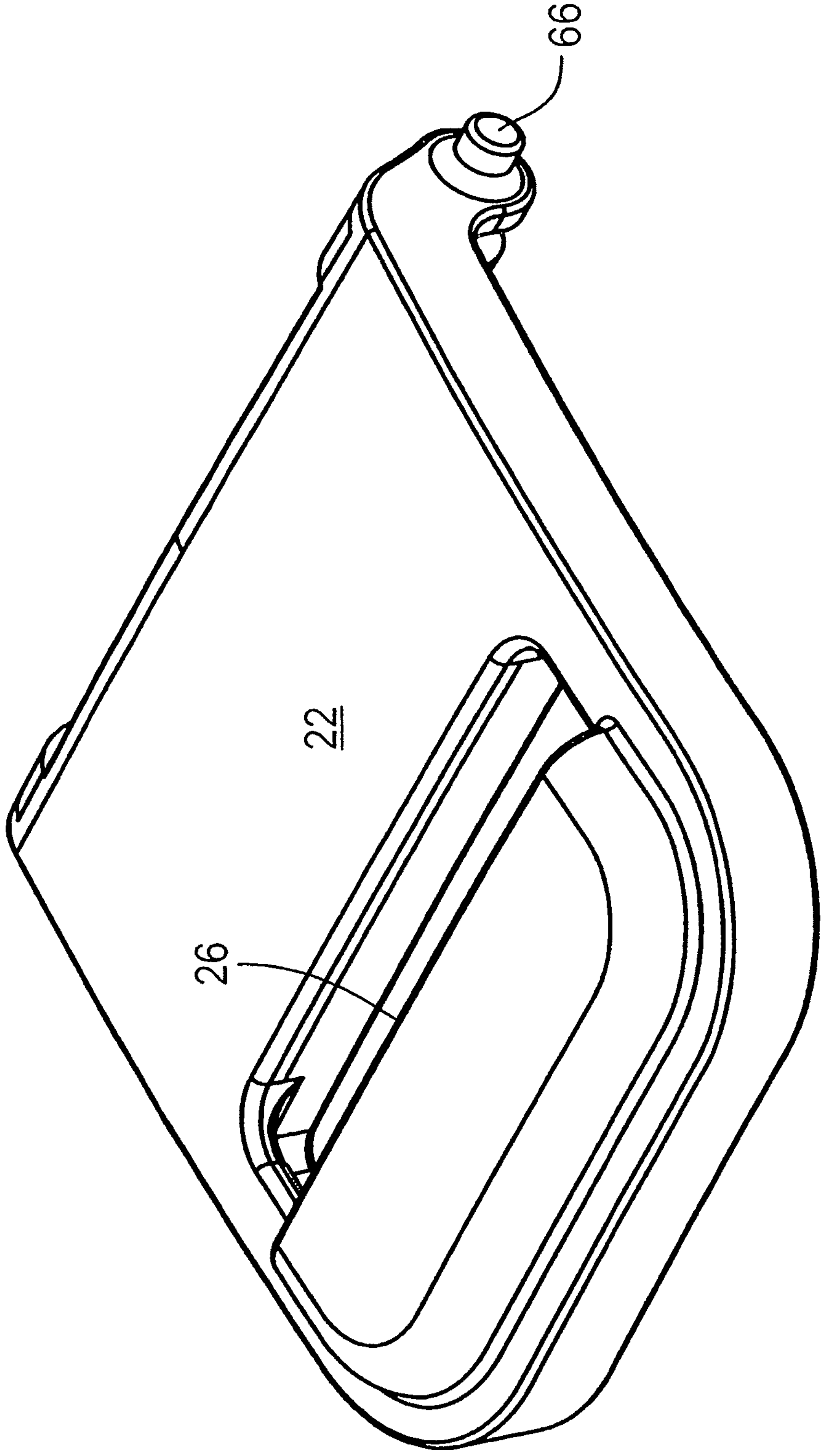
FIG. 15 is a top perspective of the latch of the container in FIG. 1 taken from the front.
Figure 16:
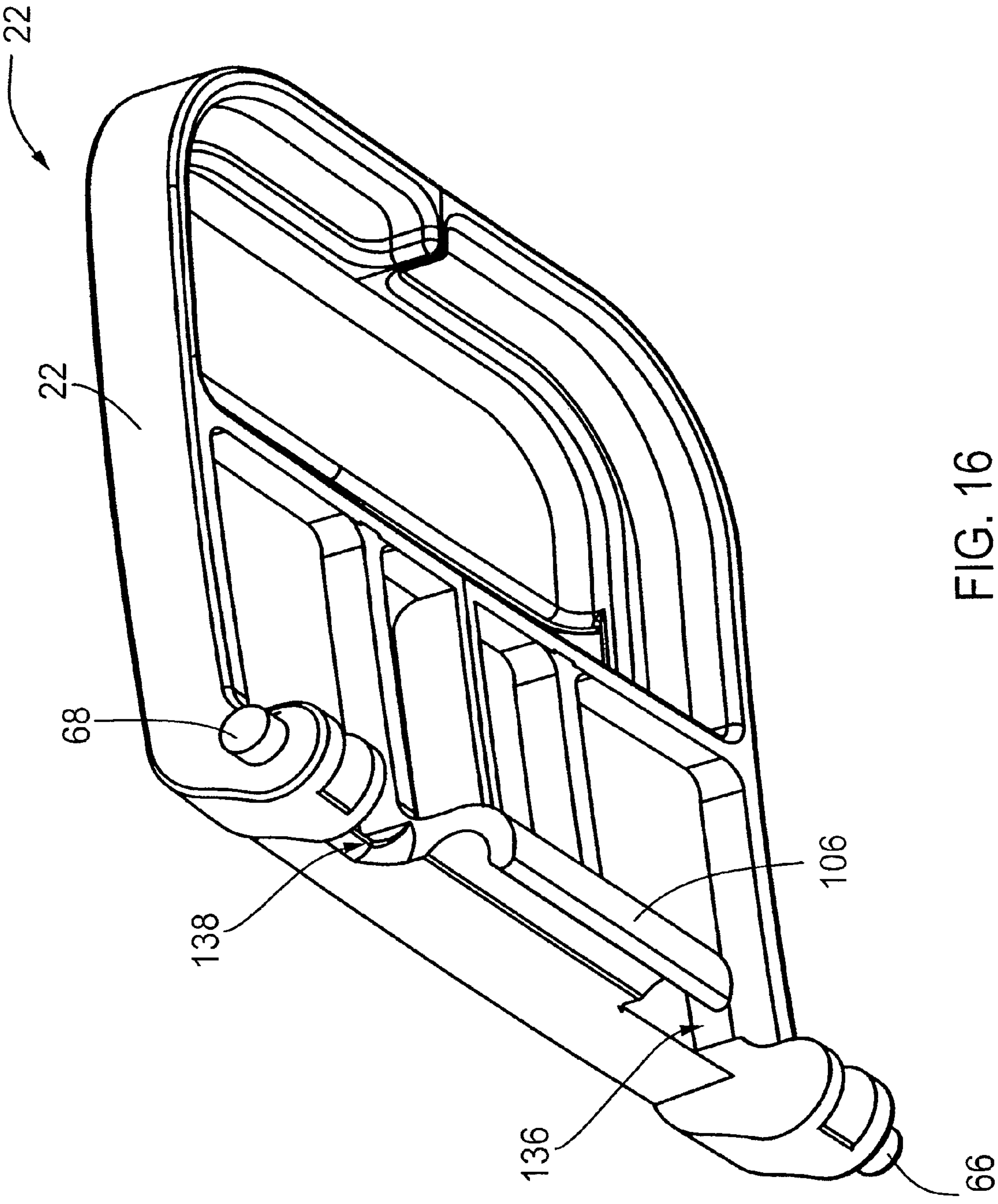
FIG. 16 is a bottom perspective view of the latch of the container in FIG. 1, taken from the rear.
Figure 17:
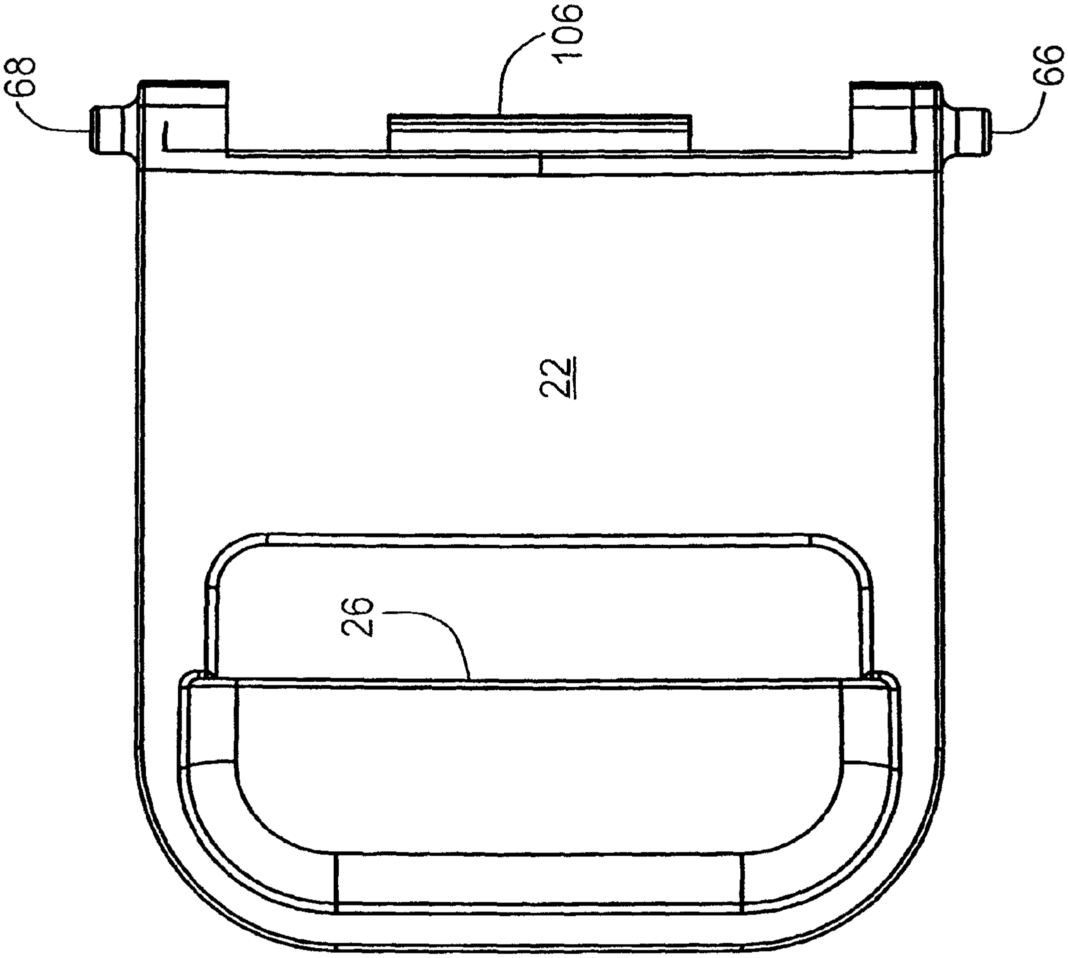
FIG. 17 is a top plan view of the latch of the container in FIG. 1.
Figure 49:
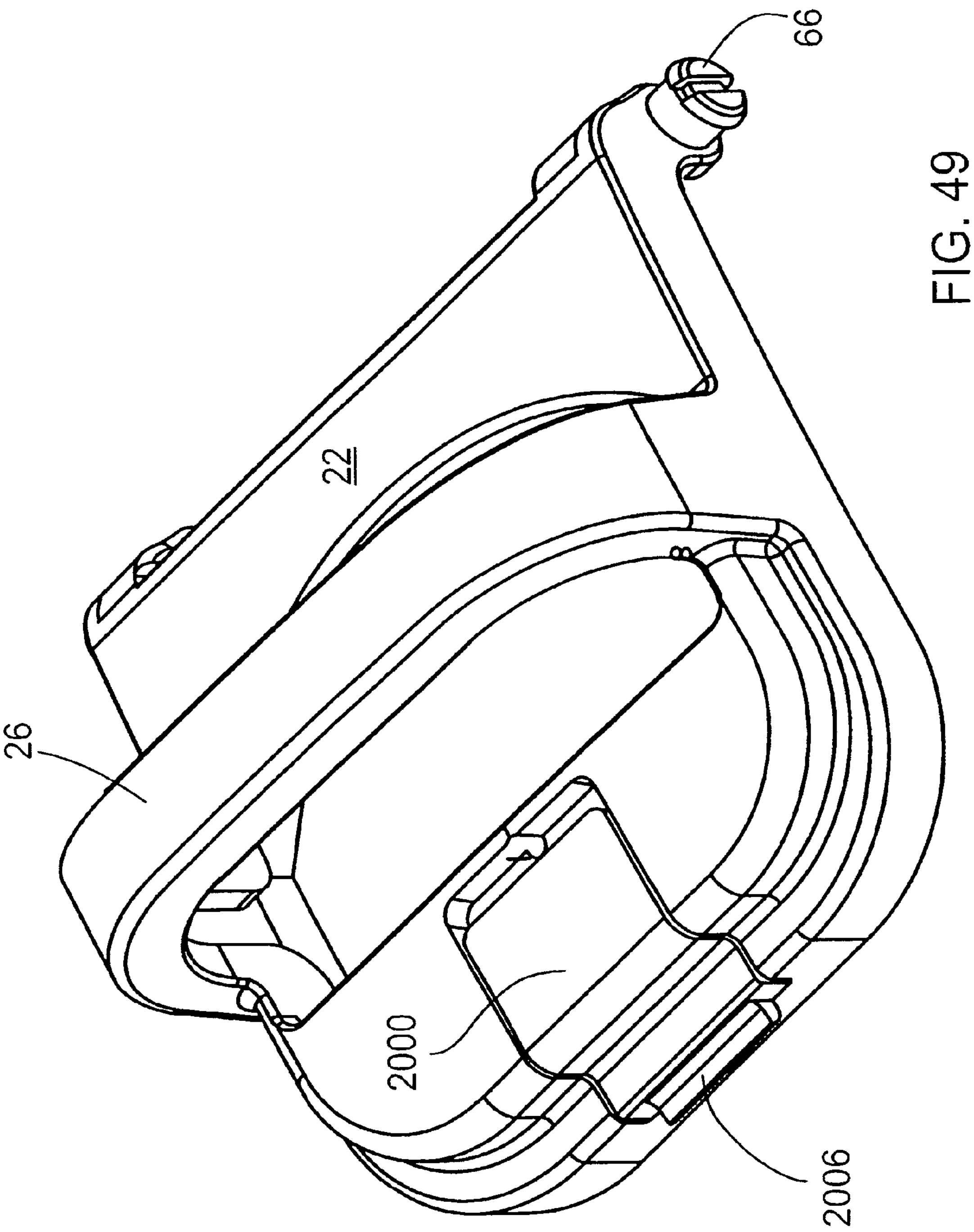
FIG. 49 is a top perspective of the latch and the latch locking mechanism of the container in FIG. 35 taken from the front.
Figure 50:
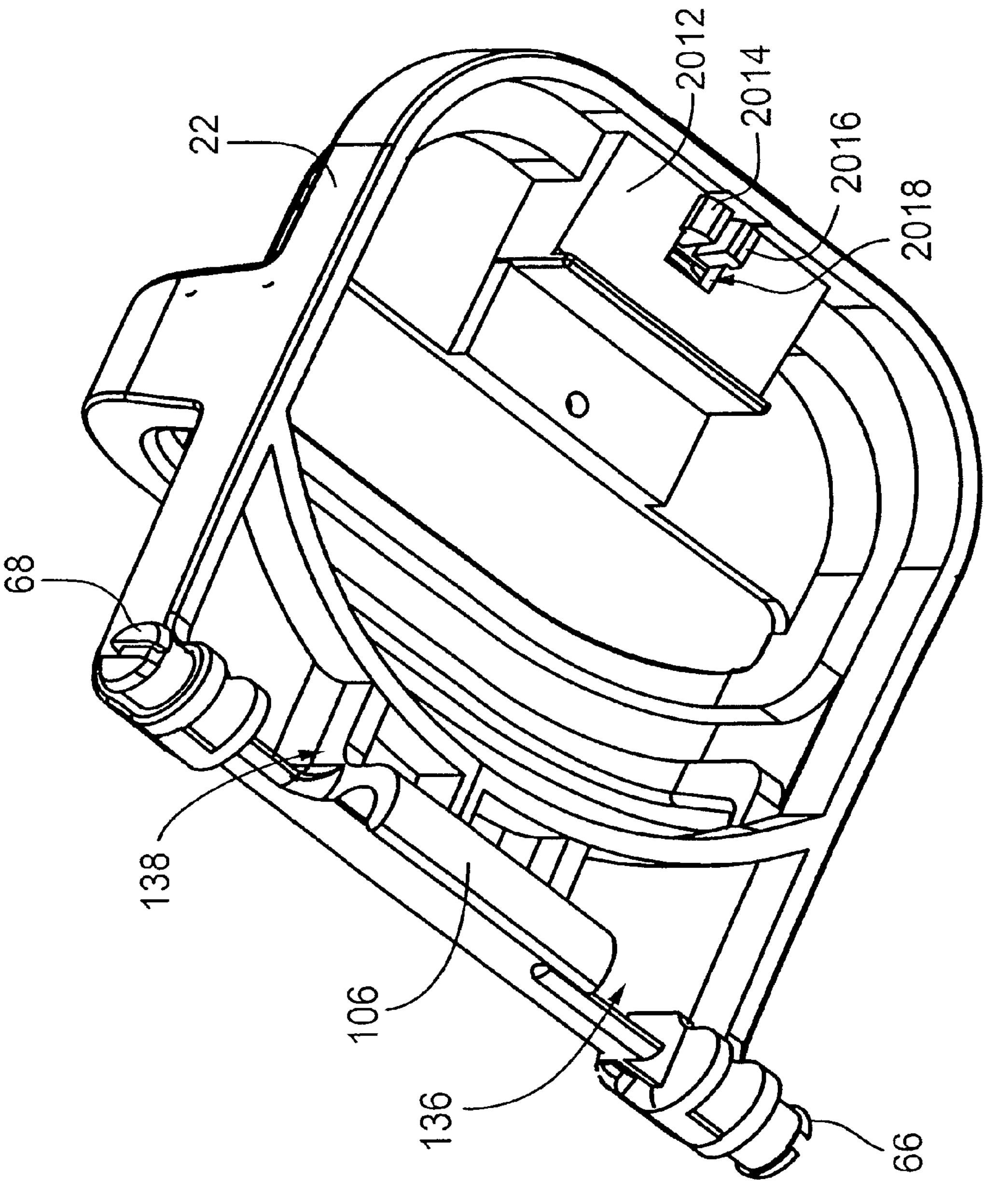
FIG. 50 is a bottom perspective view of the latch and the latch locking mechanism of the container in FIG. 35, taken from the rear.
Figure 51:
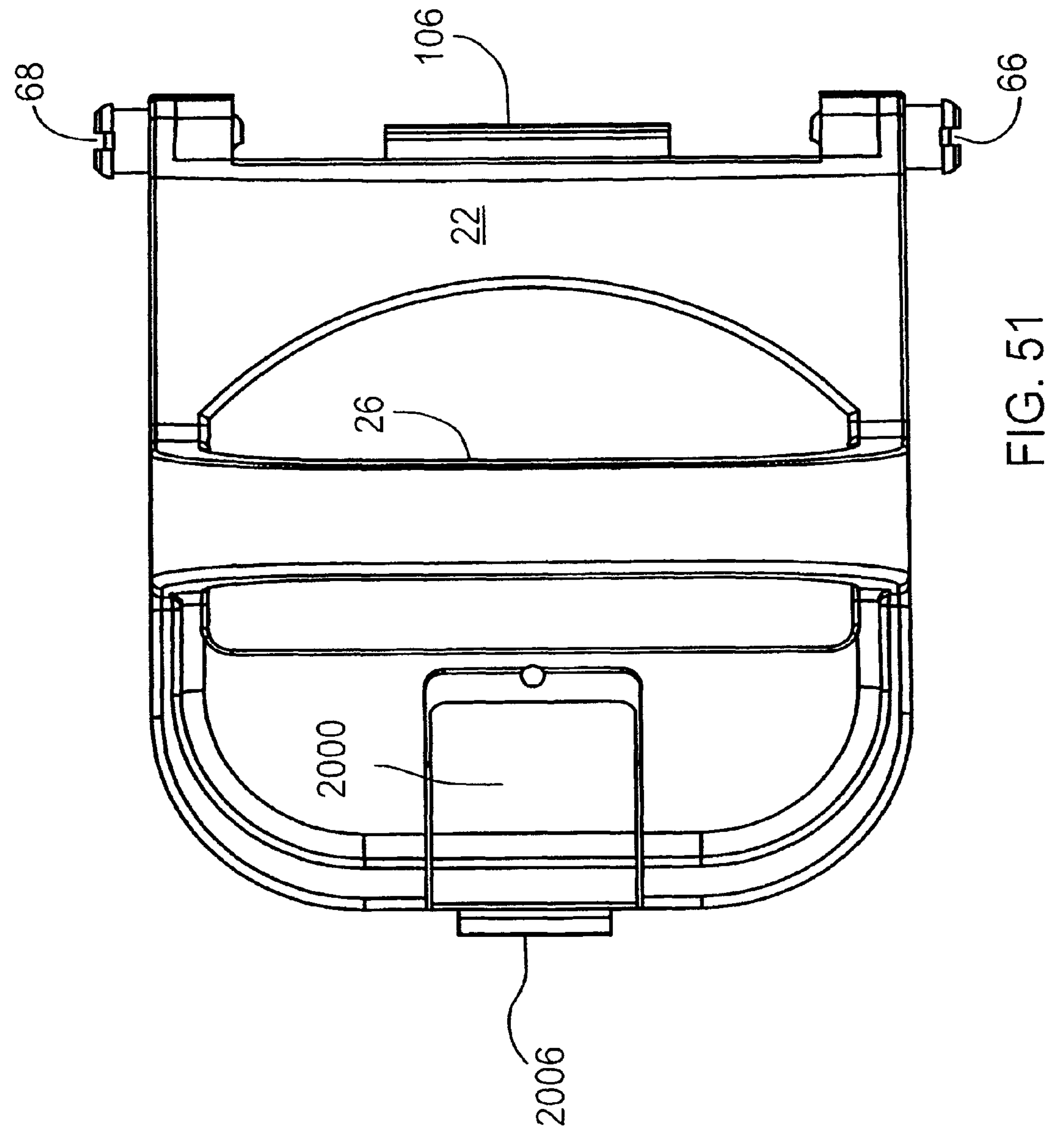
FIG. 51 is a top plan view of the latch and the latch locking mechanism of the container in FIG. 35.

Referring to FIGS. 15 to 17 for the first embodiment and FIGS. 49 to 51 for the third embodiment, the latch 22 includes a handle 26. The latch 22 is moveable between a locked lid position (see FIG. 10 for the first embodiment, and FIG. 44 for the third embodiment) and an unlocked lid position (see FIGS. 12, 13, and 14 for the first embodiment, and FIGS. 46, 47, and 51 for the third embodiment). When in the locked lid position, the latch 22 is locked to the bin 16. When in the unlocked lid position, the latch 22 is unlocked relative to the bin 16. The detent 24 acts between the bin 16 and the lid 18. Further, the detent 24 co-operates with the latch 22. In one respect, the detent 24 co-operates with the latch 22 so as to effect locking of the lid 18 to the bin 16 when the latch 22 is in the locked lid position. In another respect, the detent 24 cooperates with the latch 22 so as to permit movement of the lid 18, relative to the bin 16, from the closed position to the open position when the latch 22 is in the unlocked lid position relative to the bin.

The latch 22 is configured to move from the locked lid position (see FIG. 10 for the first embodiment, and FIG. 44 for the third embodiment) to the unlocked lid position (see FIG. 12 for the first embodiment, and FIG. 46 for the third embodiment) in response to an application of an unlocking force 500 to the handle 26. When the latch 22 is disposed in the unlocked lid position, and the lid 18 is disposed in the closed position, the lid 18 is configured to move from the closed position (see FIG. 12 for the first embodiment, and FIG. 46 for the third embodiment) to the open position (see FIG. 14 for the first embodiment, and FIG. 48 for the third embodiment) in response to an application of a lid-opening force 502 to the handle 26.

For example, with respect to the handle 26, the handle 26 is configured for grasping by a human operator and effecting translation of a force applied by the human operator into movement of the latch 22.

For example, the latch 22 includes a detent co-operator 106. When the latch 22 is disposed in the locked lid position, the detent co-operator 106 is disposed relative to the detent 24 such that the detent 24 interferes with movement of the detent co-operator 106 along a 17 vertical axis and thereby resists movement of the lid 18 from the closed position to the open position. For example, with respect to the detent 24, the rim 28 includes a slot 202 configured to receive the detent co-operator 106 when the latch 22 is disposed in the locked lid position in order to enable the detent co-operator to be disposed relative to the detent 24 such that the detent 24 interferes with movement of the detent co-operator 106 along a vertical axis and thereby resists movement of the lid 18 from the closed position to the open position.

For example, when the latch 22 is coupled to the lid 18 and the detent 24 is disposed on the bin 16, in order to facilitate co-operation between the latch 22 and the detent 24 so as to facilitate locking and unlocking of the lid 18 relative to the bin 16, the lid 18 includes a detent receiving slot or aperture 142 through which extends the detent 24 of the bin 16 (see FIGS. 23, 24, 27, 28, and 29 for the first embodiment, and FIGS. 57, 58, 61, 62 and 63 for the third embodiment).

(A) Refuse Container with Latch Mechanism which Requires Separate Actions to Effect Unlocking and Opening of Lid Referring in particular to FIGS. 10, 12, 13, and 14 for the first embodiment and FIGS. 44, 46, 47, and 51 for the third embodiment, in one aspect, there is provided a refuse container 10, as described above, wherein the latch 22 requires separate actions to effect unlocking and opening of lid 18.

In this respect, there is provided the refuse container 10 including a container assembly and a locking mechanism.

The container assembly includes the bin 16 and the lid 18. The bin 16 defines the cavity 20. The lid is rotatably coupled to the bin 16, and configured for movement, relative to the bin 16, between an open position providing access to the cavity 20 and a closed position inhibiting access to the cavity 20.

The locking mechanism includes the latch 22 and the detent 24. The latch 22 includes the handle 26, and is moveable between a locked lid position and an unlocked lid position. The detent 24 acts between the bin 16 and the lid 18. The detent 24 co-operates with the latch 24 so as to effect locking of the lid 18 to the bin 16 when the latch 22 is in the locked 18 lid position, and permit movement of the lid 18, relative to the bin 16, from the closed position to the open position when the latch 22 is in the unlocked lid position.

The latch 22 is configured to move from the locked lid position to the unlocked lid position in response to application of an unlocking force to the handle 26. When the latch 22 is disposed in the unlocked lid position and the lid 18 is disposed in the closed position, the lid 18 is configured to move from the closed position to the open position in response to an application of a lid-opening force to the handle 26.

In one configuration, the unlocking force includes a horizontal component and a vertical component, and the lid-opening force includes a horizontal component and a vertical component. The direction of the horizontal component of the lid-opening force is disposed at an angle of between about 90 degrees and about 270 degrees in a clockwise direction about a vertical axis and relative to the direction of the horizontal component of the unlocking force.

In another configuration, the unlocking force includes a horizontal component and a vertical component, and the lid-opening force includes a horizontal component and a vertical component. The direction of the horizontal component of the lid-opening force is substantially opposite to the direction of the horizontal component of the unlocking force.

In yet another configuration, the unlocking force effects rotation of the latch 22 in one of a clockwise or counter clockwise direction, and the lid-opening force effects rotation of the latch 22 in the other one of a clockwise or a counter clockwise direction relative to the same frame of reference as the direction of the unlocking force.

For example, in moving from the locked lid position to the unlocked lid position, the latch 22 rotates, relative to the container assembly, about a latch rotation axis 80. The latch rotation axis 80 and the longitudinal axis 82 of the detent 24 are substantially co-located (see FIGS. 11, 12, and 13 for the first embodiment, and FIGS. 45, 46, and 47 for the third embodiment). For example, the latch 22 includes the pair of pins 66, 68 disposed on opposite sides of the latch 22, wherein the axis joining the pins 66, 68 is substantially co-located with the axis 82 of the detent. Each one of the pins 66, 68 is received within a respective one of latch apertures 70, 72 provided in the surface of the container assembly 12. In this respect, the latch 22 is snap-fit into the latch apertures 70, 72.

For example, when the latch 22 is disposed in the locked lid position, the latch 22 is disposed in a cavity 84 provided in the container assembly. For example, the latch 22 is coupled to the lid 18, and the cavity 84 is provided in the lid 18, and the detent is disposed on the bin 16 (see FIGS. 23, 25, 27, and 29 for the first embodiment, and FIGS. 57, 59, 61, and 63 for the third embodiment).

For example, the cavity 84 includes a recessed surface which functions as a seating surface 86, and when the latch 22 is disposed in the locked lid position, the latch 22 is seated or supported on the seating surface 86. For example, with respect to the coupling of the latch 22 to the lid 18, the latch 22 includes the pair of pins 66, 68 disposed on opposite sides of the latch 22. Each one of the pins 66, 68 is received within a respective one of the latch apertures 70, 72 provided in a surface of the cavity 84. In this respect, the latch 22 is snap-fit into the latch apertures 70, 72 of the cavity 84, and thereby effecting rotatable coupling of the latch 22 to the lid 18. To assist in retaining coupling of the latch 22 within the cavity 84, the lid 18 includes latch retainer 129. The latch retainer 129 co-operates with the latch 22 for limiting or interfering with displacement of the latch 22 along the axis 134 extending through the latch apertures 70, 72.

In this respect, the latch 22 is slotted such that the latch 22 receives the latch retainer 129 (see FIGS. 23 and 27 for the first embodiment, and FIGS. 57 and 61 for the third embodiment) and the latch retainer 129 thereby limits or interferes with displacement of the latch 22 along the axis 134 extending through the latch apertures 70, 72.

Referring to FIGS. 16, 27, 29, and 31 for the first embodiment and FIGS. 50, 61, 63, and 65 for the third embodiment, for example, the latch retainer 129 includes latch retainer tabs 130, 132, and the latch 22 includes slots 136, 138, wherein each of the slots 136, 138 receives a respect one of the latch retainer tabs 130, 132 for limiting or interfering with displacement of the latch 22 along the axis 134 extending through the latch apertures 70, 72. To spatially accommodate the latch retainer tabs 130, 132, the detent receiving aperture 142 is disposed between the latch retainer tabs 130, 132, and the detent co-operator 106 is also disposed between the latch retainer tabs 130, 132, thereby permitting assumption of the locked and the unlocked lid positions by the latch 22.

Referring to FIGS. 11, 12, 13, 16, and 17 for the first embodiment and FIGS. 45, 46, 47, 50, and 51 for the third embodiment, for example, the latch 22 includes the detent cooperator 106. When the latch 22 is disposed in the locked lid position, the detent co-operator 106 is disposed relative to the detent 24 such that the detent 24 interferes with movement of the detent co-operator 106 along a vertical axis and thereby resists movement of the lid 18 from the closed position to the open position.

For example, when the latch 22 is coupled to the lid 18 and the detent 24 is disposed on the bin 16, in order to facilitate co-operation between the latch 22 and the detent 24 so as to facilitate locking and unlocking of the lid 18 relative to the bin 16, the lid 18 includes the detent receiving slot or aperture 142 through which extends the detent 24 of the bin 16 (see FIGS. 23, 24, 27, 28, and 29 for the first embodiment, and FIGS. 57, 58, 61, 62, and 63 for the third embodiment).

For example, when the latch 22 is disposed in the unlocked lid position and the lid 18 is disposed in the closed position, the latch 22 is moveable to an unlocked indication position (see FIG. 13 for the first embodiment, and FIG. 47 for the third embodiment) wherein the latch 22 is locked to the container assembly 12 such that the latch 22 extends peripherally of the container assembly 12 and thereby provides a visual indication that the latch 22 is in the unlocked lid position.

For example, the latch 22 extends vertically above the container assembly 12 when disposed in the unlocked indication position. For example, when disposed in the unlocked indication position, the latch 22 extends beyond the perimeter of the container assembly 12 by at least two (2) inches.

For example, when disposed in the unlocked indication position, the latch 22 extends beyond the perimeter of the container assembly 12 by at least four (4) inches.

For example, when disposed in the unlocked indication position, the latch 22 presents a side surface area of at least four (4) square inches.

For example, the presented side surface area is eight (8) square inches.

For example, the container assembly 12 is configured to define a latch receiving slotted surface 102 configured for receiving the latch 22 in an interference fit relationship when the latch 22 assumes the unlocked indication position.

For example, the latch 22 is coupled to the lid 18, and the lid is configured to define the latch receiving slotted surface 102.

Figure 27:
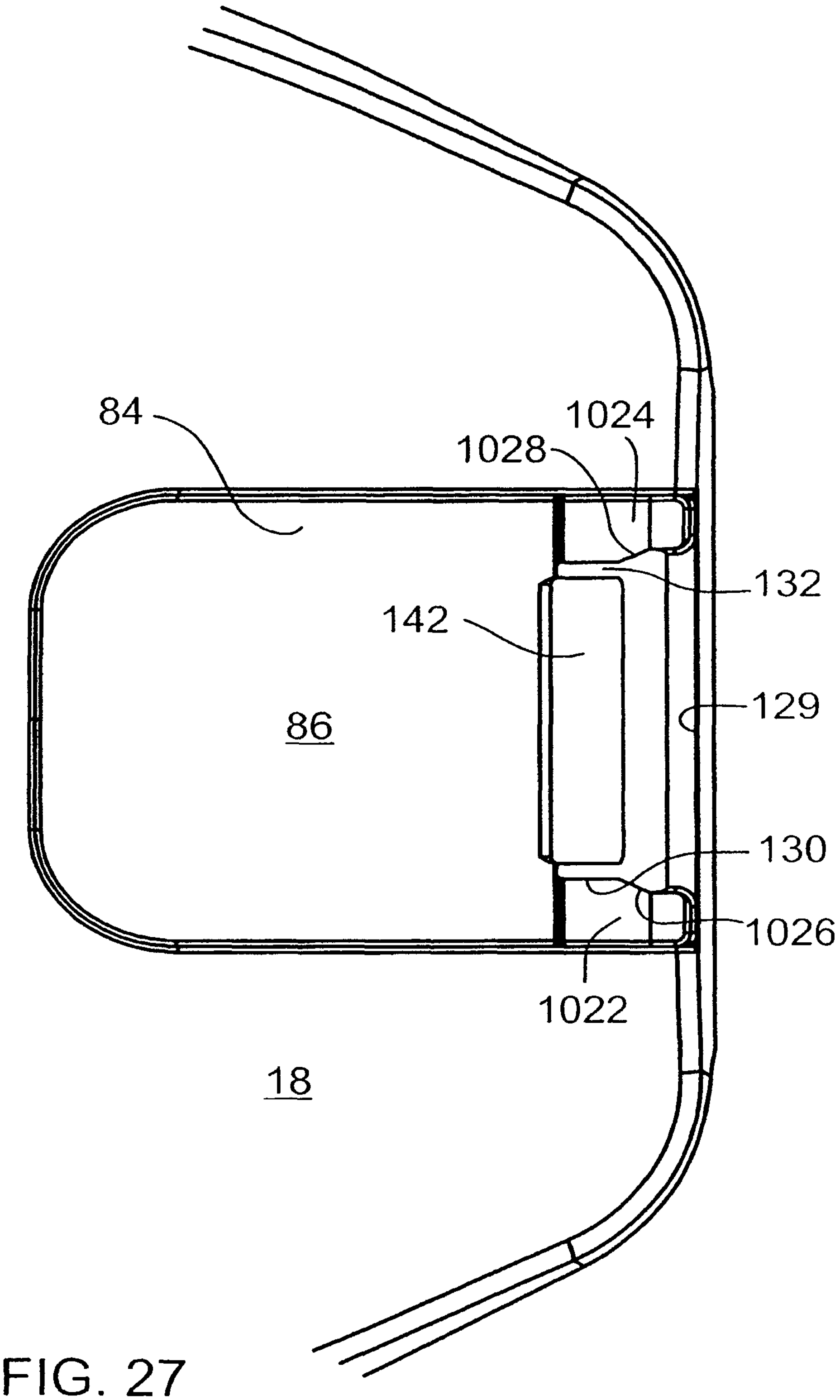
FIG. 27 is a top plan view of a front detail of the lid of the container in FIG. 1.
Figure 61:
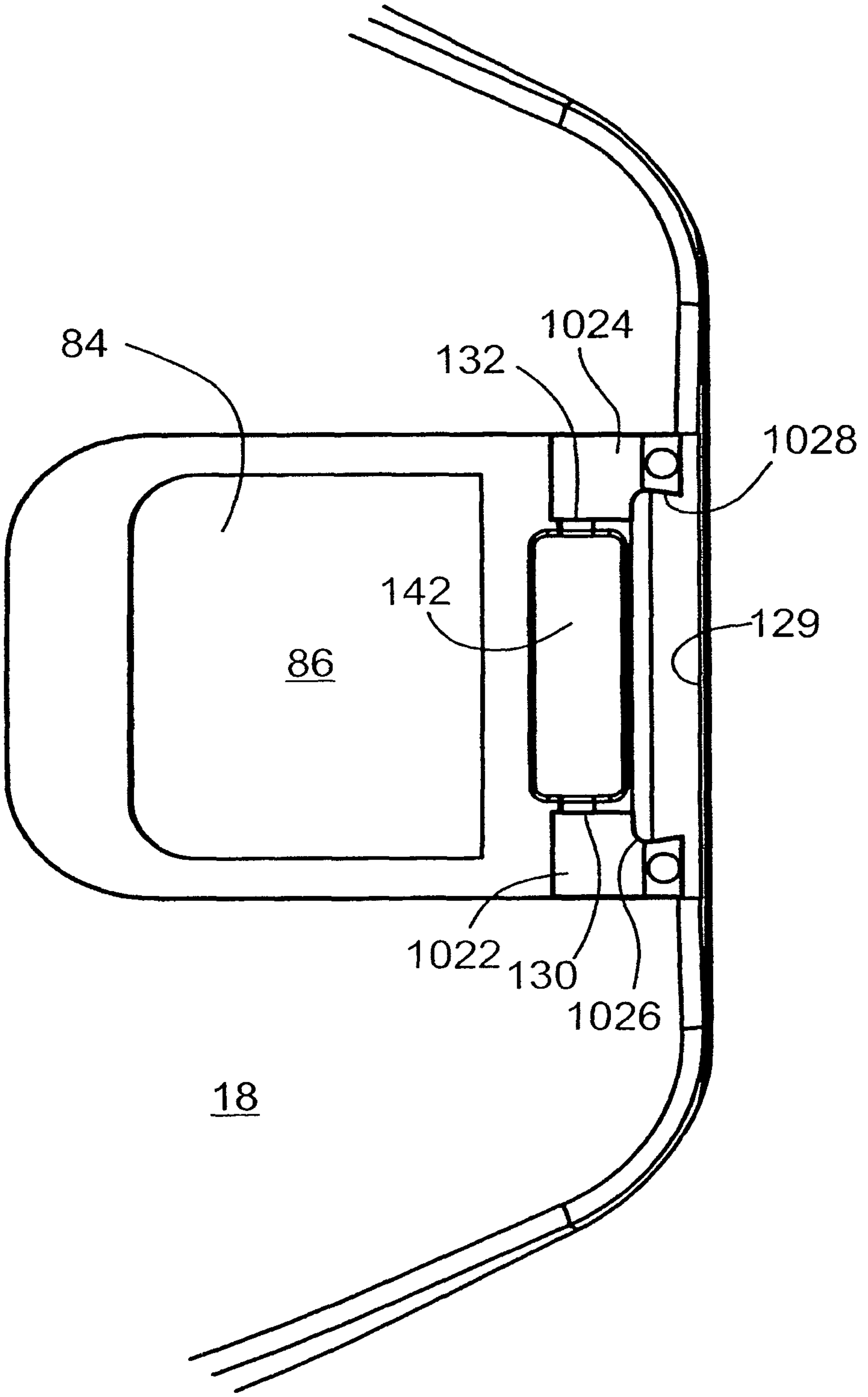
FIG. 61 is a top plan view of a front detail of the lid of the container in FIG. 35.

Referring to FIG. 27 for the first embodiment and FIG. 61 for the third embodiment, for example, the latch receiving slotted surface 102 includes a pair of latch receiving slots 1022, 1024. Each one of the slots 1022, 1024 is defined in part by a respective one of leading wedges 1026, 1028. As the latch 22 enters each one of the slots 1022, 1024, the latch 22 engages each one of the leading wedges 1026, 1028 which urge the latch 22 into an interference fit relationship with a respective one of narrow channels 1030, 1032.

Figure 11:
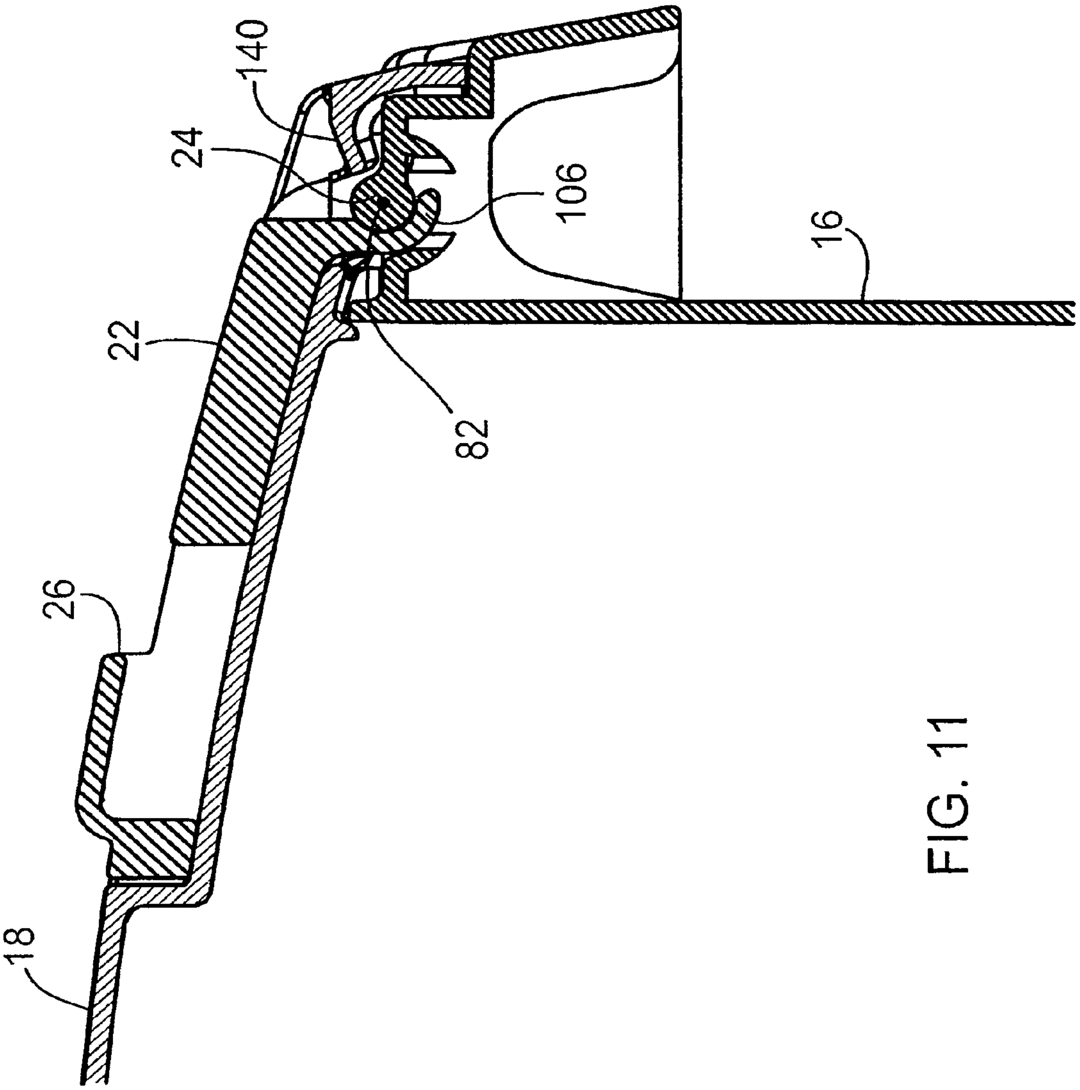
FIG. 11 is front detail of the sectional side elevation view in FIG. 10.
Figure 45:
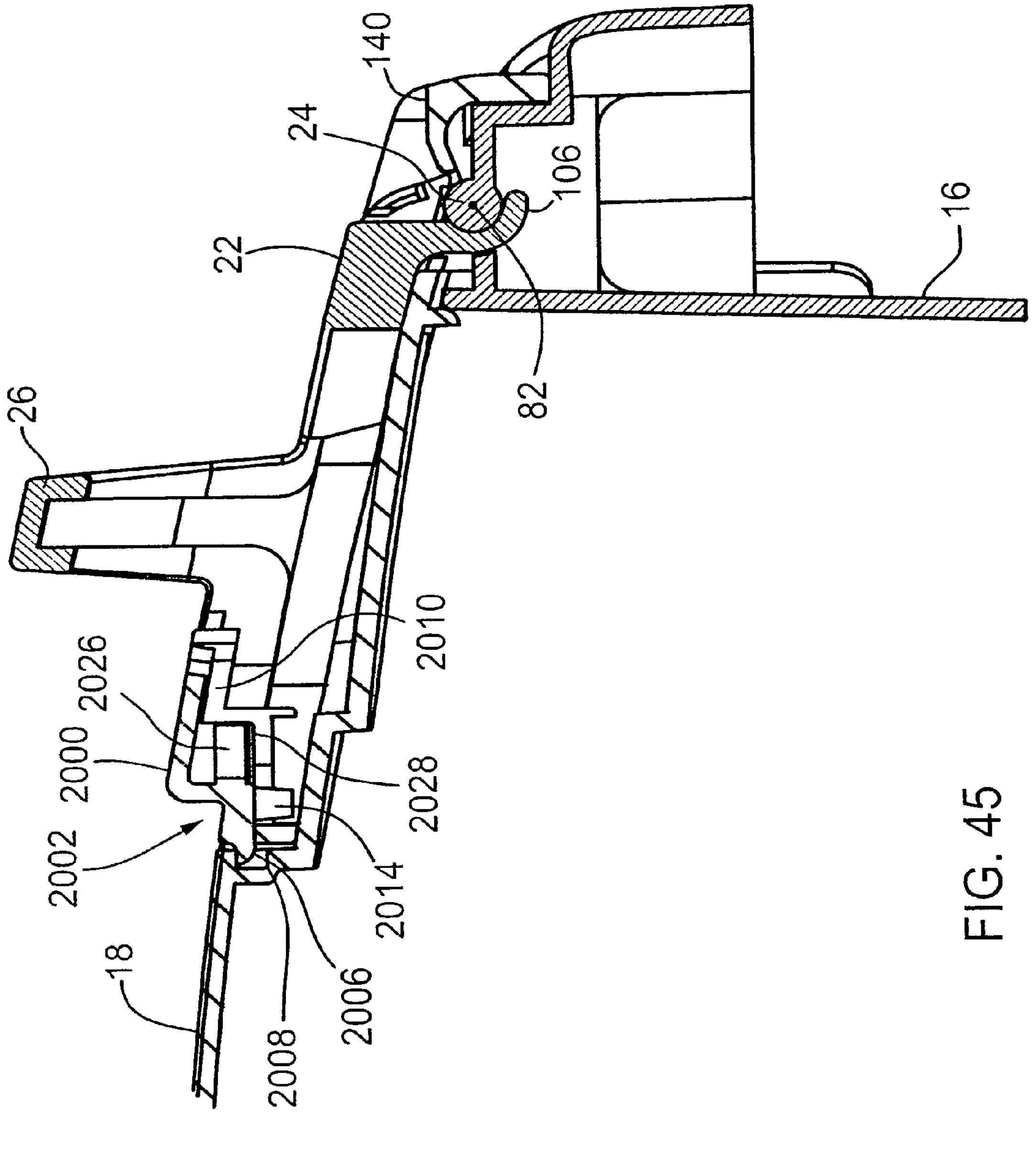
FIG. 45 is front detail of the sectional side elevation view in FIG. 44.

For example, the lid 18 includes a stop 140 to interfere with movement of the latch 22 further past the receiving slots 1022, 1024 (see FIGS. 11, 12, and 13 for the first embodiment, and FIGS. 45, 46, and 47 for the third embodiment).

For example, each one of the latch retainer tabs 130, 132 assists in defining a respective one of the slots 1022, 1024.

(B) Refuse Container with Latch which Rotates about an Axis which is Substantially Co-Located with Detent Axis Referring to FIGS. 11, 12, and 13 for the first embodiment and FIGS. 45, 46, and 47 for the third embodiment, in another aspect, there is provided a refuse container 10, as described above, wherein the latch 22 is configured to rotate about an axis 80 which is substantially co-located with the longitudinal axis 82 of the detent 24.

In this respect, there is provided the refuse container 10 including a container assembly and a locking mechanism.

The container assembly includes the bin 16 and the lid 18. The bin 16 defines the cavity 20. The lid is rotatably coupled to the bin 16, and configured for movement, relative to the bin 16, between an open position providing access to the cavity 20 and a closed position inhibiting access to the cavity 20.

The locking mechanism includes the latch 22 and the detent 24. The latch 22 includes the handle 26, and is moveable between a locked lid position and an unlocked lid position. The detent 24 acts between the bin 16 and the lid 18. The detent 24 co-operates with the latch 24 so as to effect locking of the lid 18 to the bin 16 when the latch 22 is in the locked lid position, and permit movement of the lid 18, relative to the bin 16, from the closed position to the open position when the latch 22 is in the unlocked lid position.

The latch 22 is configured to move from the locked lid position to the unlocked lid position in response to application of an unlocking force to the handle 26. When the latch 22 is disposed in the unlocked lid position and the lid 18 is disposed in the closed position, the lid 18 is configured to move from the closed position to the open position in response to an application of a lid-opening force to the handle 26.

In moving from the locked lid position to the unlocked lid position, the latch 22 rotates, relative to the container assembly, about the latch rotation axis 80. The latch rotation axis 80 and the longitudinal axis 82 of the detent 24 are substantially co-located. For example, the latch 22 includes the pair of pins 66, 68 disposed on opposite sides of the latch 22, wherein the axis joining the pins 66, 68 is substantially co-located with the axis 82 of the detent. Each one of the pins 66, 68 is received within a respective one of latch apertures 70, 72 provided in the surface of the container assembly 12. In this respect, the latch 22 is snap-fit into the latch apertures 70, 72.

(C) Refuse Container with Latch Seated in a Cavity when the Latch is in the Locked Lid Position Referring to FIGS. 1, 5, 6, 7, 8, 23, 25, 27, and 29 for the first embodiment and FIGS. 35, 39, 40, 41, 42, 57, 59, and 63 for the third embodiment, in another aspect, there is provided a refuse container 10, as described above, wherein, when the latch 22 is in the locked lid position, the latch 22 is seated in a cavity 84 provided within the container assembly 12.

In this respect, there is provided the refuse container 10 including a container assembly and a locking mechanism.

The container assembly includes the bin 16 and the lid 18. The bin 16 defines the cavity 20. The lid is rotatably coupled to the bin 16, and configured for movement, relative to the bin 16, between an open position providing access to the cavity 20 and a closed position inhibiting access to the cavity 20.

The locking mechanism includes the latch 22 and the detent 24. The latch 22 includes the handle 26, and is moveable between a locked lid position and an unlocked lid position. The detent 24 acts between the bin 16 and the lid 18. The detent 24 co-operates with the latch 24 so as to effect locking of the lid 18 to the bin 16 when the latch 22 is in the locked lid position, and permit movement of the lid 18, relative to the bin 16, from the closed position to the open position when the latch 22 is in the unlocked lid position.

The latch 22 is configured to move from the locked lid position to the unlocked lid position in response to application of an unlocking force to the handle 26. When the latch 22 is disposed in the unlocked lid position and the lid 18 is disposed in the closed position, the lid 18 is configured to move from the closed position to the open position in response to an application of a lid-opening force to the handle 26.

When the latch 22 is disposed in the locked lid position, the latch 22 is disposed in the cavity 84 provided in the container assembly 12. For example, when the latch 22 is disposed in the locked lid position, at least a portion of the latch 22 is substantially flush with respect to adjacent surfaces of the container assembly 12.

For example, the latch 22 is coupled to the lid 18, and the cavity 84 is provided in the lid 18, and the detent 24 is disposed on the bin 16. For example, the cavity 84 includes the recessed surface which functions as the seating surface 86, and when the latch 22 is disposed in the locked lid position, the latch 22 is seated or supported on the seating surface 86. In order to effect co-operation between the latch 22 and the detent 24 to facilitate locking and unlocking of the lid 18 relative to the bin 16, the lid 18 includes the detent receiving aperture 142 through which extends the detent 24 of the bin 16. For example, the latch 22 includes the detent cooperator 106. When the latch 22 is disposed in the locked lid position, the detent co-operator 106 is disposed relative to the detent 24 such that the detent 24 interferes with movement of the detent co-operator 106 along a vertical axis and thereby resists movement of the lid 18 from the closed position to the open position.

Referring to FIGS. 15, 16, 17, 23, 27, 29 and 31 for the first embodiment and FIGS. 49, 50, 51, 57, 61, 63, and 65 for the third embodiment, to assist in retaining coupling of the latch 22 within the cavity 84, the lid 18 includes the latch retainer 129. The latch retainer 129 co-operates with the latch 22 for limiting or interfering with displacement of the latch 22 along the axis 134 extending through the latch apertures 70, 72. In this respect, the latch 22 is slotted such that the latch 22 receives the latch retainer 129 and the latch retainer 129 thereby limits or interferes with displacement of the latch 22 along the axis 134 extending through the latch apertures 70, 72. For example, the latch retainer 129 includes the latch retainer tabs 130, 132, and the latch 22 includes the slots 136, 138, wherein each of the slots 136, 138 receives a respect one of the latch retainer tabs 130, 132 for limiting or interfering with displacement of the latch 22 along the axis 134 extending through the latch apertures 70, 72. To spatially accommodate the latch retainer tabs 130, 132, the detent receiving aperture 142 is disposed between the latch retainer tabs 130, 132, and the detent co-operator 106 is also disposed between the latch retainer tabs 130, 132, thereby permitting assumption of the locked and the unlocked lid positions by the latch 22.

(D) Refuse Container with Latch which is Moveable into an Unlocked Indication Position.

Referring to FIG. 13 in the first embodiment and FIG. 47 for the third embodiment, in another aspect, there is provided a refuse container 10, as described above, wherein the latch 22 is moveable into an unlocked indication position. In this respect, there is provided the refuse container 10 including a container assembly and a locking mechanism.

The container assembly includes the bin 16 and the lid 18. The bin 16 defines the cavity 20. The lid is rotatably coupled to the bin 16, and configured for movement, relative to the bin 16, between an open position providing access to the cavity 20 and a closed position inhibiting access to the cavity 20.

The locking mechanism includes the latch 22 and the detent 24. The latch 22 includes the handle 26, and is moveable between a locked lid position and an unlocked lid position. The detent 24 acts between the bin 16 and the lid 18. The detent 24 co-operates with the latch 24 so as to effect locking of the lid 18 to the bin 16 when the latch 22 is in the locked lid position, and permit movement of the lid 18, relative to the bin 16, from the closed position to the open position when the latch 22 is in the unlocked lid position.

The latch 22 is configured to move from the locked lid position to the unlocked lid position in response to application of an unlocking force to the handle 26. When the latch 22 disposed in the unlocked lid position and the lid 18 is disposed in the closed position, the lid 18 is configured to move from the closed position to the open position in response to an application of a lid-opening force to the handle 26.

When the latch 22 is disposed in the unlocked lid position and the lid 18 is disposed in the closed position, the latch 22 is moveable to the unlocked indication position wherein the latch 22 is locked to the container assembly 12 such that the latch 22 extends peripherally of the container assembly 12 and thereby provides a visual indication that the latch 22 is in the unlocked lid position. For example, the latch 22 extends vertically above the container assembly 12 when disposed in the unlocked indication position. For example, when disposed in the unlocked indication position, the latch 22 extends beyond the perimeter of the container assembly 12 by at least two (2) inches. For example, when disposed in the unlocked indication position, the latch 22 extends beyond the perimeter of the container assembly 12 by at least four (4) inches. For example, when disposed in the unlocked indication position, the latch 22 presents a side surface area of at least four (4) square inches. For example, the presented side surface area is eight (8) square inches.

For example, the container assembly 12 is configured to define the latch receiving slotted surface 102 configured for receiving the latch 22 in an interference fit relationship then the latch 22 assumes the unlocked indication position.

Referring to FIG. 27 in the first embodiment and FIG. 61 for the third embodiment, for example, the latch 22 is coupled to the lid 18, and the lid is configured to define the latch receiving slotted surface 102. For example, the latch receiving slotted surface 102 includes the pair of latch receiving slots 1022, 1024. Each one of the slots 1022, 1024 is defined in part by the respective one of leading wedges 1026, 1028. As the latch 22 enters each one of the slots 1022, 1024, the latch 22 engages each one of the leading wedges 1026, 1028 which urge the latch 22 into an interference fit relationship with a respective one of narrow channels 1030, 1032. The lid includes the stop 140 to interfere with movement of the latch further past the receiving slots 1022, 1024. For example, each one of the latch retainer tabs 130, 132 assists in defining a respective one of the slots 1022, 1024

(E) Refuse Container with Detent Disposed so as to Mitigate Interference with Discharge of Contents from Cavity In another aspect, there is provided a refuse container 10, as described above, wherein the detent is disposed so as to mitigate interference with the discharge of contents from the cavity 20.

In this respect, there is provided the refuse container 10 including the container assembly 12 and the locking mechanism 14.

Figure 18:
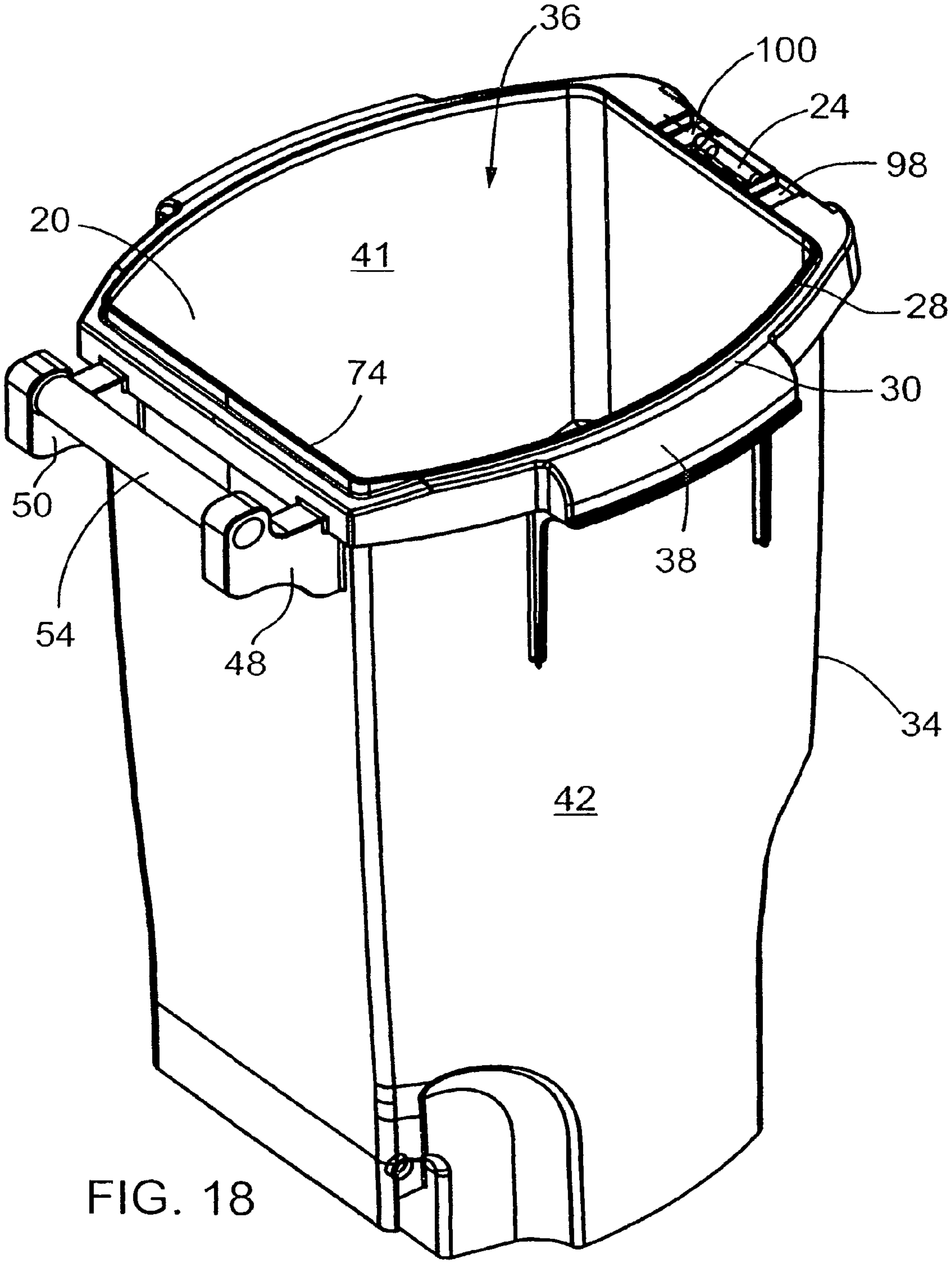
FIG. 18 is a top perspective view of the bin of the container in FIG. 1, taken from the rear.
Figure 20:
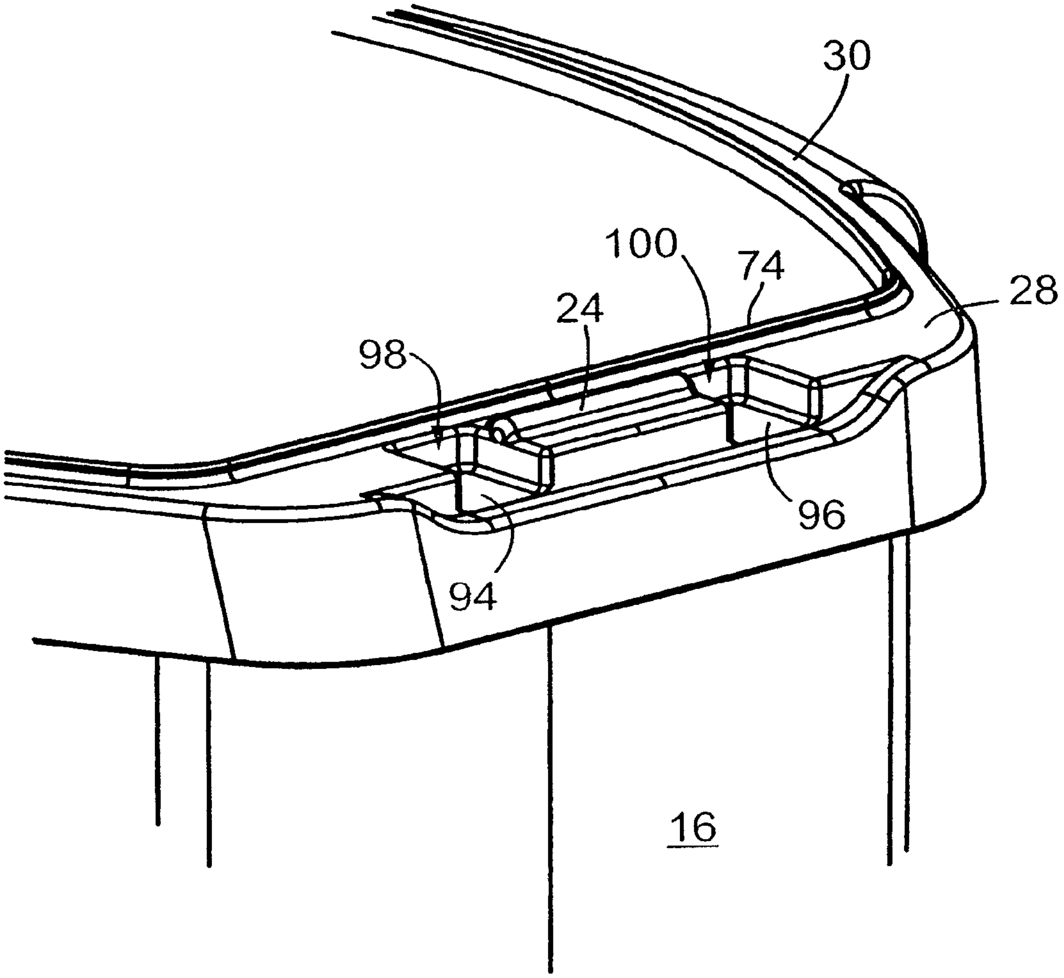
FIG. 20 is a top perspective view of a front detail of the bin of the container in FIG. 1, taken from the front.
Figure 52:
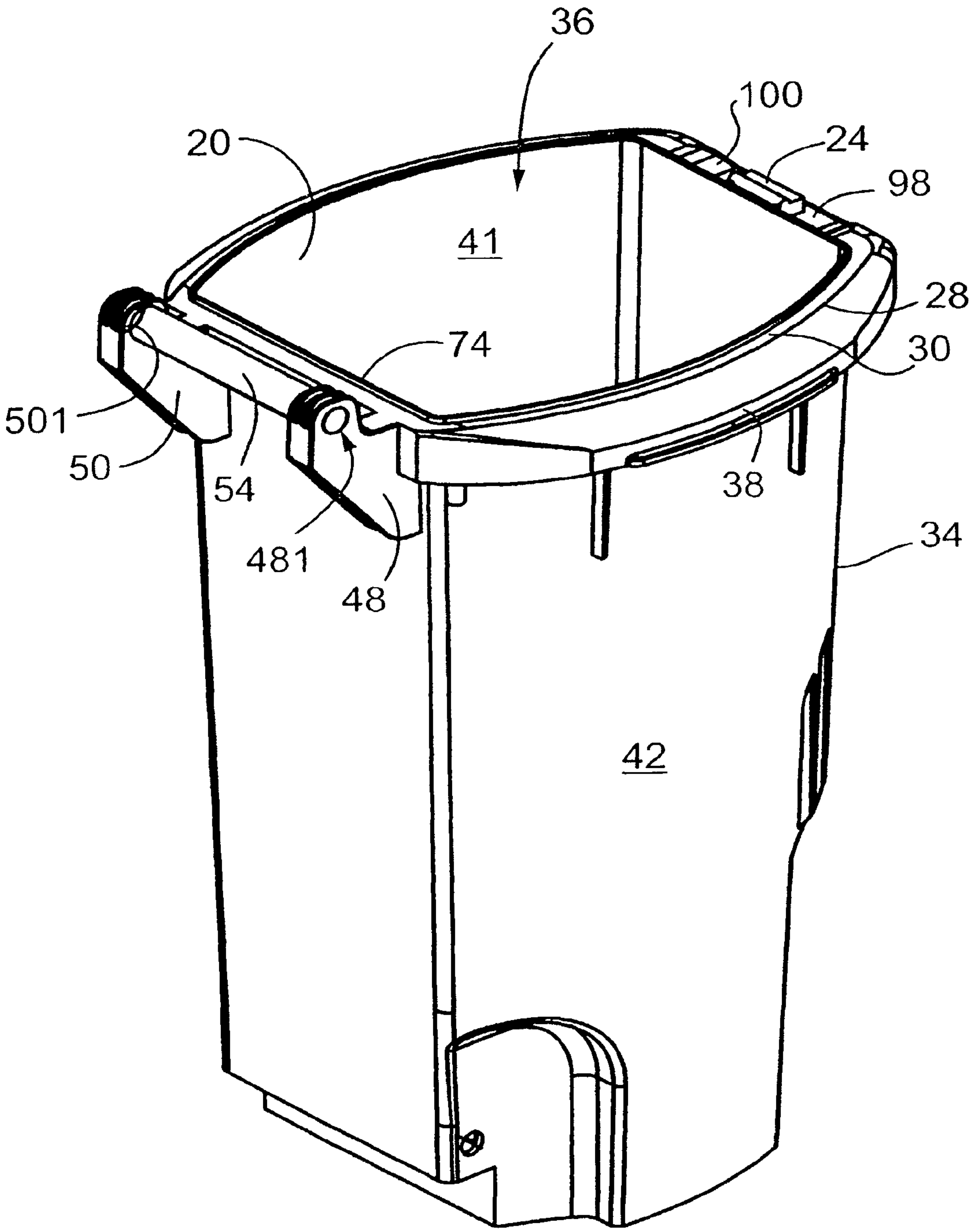
FIG. 52 is a top perspective view of the bin of the container in FIG. 35, taken from the rear.
Figure 54:
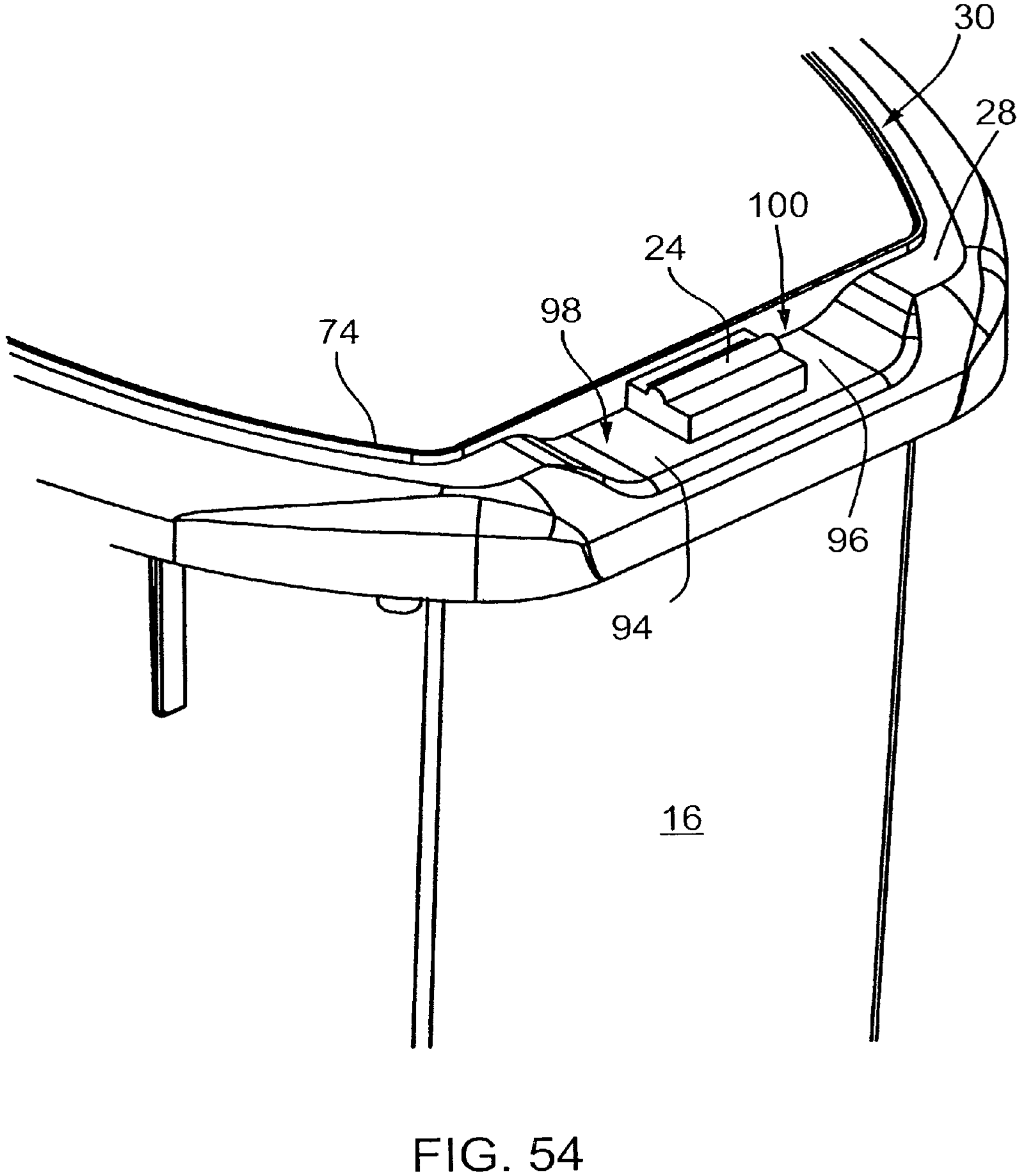
FIG. 54 is a top perspective view of a front detail of the bin of the container in FIG. 35, taken from the front.

Referring to FIGS. 18 and 20 for the first embodiment and FIGS. 52 and 54 for the third embodiment, the container assembly 12 includes the bin 16 and the lid 18. The bin 16 defines the cavity 20. The bin 16 also includes the lip 74 defining an opening to the cavity 20, and a rim 28 extending peripherally about the lip 74. The lid 18 is rotatably coupled to the bin 16, and configured for movement, relative to the bin 16, between an open position providing access to the cavity 20 and a closed position inhibiting access to the cavity 20.

The locking mechanism 14 includes the latch 22 and the detent 24. The latch 22 is coupled to the lid 18. The latch 22 includes the handle 26, and is moveable between a locked lid position and an unlocked lid position. The detent 24 acts between the bin 16 and the lid 18 The detent 24 co-operates with the latch 24 so as to effect locking of the lid 18 to the bin 16 when the latch 22 is in the locked lid position, and permit movement of the lid 18, relative to the bin 16, from the closed position to the open position when the latch 22 is in the unlocked lid position. The detent 24 extends upwardly from the rim 28 and is disposed below the lip 74. For example, the detent 24 is disposed below the lip 74.

The latch 22 is configured to move from the locked lid position to the unlocked lid position in response to application of an unlocking force to the handle 26. When the latch 22 is disposed in the unlocked lid position and the lid 18 is disposed in the closed position, the lid 18 is configured to move from the closed position to the open position in response to an application of a lid-opening force to the handle 26.

(F) Refuse Container with Guard for Reducing Fouling of Locking Mechanism

In another aspect, there is provided a refuse container 10, as described above, wherein a fouling guard 104 is provided for reducing fouling of the locking mechanism 14.

In this respect, there is provided the refuse container 10 including a container assembly and a locking mechanism.

The container assembly includes the bin 16 and the lid 18. The bin 16 defines the cavity 20. The bin 16 also includes the lip 74 defining an opening to the cavity 20, and a rim 28 extending peripherally about the lip 74. The lid 18 is rotatably coupled to the bin 16, and configured for movement, relative to the bin 16, between an open position providing access to the cavity 20 and a closed position inhibiting access to the cavity 20.

The locking mechanism includes the latch 22 and the detent 24. The latch 22 includes the handle 26 and a detent co-operator 106, and is moveable between a locked lid position and an unlocked lid position. The latch 22 is coupled to the lid 18 The detent 24 acts between the bin 16 and the lid 18. The detent 24 co-operates with the latch 24 so as to effect locking of the lid 18 to the bin 16 when the latch 22 is in the locked lid position, and permit movement of the lid 18, relative to the bin 16, from the closed position to the open position when the latch 22 is in the unlocked lid position. The detent 24 extends upwardly from the rim 28.

The latch 22 is configured to move from the locked lid position to the unlocked lid position in response to application of an unlocking force to the handle 26. When the latch 22 is disposed in the unlocked lid position and the lid 18 is disposed in the closed position, the lid 18 is configured to move from the closed position to the open position in response to an application of a lid-opening force to the handle 26.

Figure 7:
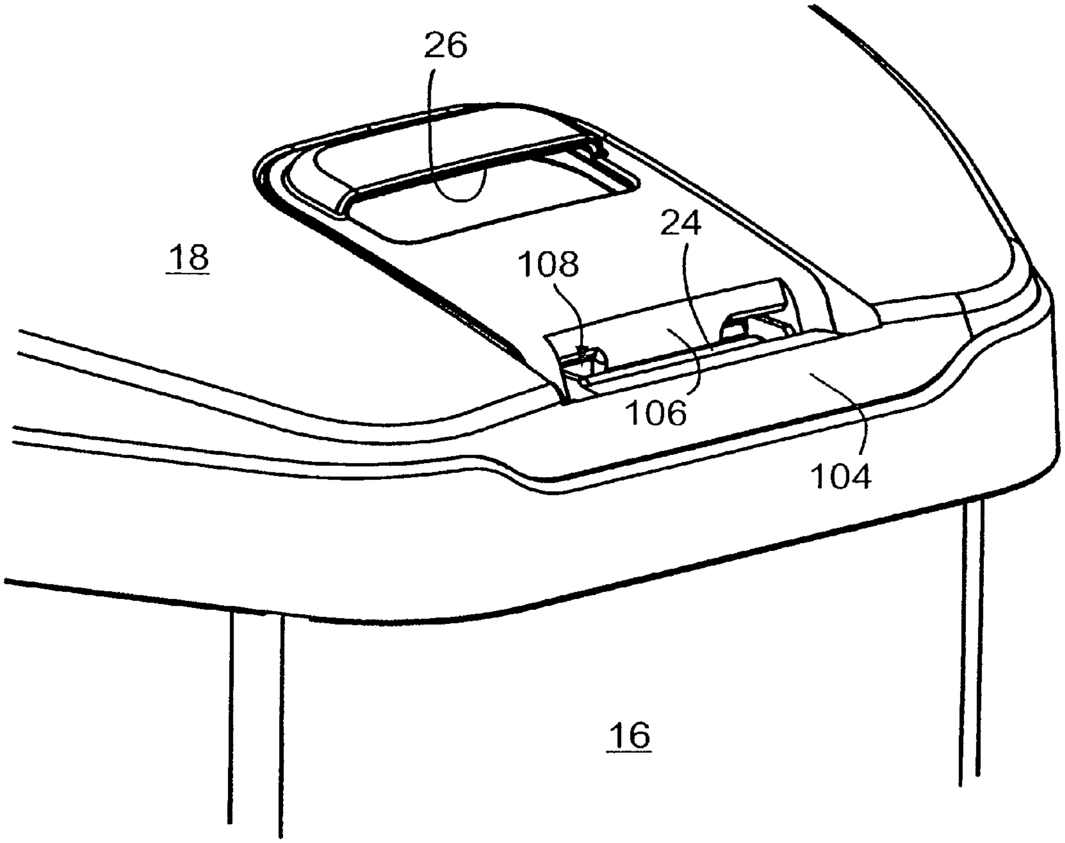
FIG. 7 is a top perspective view of a front detail of the container in FIG. 1, illustrating the latch in the locked lid position.
Figure 8:
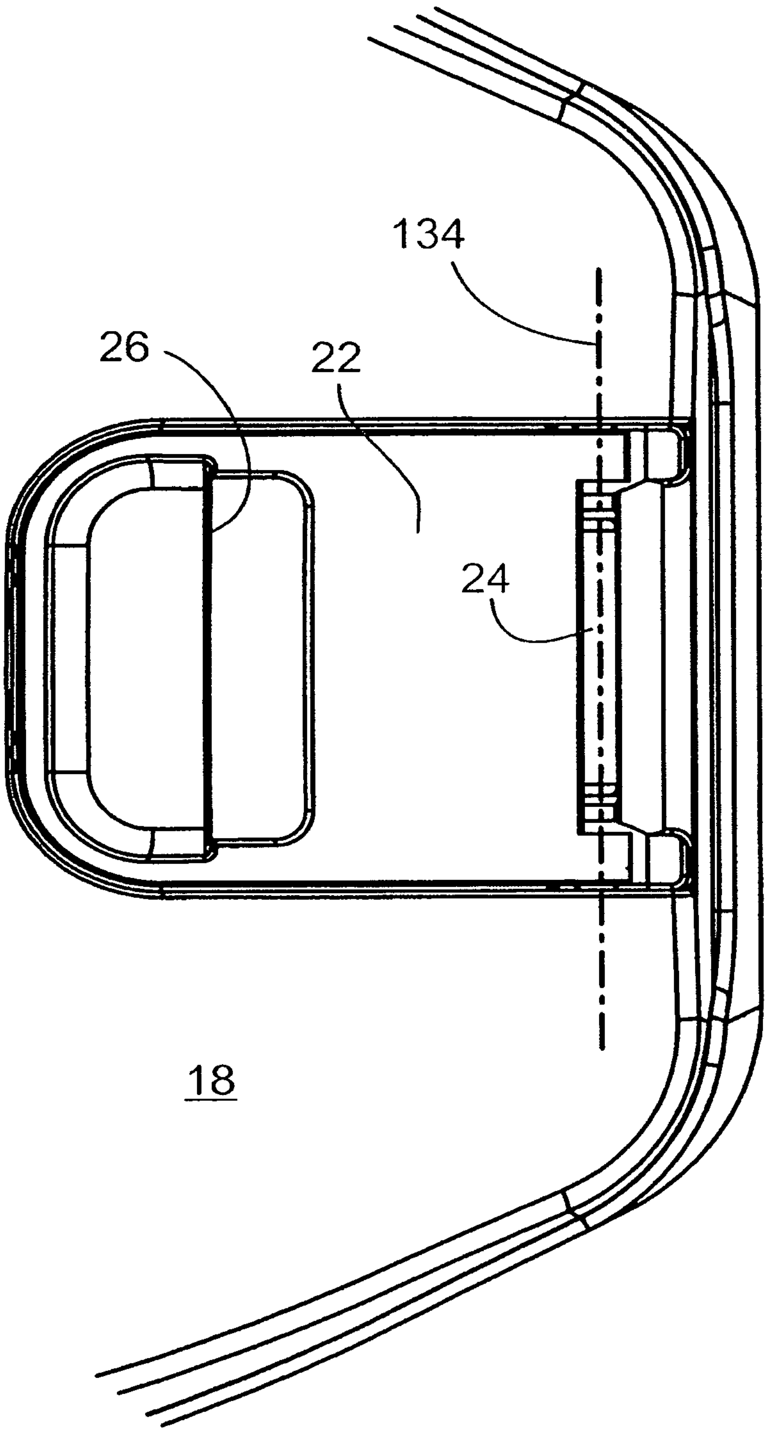
FIG. 8 is a top plan view of a front detail of the container in FIG. 1, illustrating the latch in the locked lid position.
Figure 9:
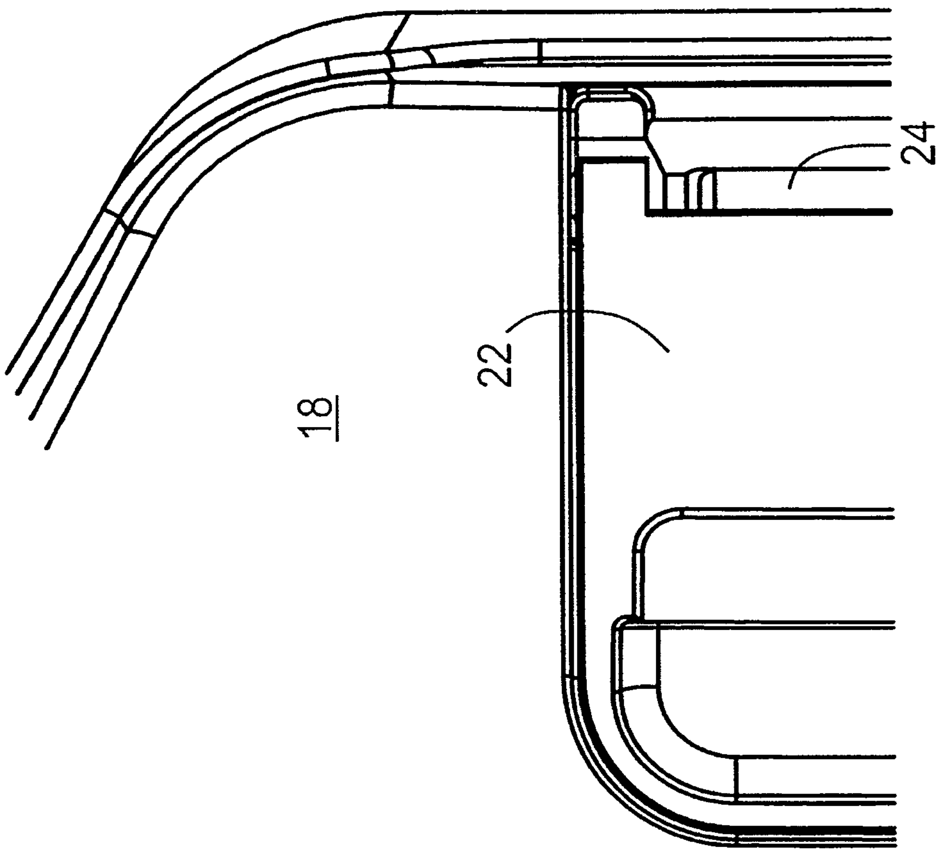
FIG. 9 is a further detail of the top plan view in FIG. 8.

When the latch 22 is disposed in the locked lid position, the detent co-operator 106 is disposed relative to the detent 24 such that the detent 24 interferes with movement of the detent co-operator 106 along a vertical axis and thereby resists movement of the lid 18 from the closed position to the open position. Referring to FIG. 7 in the first embodiment and FIG. 41 for the third embodiment, a potential fouling space 108 is defined between the detent co-operator 106 and the detent 24. The container assembly 12 includes a fouling guard 104 extending from the lid 18 and disposed between the detent 24 and the peripheral edge 1202 of the container assembly 12 and configured for reducing ingress of materials into the potential fouling space 108. The fouling guard 104 extends vertically above the detent 24.

(G) Refuse Container with Impact Guard for Blocking Physical Contact with the Locking Mechanism In another aspect, there is provided a refuse container 10, as described above, and including an impact guard 110 for blocking physical contact with the locking mechanism 114.

In this respect, there is provided the refuse container 10 including a container assembly and a locking mechanism.

The container assembly includes the bin 16 and the lid 18. The bin 16 defines the cavity 20. The lid is rotatably coupled to the bin 16, and configured for movement, relative to the bin 16, between an open position providing access to the cavity 20 and a closed position inhibiting access to the cavity 20.

The locking mechanism includes the latch 22 and the detent 24. The latch 22 includes the handle 26, and is moveable between a locked lid position and an unlocked lid position. The detent 24 acts between the bin 16 and the lid 18. The detent 24 co-operates with the latch 24 so as to effect locking of the lid 18 to the bin 16 when the latch 22 is in the locked lid position, and permit movement of the lid 18, relative to the bin 16, from the closed position to the open position when the latch 22 is in the unlocked lid position.

The latch 22 is configured to move from the locked lid position to the unlocked lid position in response to application of an unlocking force to the handle 26. When the latch 22 is disposed in the unlocked lid position and the lid 18 is disposed in the closed position, the lid 18 is configured to move from the closed position to the open position in response to an application of a lid-opening force to the handle 26.

Figure 19:
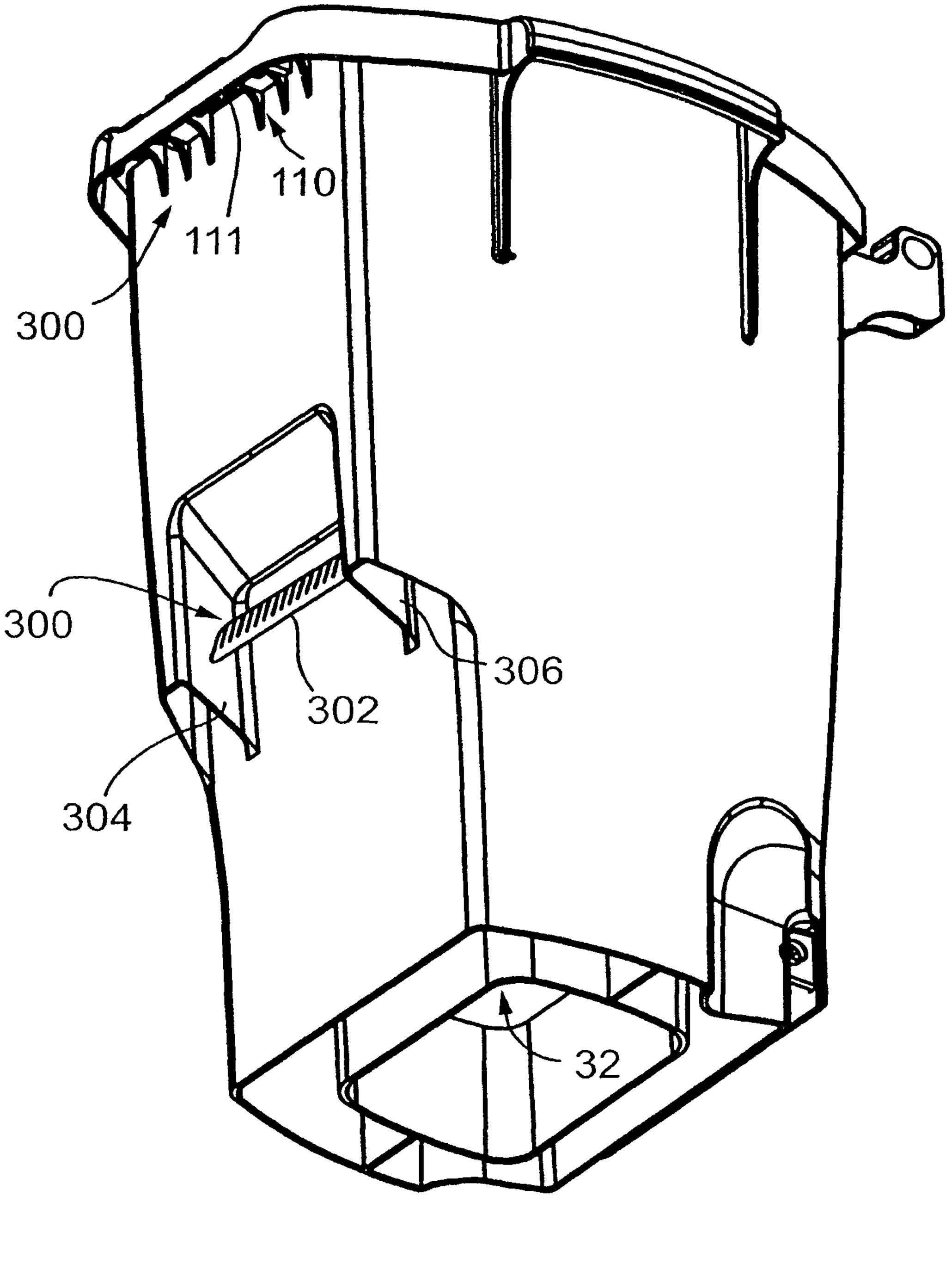
FIG. 19 is a bottom perspective view of the bin of the container in FIG. 1, taken from the front.

Referring to FIG. 19 for the first embodiment and FIG. 53 for the third embodiment, the container assembly 12 includes the impact guard 110 disposed below the locking mechanism 14 for blocking physical contact between the locking mechanism 14 an external object when the latch 22 is disposed in the locked lid position. For example, the detent 24 extends from the rim 28 of the bin 16. Co-operatively, the latch 22 is coupled to the lid 18. In this respect, the impact guard 110 is disposed on the exterior surface 42 of the bin 16.

For example, the impact guard includes a lower surface 29 of the rim 28, and also includes a plurality of ribs 111 extending between and connecting the external surface 42 and the lower surface 29.

(H) Refuse Container with Lid Configured to Distribute Impact Forces

In another aspect, there is provided a refuse container 10 with the lid 18 configured to distribute impact forces.

In this respect, there is provided the refuse container 10 including the bin 16 and the lid 18.

Figure 21:
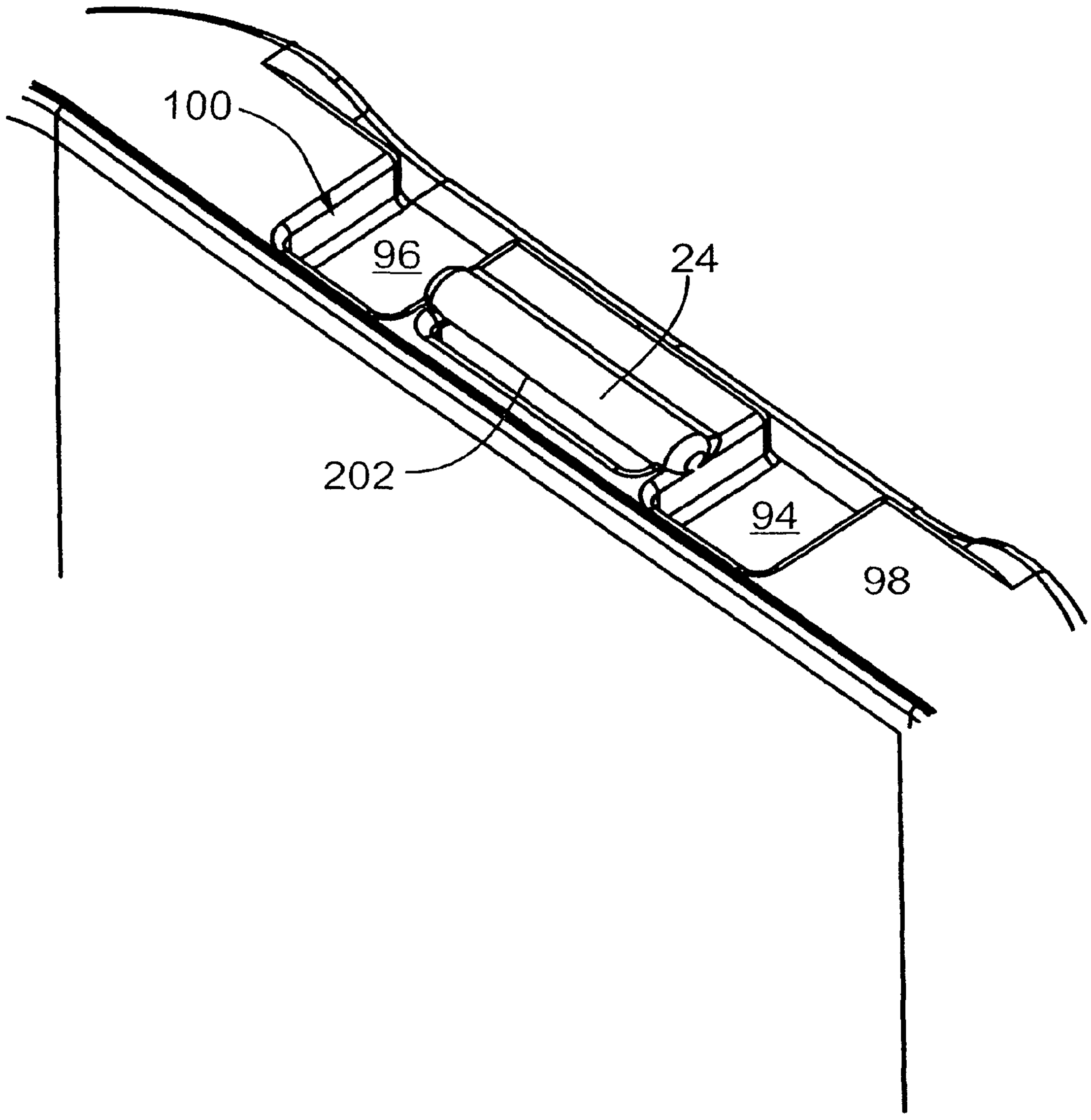
FIG. 21 is a top perspective view of a front detail of the bin of the container in FIG. 1, taken from the rear.
Figure 22:
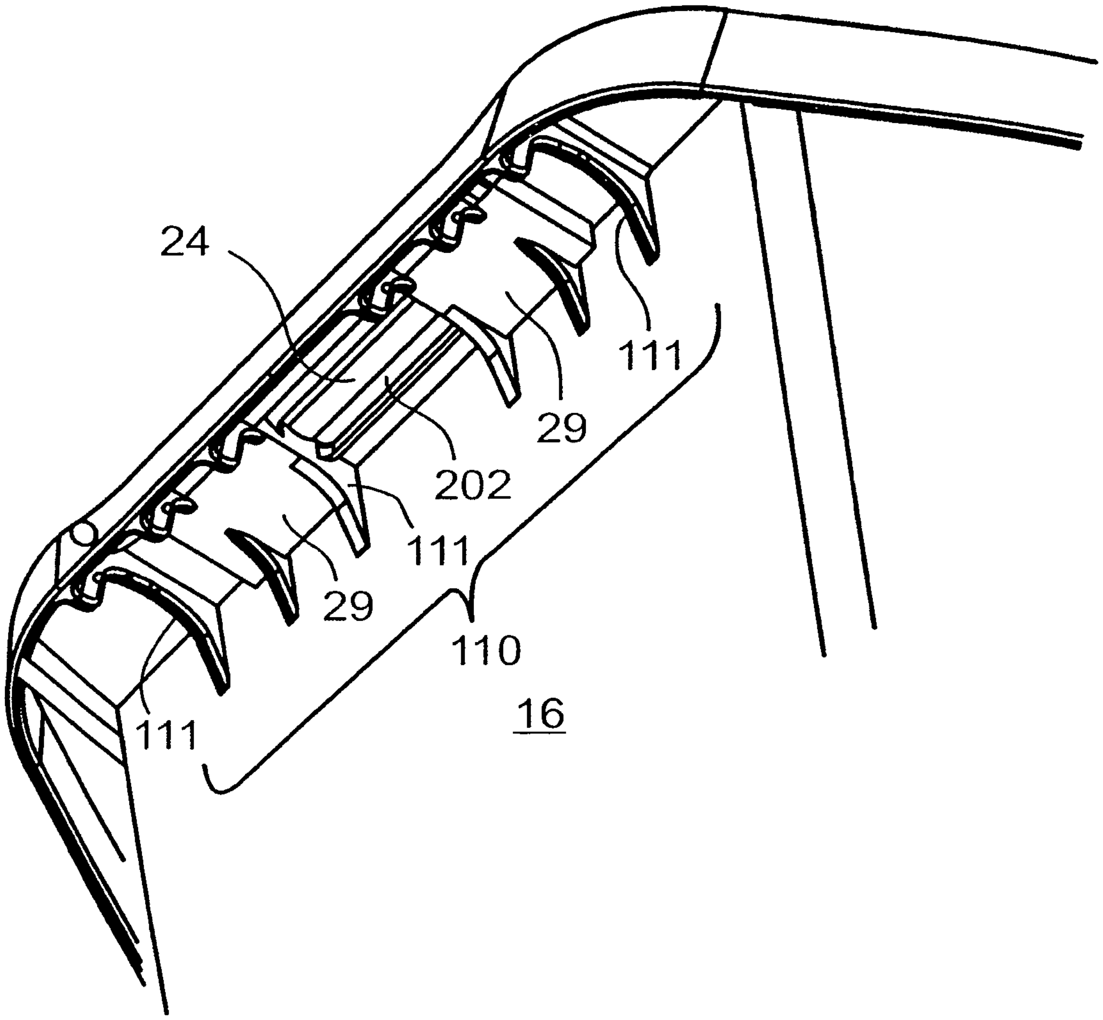
FIG. 22 is a bottom perspective view of a front detail of the bin of the container in FIG. 1, taken from the front.
Figure 23:
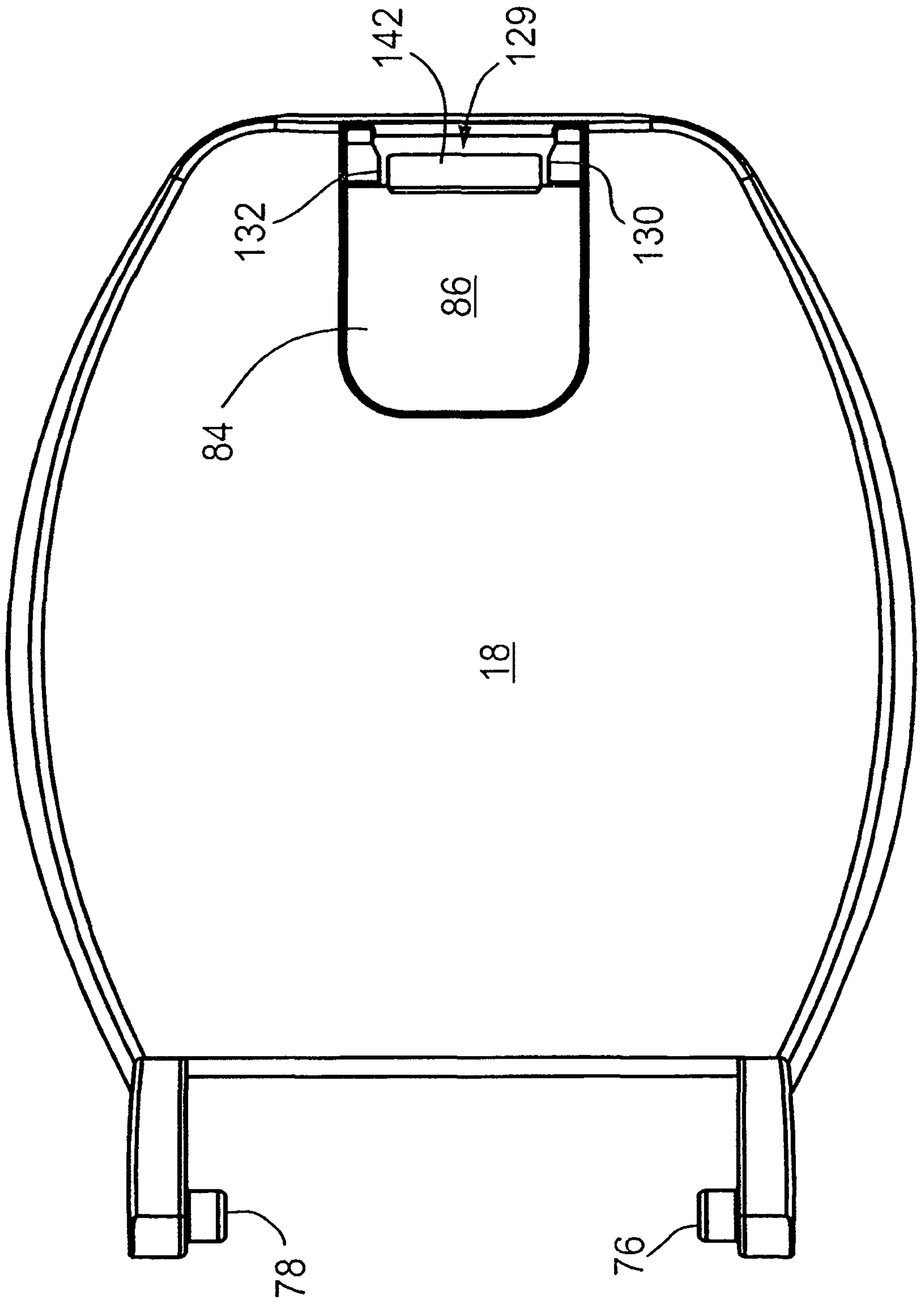
FIG. 23 is a top plan view of a lid of the container in FIG. 1.
Figure 55:
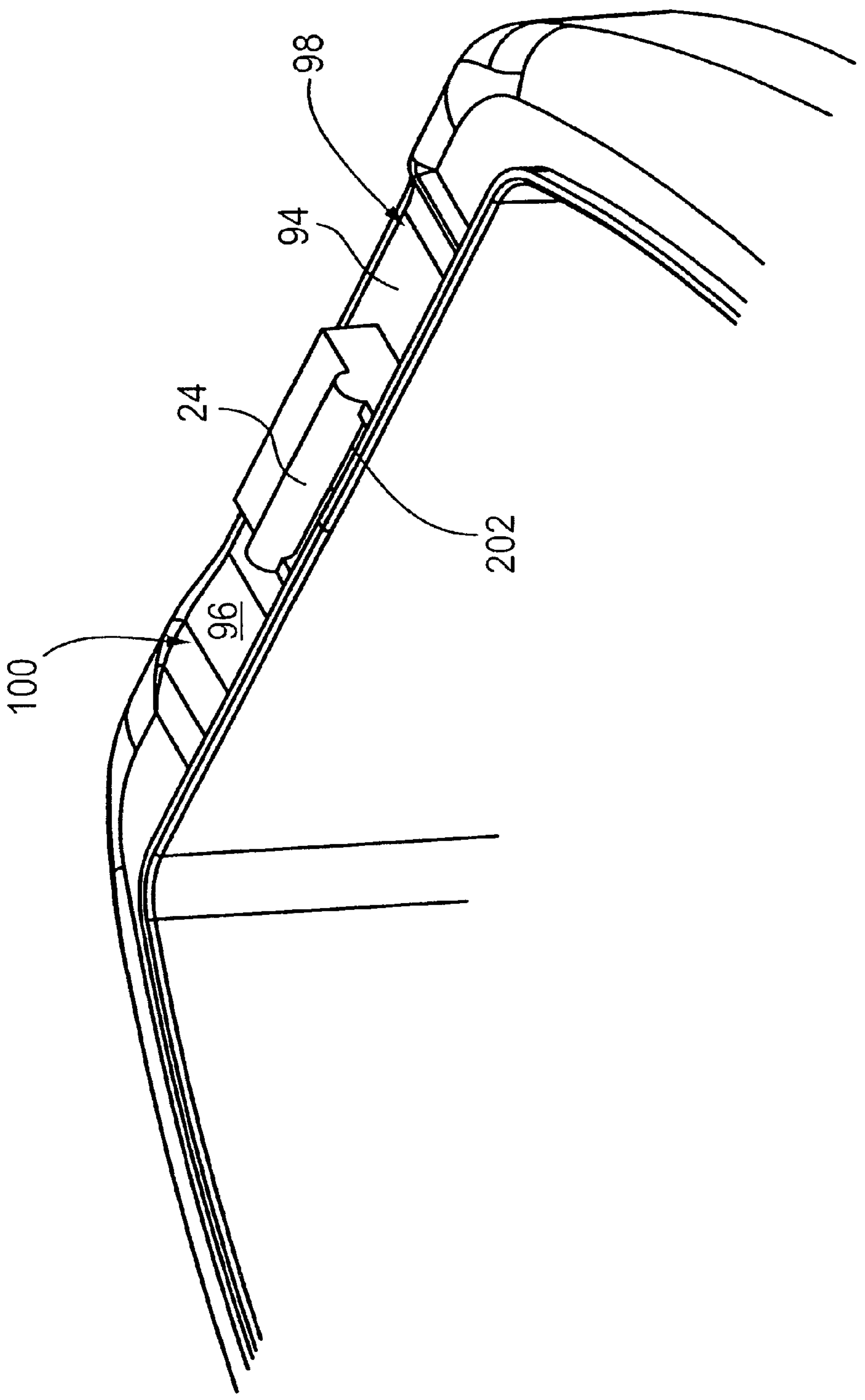
FIG. 55 is a top perspective view of a front detail of the bin of the container in FIG. 35, taken from the rear.
Figure 56:
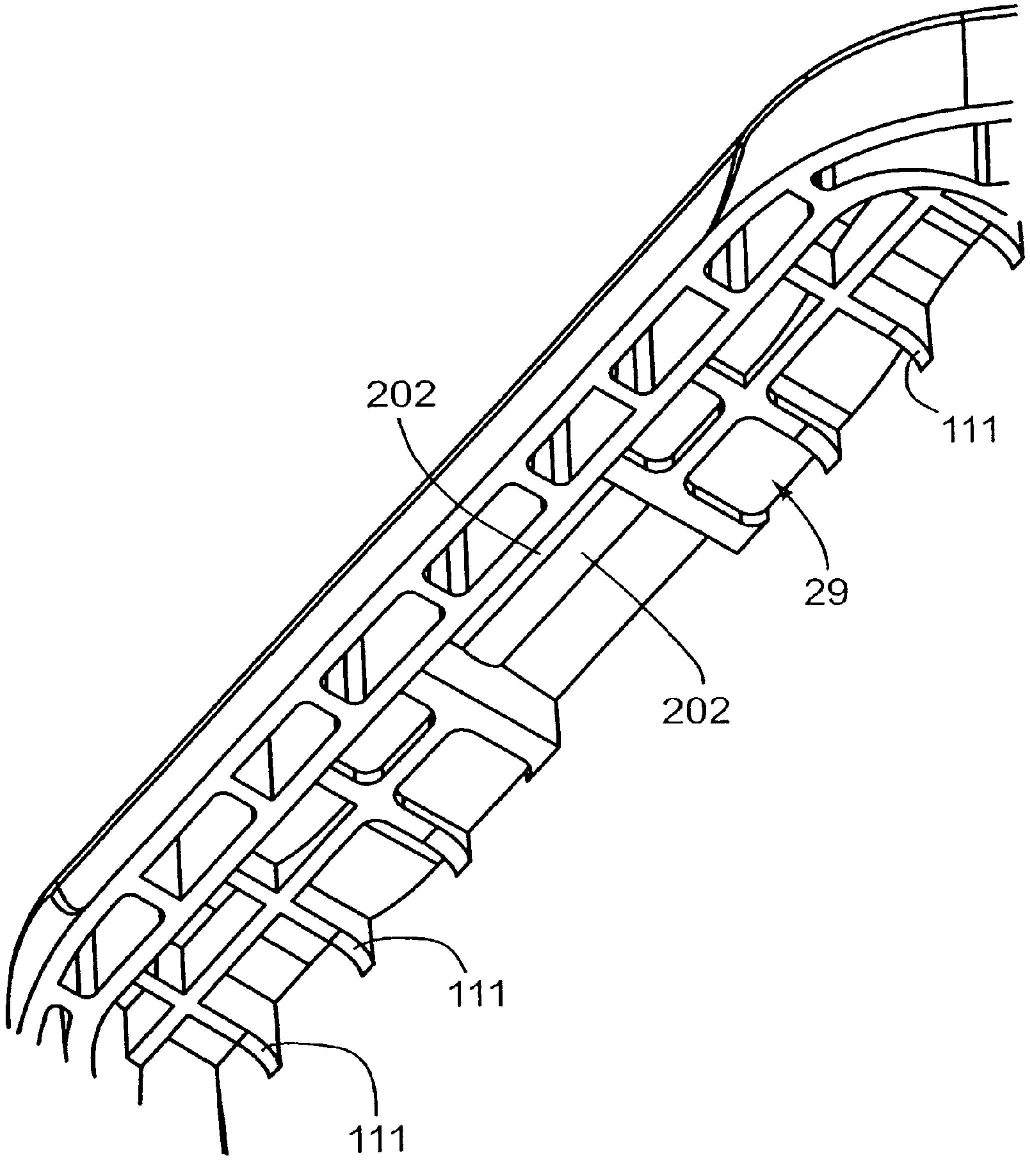
FIG. 56 is a bottom perspective view of a front detail of the bin of the container in FIG. 35, taken from the front.
Figure 57:
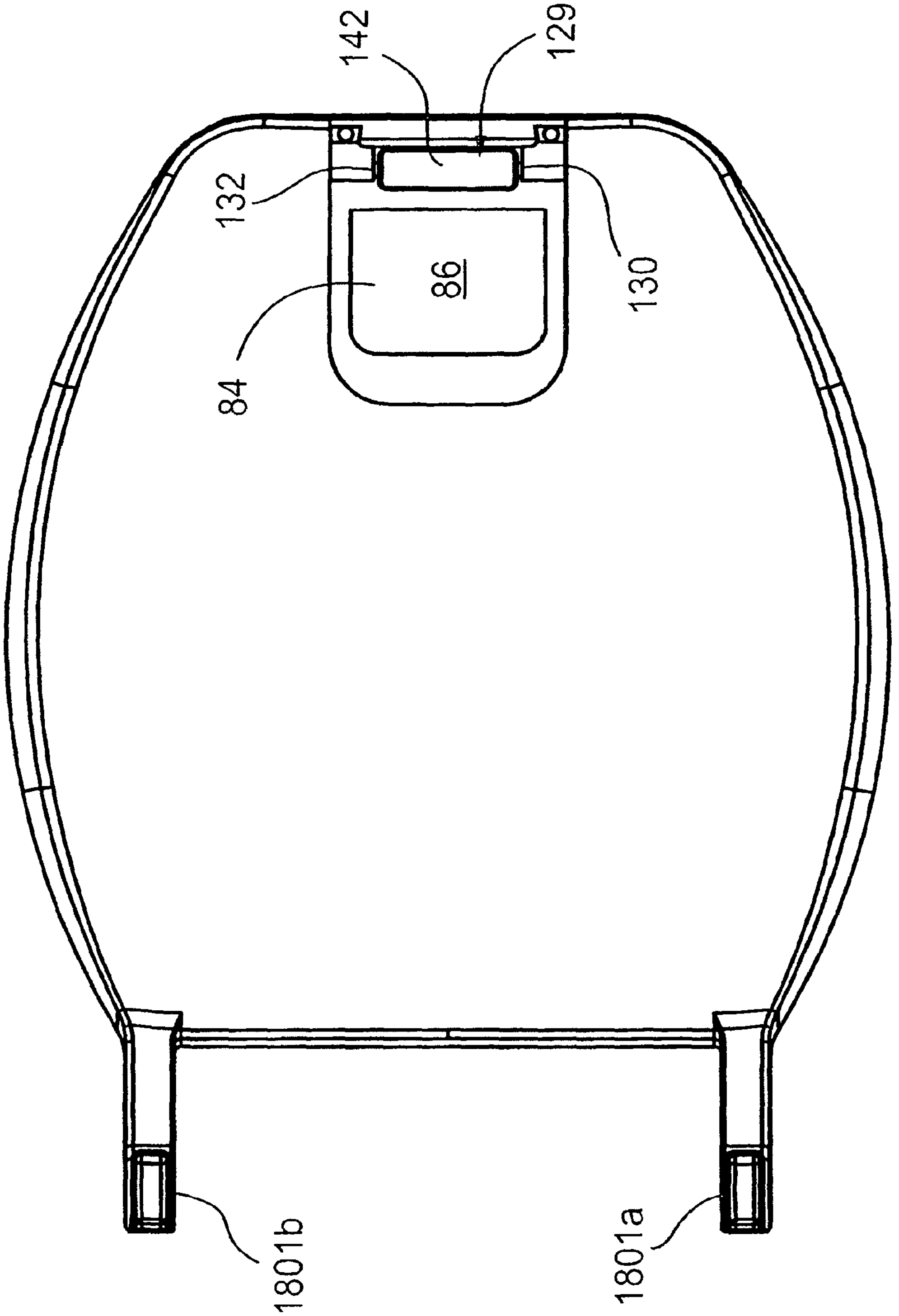
FIG. 57 is a top plan view of a lid of the container in FIG. 35.

Referring to FIGS. 18, 20, and 21 for the first embodiment and FIGS. 52, 54, and 55 for the third embodiment, the bin 16 defines the cavity 20. The bin 16 includes the lip 74 and the rim 28. The lip 74 defines an opening to the cavity 20. The rim 28 extends peripherally about the lip 74. The rim 28 includes a skirt seating surface 30 and one or more impact pad seating surfaces. For example, the impact pad seating surface is a impact pad receiving well.

The lid 18 is rotatably coupled to the bin 16. The lid 18 is configured for movement, relative to the bin 16, between an open position providing access to the cavity 20, and a closed position inhibiting access to the cavity 20. Referring to FIGS. 24 and 28 for the first embodiment and FIGS. 48 and 62 for the third embodiment, the lid 18 includes the skirt 88 and an impact pad assembly 116 including at least one impact pad (two impact pads 90, 92 are shown). The skirt 88 extends peripherally of and downwardly from the lid 18 and includes a skirt contact surface 122 configured to be seated upon the skirt seating surface 30. Each one of the impact pads 90, 92 includes a respective one of the contact surfaces 124, 125, and each one of the contact surfaces 124, 125 is configured to be seated upon a respective one of two impact pad seating surfaces 94, 96 (in the illustrated embodiment, a respective one of impact pad wells 98, 100 is provided for each one of the pads 90, 92). The skirt contact surface 122 includes a respective surface area. As well, each one of the contact surfaces 124, 125 includes a respective surface area to define two surface areas (in this case, two surface areas). The sum of the two surface areas defines an operative impact surface area. The ratio of the operative impact surface area to the surface area of contact surface 122 of the skirt 88 is at least 0.1. For example, this ratio is 0.2.

Figure 30:
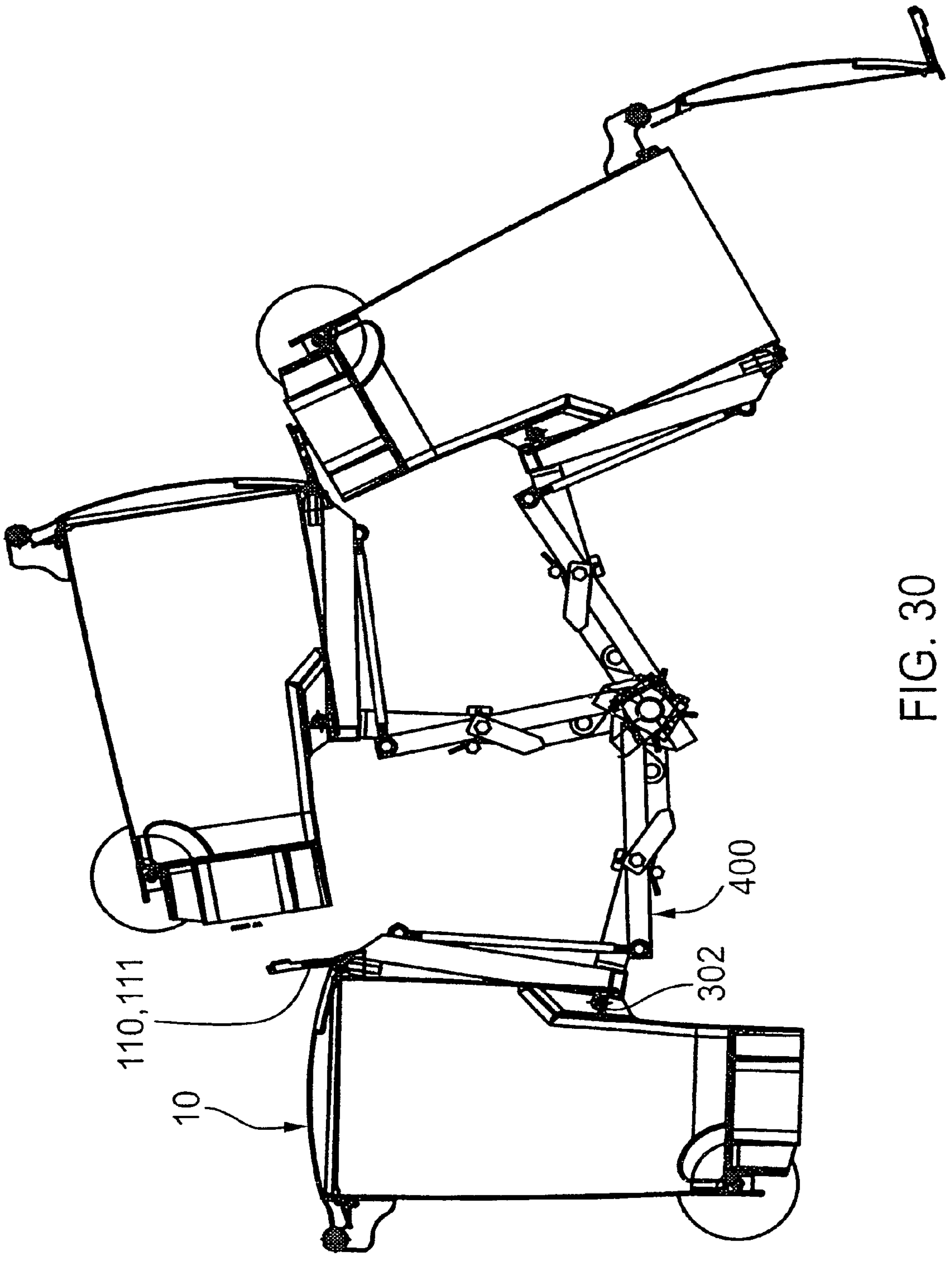
FIG. 30 is a schematic illustration of the stages of lifting and moving of the refuse container by a lifting mechanism engagement system.
Figure 31:
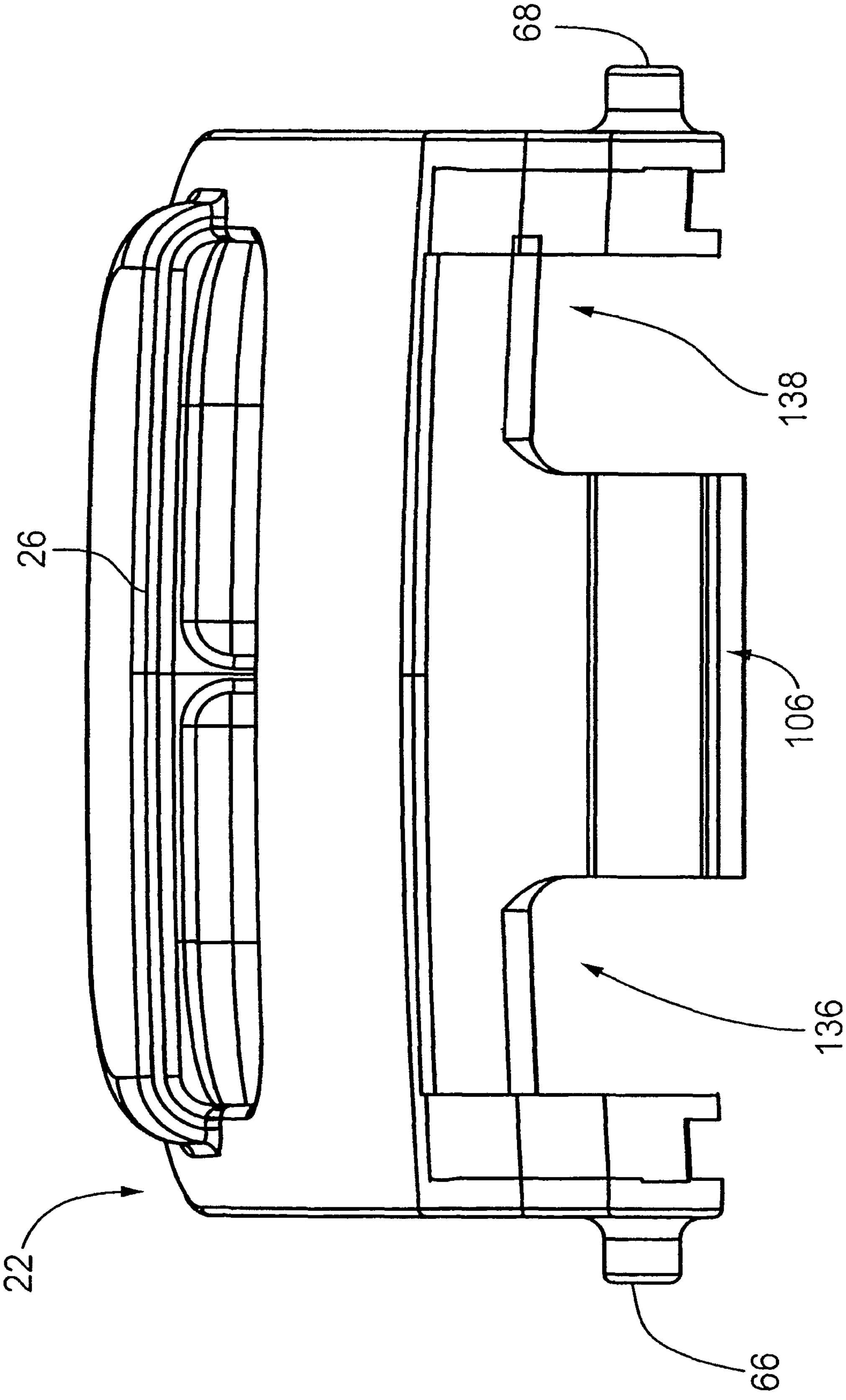
FIG. 31 is a front plan view of the latch of the refuse container of FIG. 1.
Figure 53:
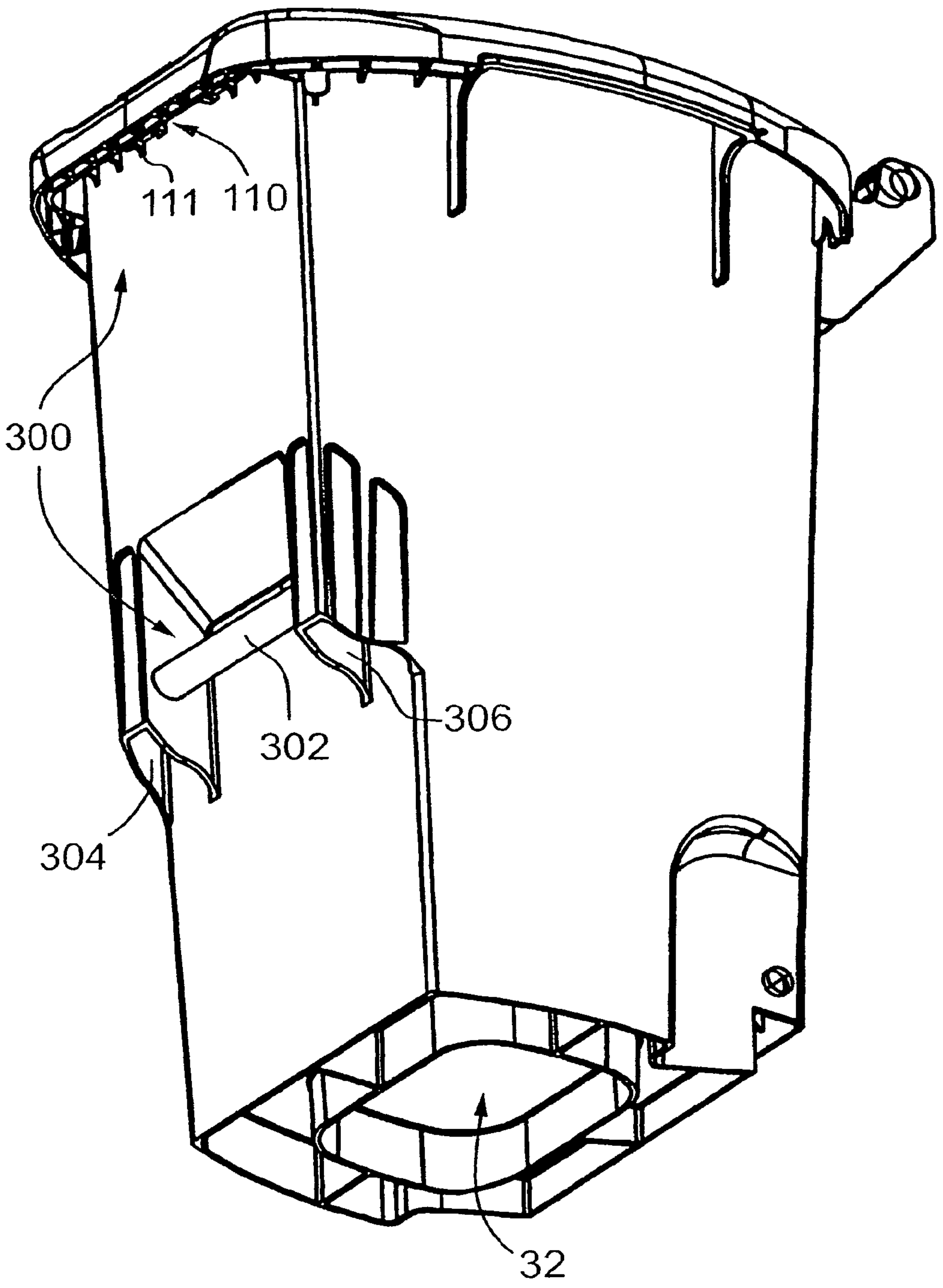
FIG. 53 is a bottom perspective view of the bin of the container in FIG. 35, taken from the front.
Figure 64:
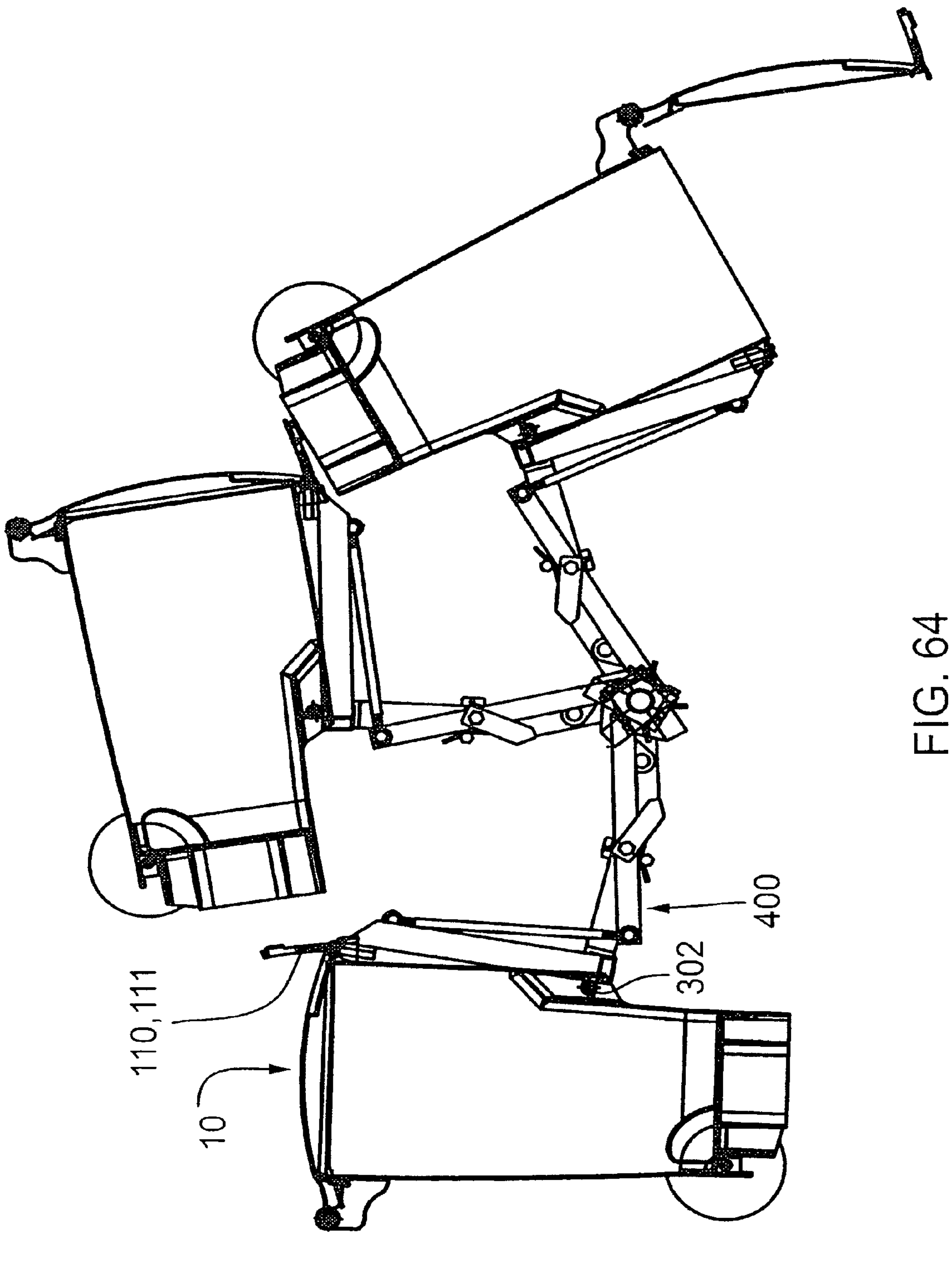
FIG. 64 is a schematic illustration of the stages of lifting and moving of the refuse container in FIG. 35 by a lifting mechanism engagement system.
Figure 65:
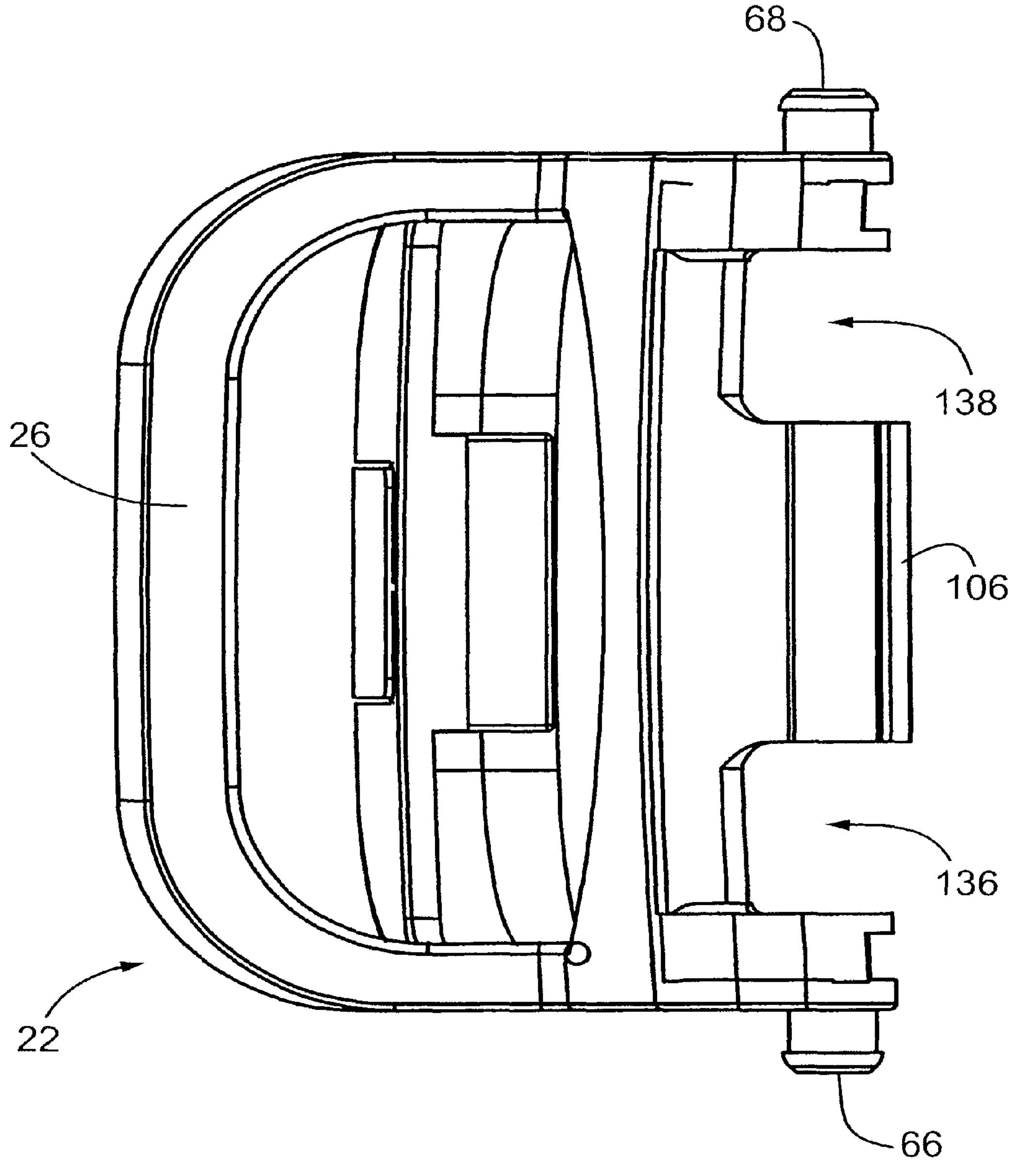
FIG. 65 is a front plan view of the latch of the refuse container of FIG. 35.

(J) Refuse Container with Lifting Mechanism Engagement System Including Retention Bar In another aspect and referring particularly to FIGS. 19 and 30 for the first embodiment and FIGS. 53 and 64 for the third embodiment, there is provided a refuse container 10 including a lifting mechanism engagement system 300 for engaging a lifting mechanism 400. In this respect, there is provided the refuse container 10 including the bin 16 and the lid 18. The bin 16 has an exterior or exposed surface and an opposing interior surface defining the cavity 20. For example, the lid 18 is rotatably coupled to the bin 16 at a first end of the lid such that an opposing second end of the lid is liftable and rotates about the rotational coupling at the first end. Thus, the lid 18 is configured for movement, relative to the bin 16, between an open position providing access to the cavity 20, and a closed position inhibiting access to the cavity 20.

The refuse container 10 includes a lifting mechanism engagement system 300. The lifting mechanism engagement system 300 includes a retention bar 302. The retention bar 302 is coupled to the sidewall 34 and is disposed externally of the cavity 20. For example, brackets 304, 306 are mounted to external surface 42 of the sidewall 34, or more preferably integrally formed with the bin 16 to form a single unit. The brackets 304, 306 are located between uppermost and lowermost extremes of the container 10, preferably at approximately a midpoint of the overall height of the container 10. The brackets 304, 306 extend outwardly from the external surface 42 of the sidewall 34 and have opposing inner and outer face portions. The inner and outer face portions are spaced such that in body portions of the brackets, an interior gap, which is completely fluidly isolated from the cavity 20, is formed between the inner and outer face portions. The inner face portions are laterally spaced from one another such that a space is formed between the respective face portions. Each one of the brackets 304, 306 includes a receiver, preferably including an aperture for receiving a respective end of the retention bar 302. For example, the retention bar 302 is snap-fitted within the apertures such that the opposing ends of the retention bar 302 extend into the interior gap of each bracket while an exposed portion of the retention bar 302 spans the space between the inner face portions of the brackets 304, 306.

Figure 78:
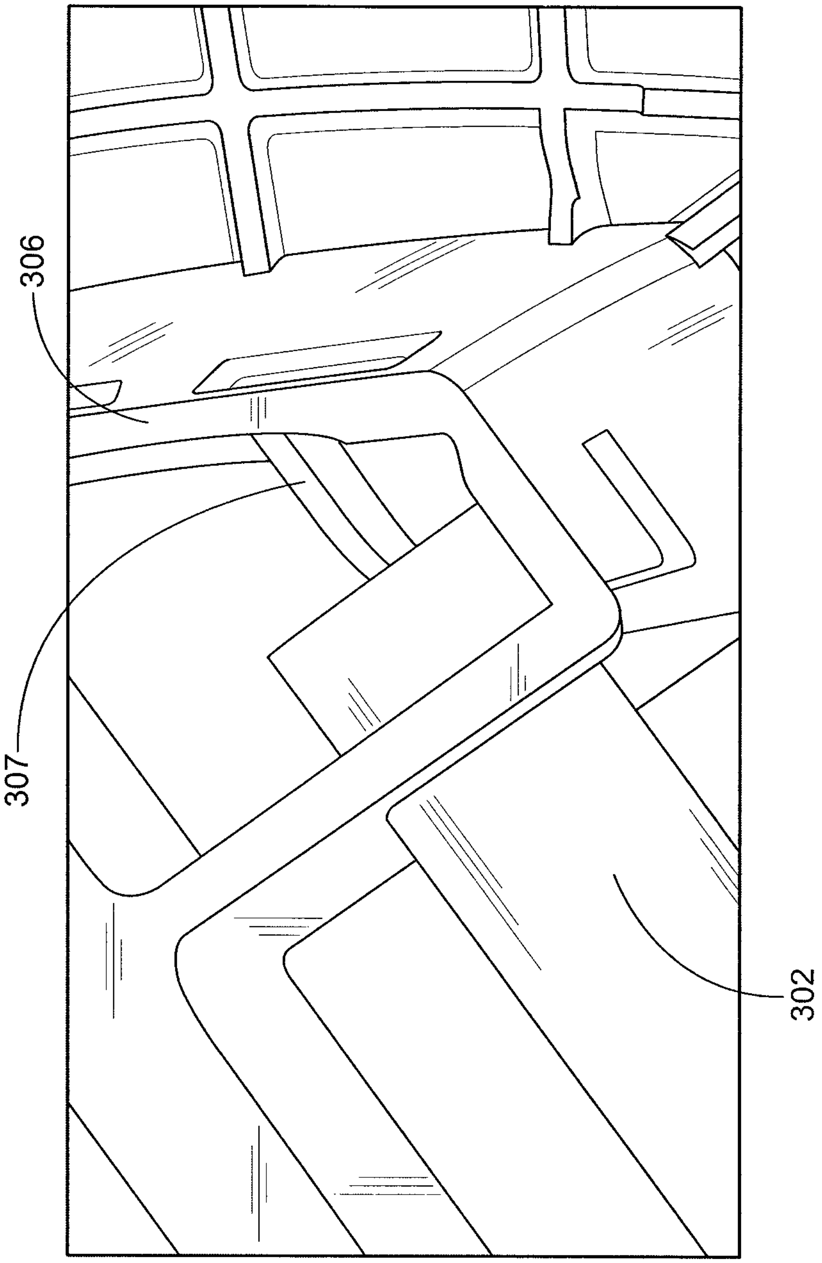
FIG. 78 is an enlarged view of a bracket associated with a lifting mechanism engagement system, showing an end portion of a retention bar extending into an interior gap between inner and outer face portions of the bracket and abutting a rib extending inwardly towards the inner face portion from the outer face portion.

As illustrated in FIG. 78, a rib 307 is located within the interior gaps of each bracket 304, 306. The ribs are preferably integrally formed with the outer face portion of the corresponding bracket such that each rib extends inwardly relative to the space between the brackets 304, 306. The ribs 307 are aligned with the apertures so that the end portions of the retention bar 302 abut the ribs 307 when the retention bar 302 is snap-fitted within the apertures. This arrangement aligns the retention bar 302 substantially horizontally, allows the retention bar 302 to be fixedly coupled to the bin 16 while being capable of rotation within the apertures, and maintains the retention bar 307 in complete fluid isolation from the cavity 20. Thus, the retention bar 302 is spaced outwardly relative to the external surface of the bin 20 and configured to be hooked by the lifting mechanism 400.

For example, the lifting mechanism engagement system 300 includes the ribs 111 of the impact guard 110 which is configured to engage and become supported by the lifting mechanism 400.

(K) Refuse Container with Bag Hook

Figure 66:
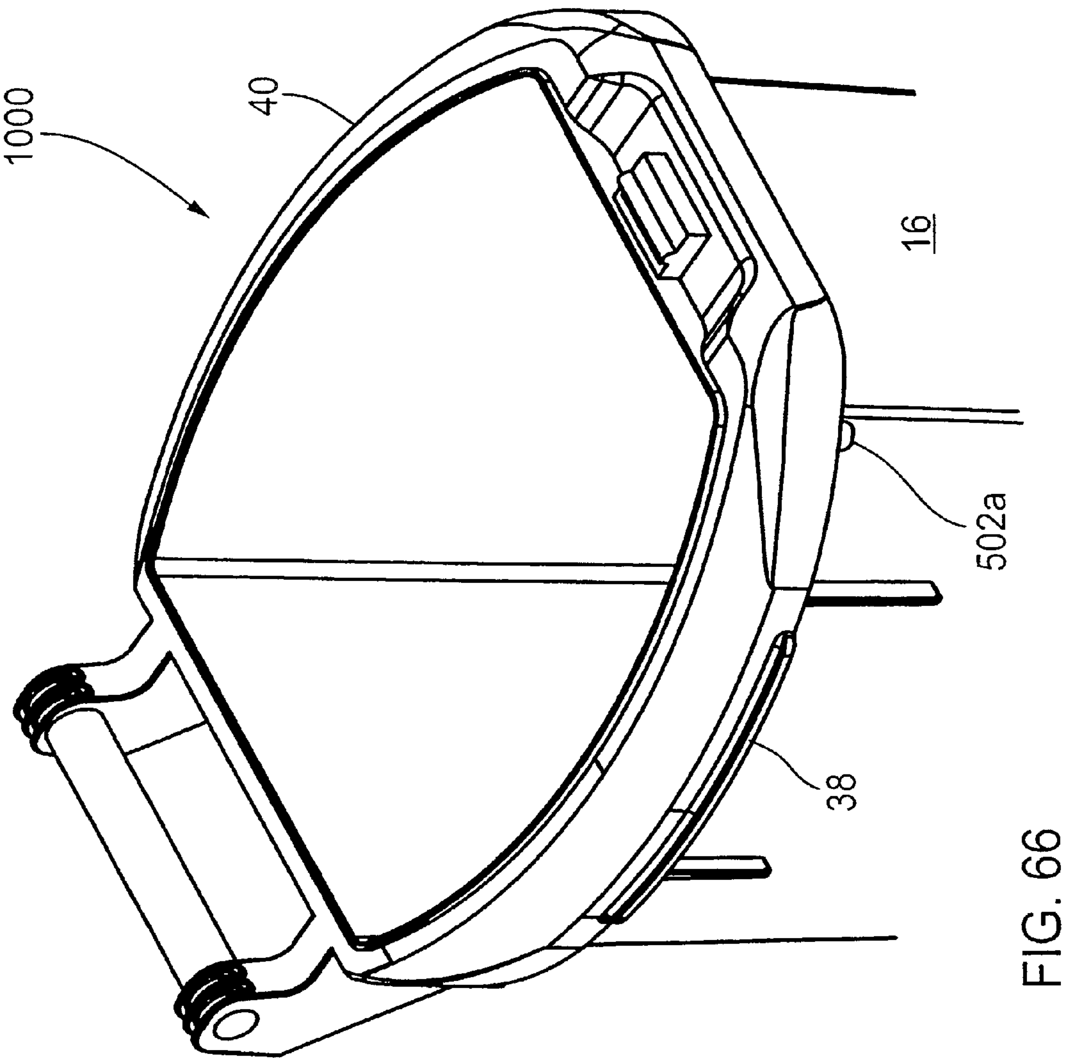
FIG. 66 is a top perspective view of one side of the refuse container, taken from the front.
Figure 67:
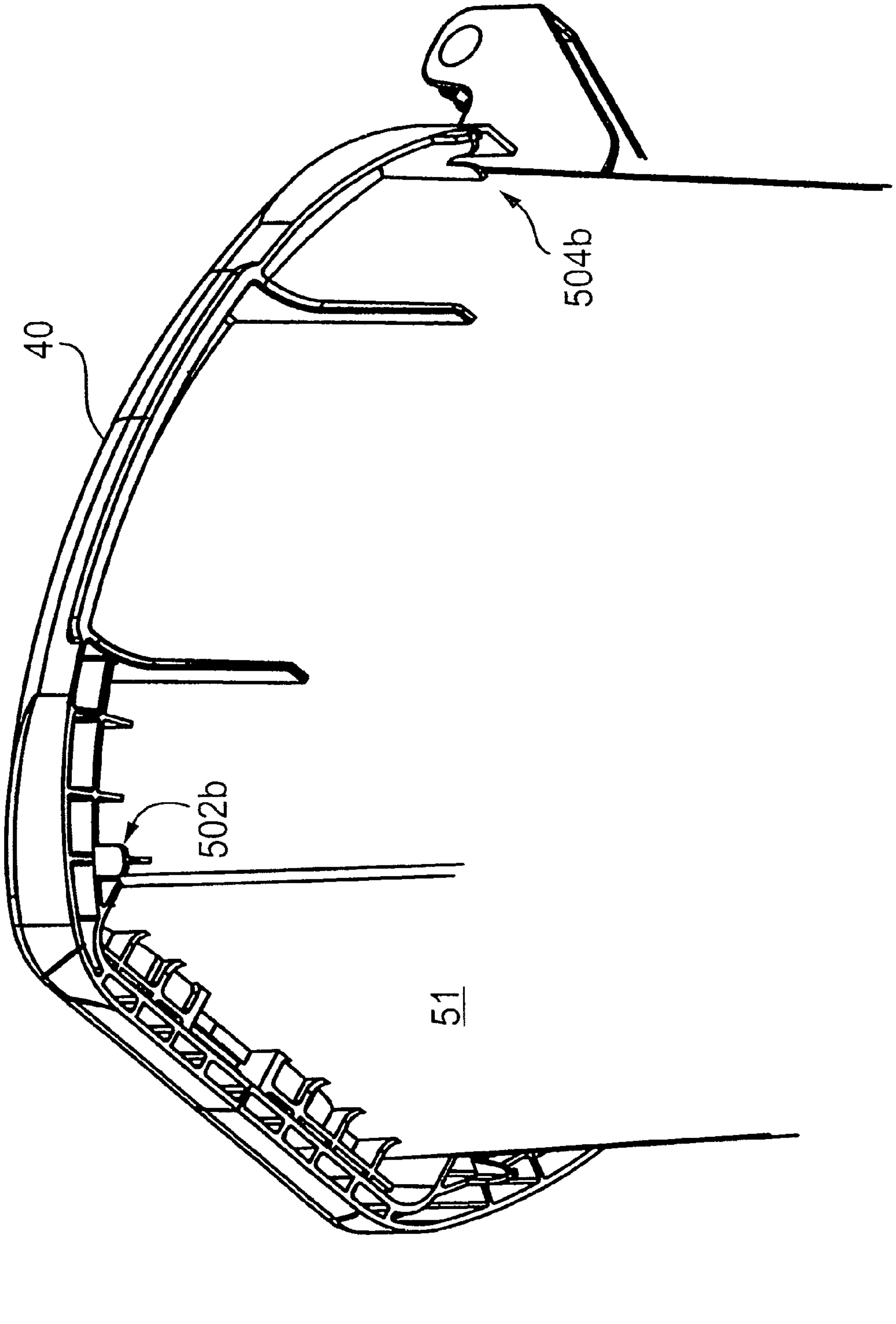
FIG. 67 is a bottom perspective view of the other side of the refuse container of FIG. 35, taken from the front.
Figure 68:
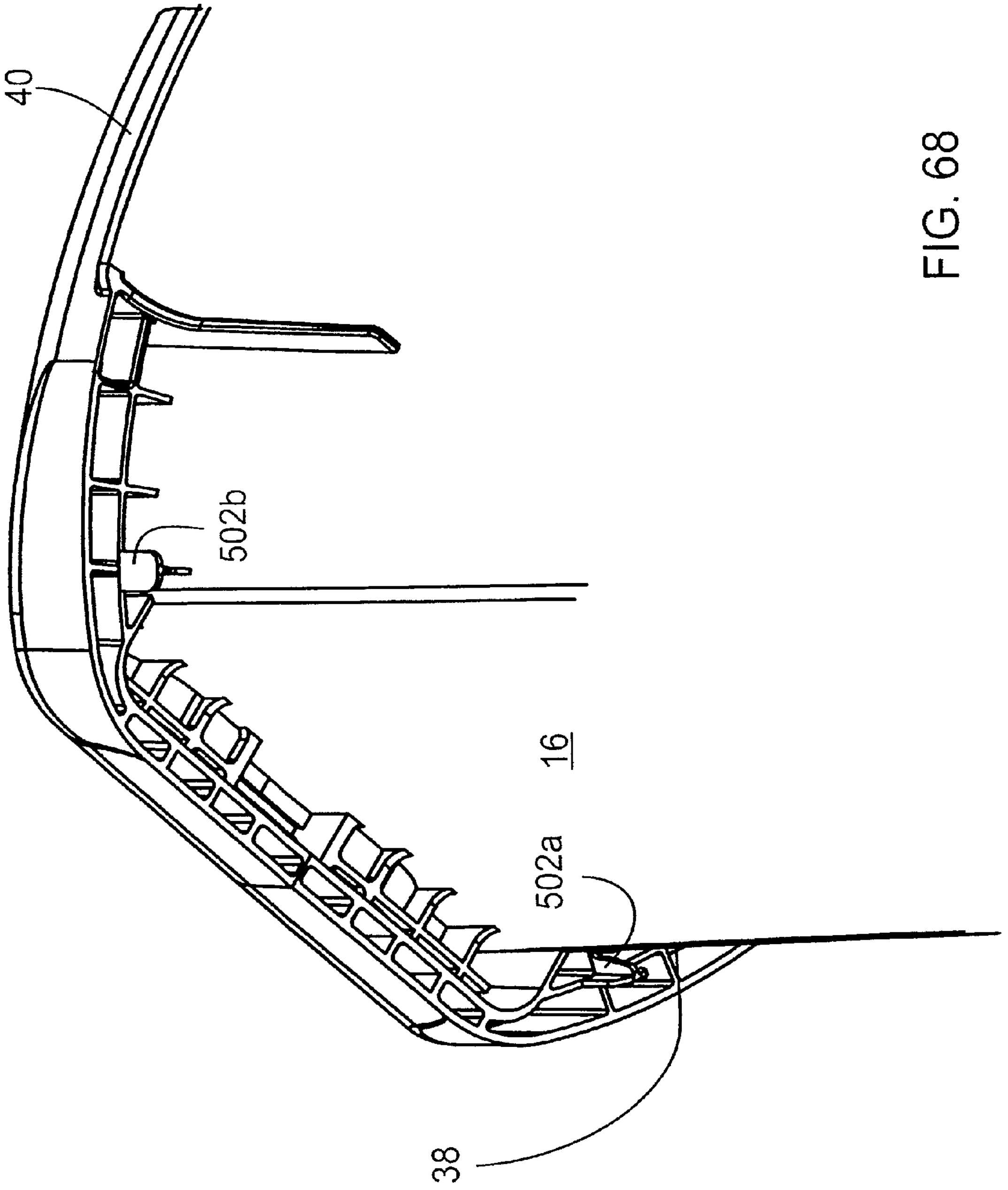
FIG. 68 is a bottom perspective view of the refuse container of FIG. 35, taken from the front and from a perspective where the leading edges of each one of the sides of the container is visible.

In another aspect, and referring specifically to FIGS. 32, 33 and 34 for the first embodiment and FIGS. 66, 67, and 68 for the third embodiment, there is provided another embodiment of a refuse container 500, identical to the refuse container 10, with the exception that each side of refuse container 500 includes a respective one of two pairs of spaced-apart liner retainer or hooks 502*a*, 504*a* and 502*b*, 504*b* extending downwardly from the rim 28 of the bin 16. Each one of the spaced-apart liner retainers 502, 504 is provided and configured for supporting liners which are inserted within the cavity 20 to line the cavity 20 and function as a container liner for containing the refuse. For example, the liner is a plastic bag.

Each one of the liner retainers 502, 504 present an inverted "V" shaped retainer surface configured for receiving and retaining a liner.

(L) Refuse Container Including Latch Locking Mechanism

Figure 69:
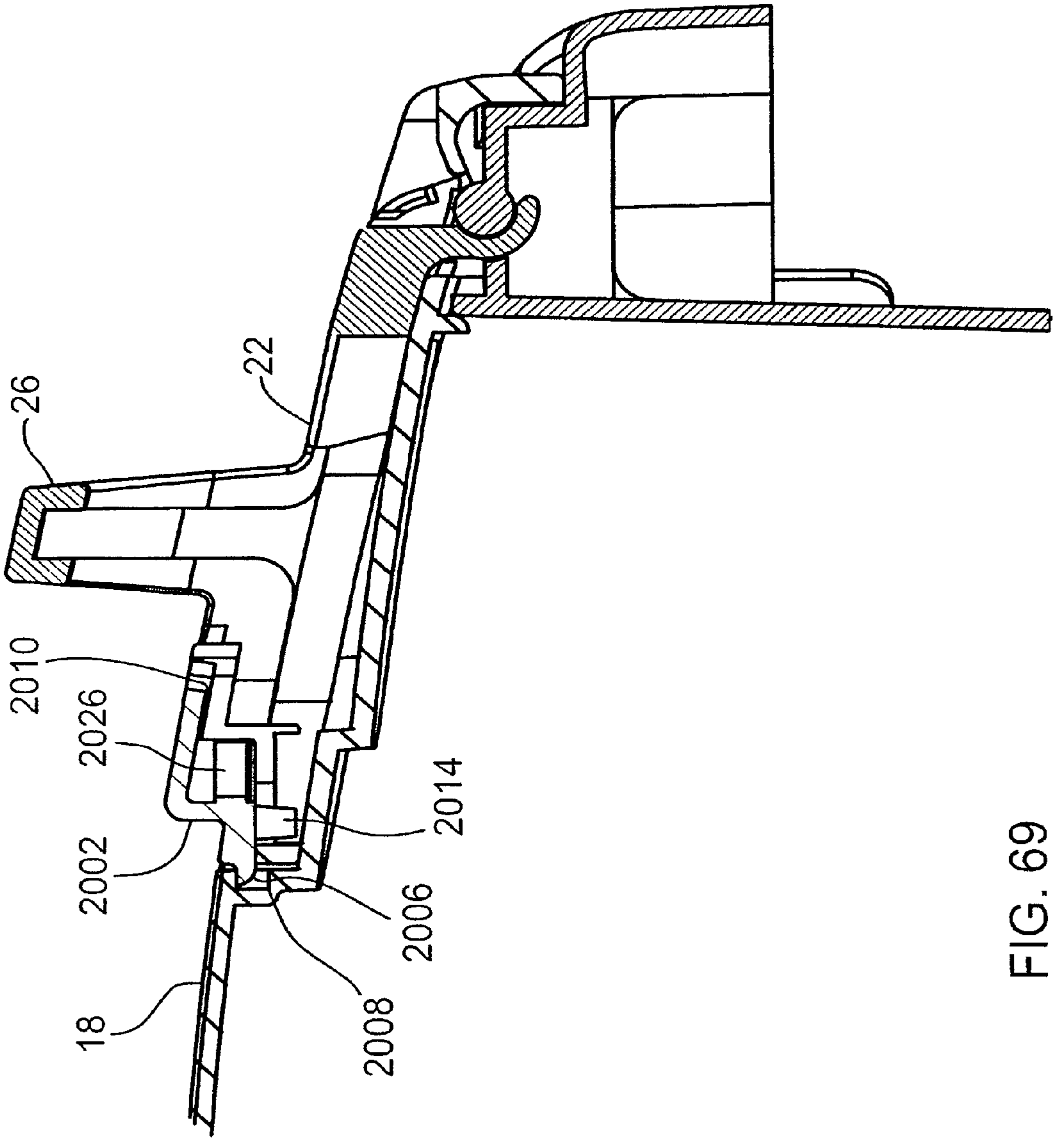
FIG. 69 is a sectional side elevation view of the container, taken along the lines A-A in FIG. 39, illustrating the latch in the locked lid position and the latch locking mechanism in the locked latch position.
Figure 70:
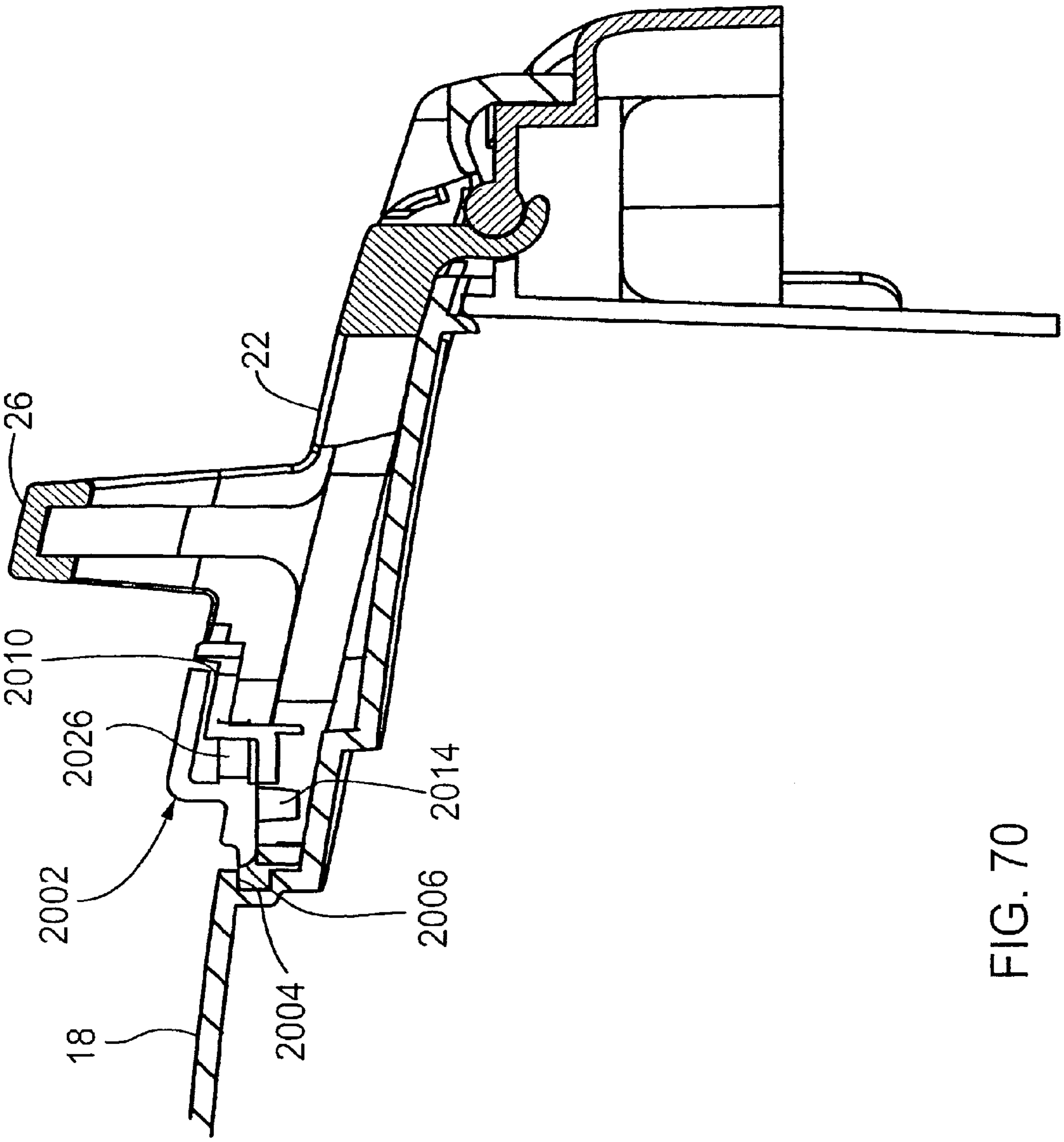
FIG. 70 is a sectional side elevation view of the container, taken along the lines A-A of FIG. 39, illustrating the latch in the locked lid position and the latch locking mechanism in the unlocked latch position.
Figure 71:
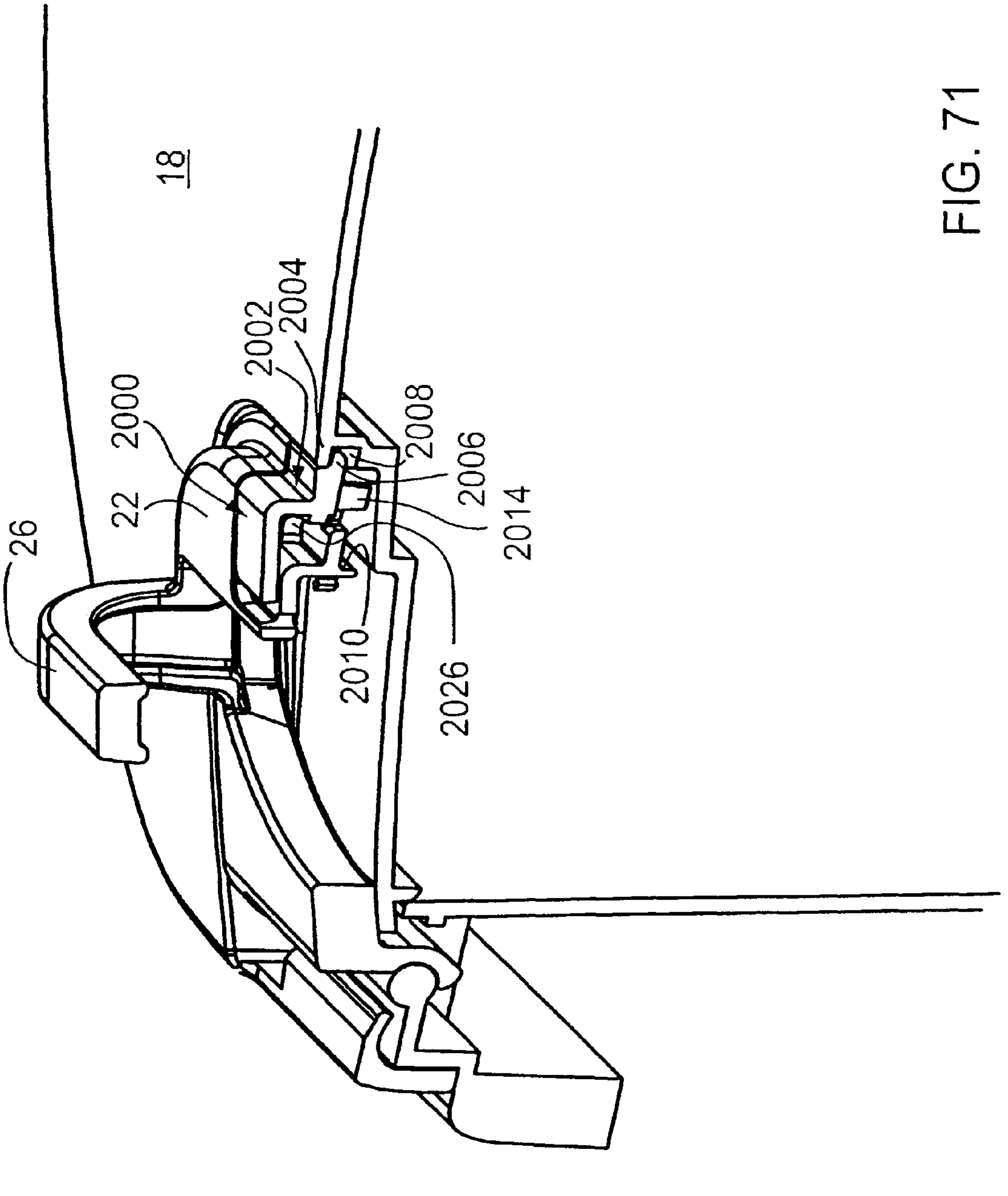
FIG. 71 is a sectional rear perspective view of the container, taken along the lines A-A in FIG. 39, illustrating the latch in the locked lid position and the latch locking mechanism in the locked latch position.

In a further aspect, and referring to the embodiment illustrated in FIGS. 35 to 77, the refuse container 10 is further provided with a latch locking mechanism 2000 (see FIGS. 73 to 76) configured to assume a locked latch position (see FIGS. 69 and 71) and an unlocked latch position (see FIG. 70). When disposed in the locked latch position, the latch locking mechanism 2000 acts between the latch 22 and the lid 18 to prevent the latch 22 from assuming an operative condition whereby the latch is capable of moving between the locked lid position and the unlocked lid position. When the latch locking mechanism 2000 is disposed in the unlocked latch position, the latch is disposed in the operative condition whereby the latch is capable of moving between the locked lid position and the unlocked lid position.

The latch locking mechanism 2000 is moveable from the locked latch position to the unlocked latch position in response to an application of an unlocking force, wherein the unlocking force includes a horizontal component directed towards the front of the bin 16.

For example, the unlocking force is applied by a human hand.

For example, the latch locking mechanism 2000 includes a force receiving surface 2002 for receiving application of the unlocking force.

For example, the lid 18 includes a lock retainer surface 2004 configured to limit or oppose upwardly movement of the latch locking mechanism 2000 relative to the lid 18 when the latch locking mechanism 2000 is disposed in the locked latch position. In this respect, when the latch locking mechanism 2000 is disposed in the locked latch position, upwardly movement of the latch locking mechanism 2000 relative to the lid 18 is limited or opposed by the lock retainer surface 2004 of the lid 18 such that the latch 22 is not able to assume the above described operative condition. When the latch locking mechanism 2000 is disposed in the unlocked latch position, the latch locking mechanism 2000 is able to move upwardly relative to the lid 18 such that the latch 22 is disposed in the operative condition.

For example, the latch locking mechanism 2000 includes a lock projection 2006 configured to co-operate with the lock retainer surface 2004 to limit or oppose upwardly 32 movement of the latch locking mechanism 2000 relative to the lid 18 when the latch locking mechanism 2000 is disposed in the locked latch position. When the latch locking mechanism 2000 is disposed in the locked latch position, the lock projection 2006 is disposed relative to the lock retainer surface 2004 such that the lock retainer surface 2004 limits or opposes upwardly movement of the lock projection 2006 relative to the lid 18 such that the latch 22 is not able to assume the operative condition. When the latch locking mechanism 2000 is disposed in the unlocked latch position, the lock projection 2006 is retracted from the lock retainer surface 2004 such that the lock retainer surface 2004 is not able to limit or oppose upwardly movement of the lock projection 2006 relative to the lid 18, and the lock projection 2000 is, therefore, able to move upwardly relative to the lid 18 such that the latch 22 is disposed in the operative condition.

For example, the lid 18 includes a receiving notch 2008 for receiving latch locking mechanism 2000. The lock projection 2006 is configured to co-operate with the receiving notch 2008 to limit or oppose upwardly movement of the latch locking mechanism 2000 relative to the lid 18 when the latch locking mechanism 2000 is disposed in the locked latch position. When the latch locking mechanism 2000 is disposed in the locked latch position, the lock projection 2006 is disposed within the receiving notch 2008, and upwardly movement of the lock projection relative 2006 to the lid 18 is limited or opposed by the receiving notch 2008 such that the latch 22 is not able to assume the operative condition. When the latch locking mechanism 2000 is disposed in the unlocked latch position, the lock projection 2006 is retracted from the receiving notch 2008 such that the lock projection 2006 is able to move upwardly relative to the lid 18 such that the latch 22 is disposed in the operative condition.

For example, the latch locking mechanism 2000 is coupled to and moveable relative to the latch 22 for movement relative to the latch 22 between the locked latch position and the unlocked latch position. As a further example, the latch locking mechanism 2000 is slideably coupled to the latch 22 for movement relative to the latch 22 between the locked latch position and the unlocked latch position.

For example, the latch locking mechanism 2000 is supported by the latch 22. For example, the latch 22 includes a latch support surface 2010 for supporting the latch locking mechanism 2000.

Figure 72A:
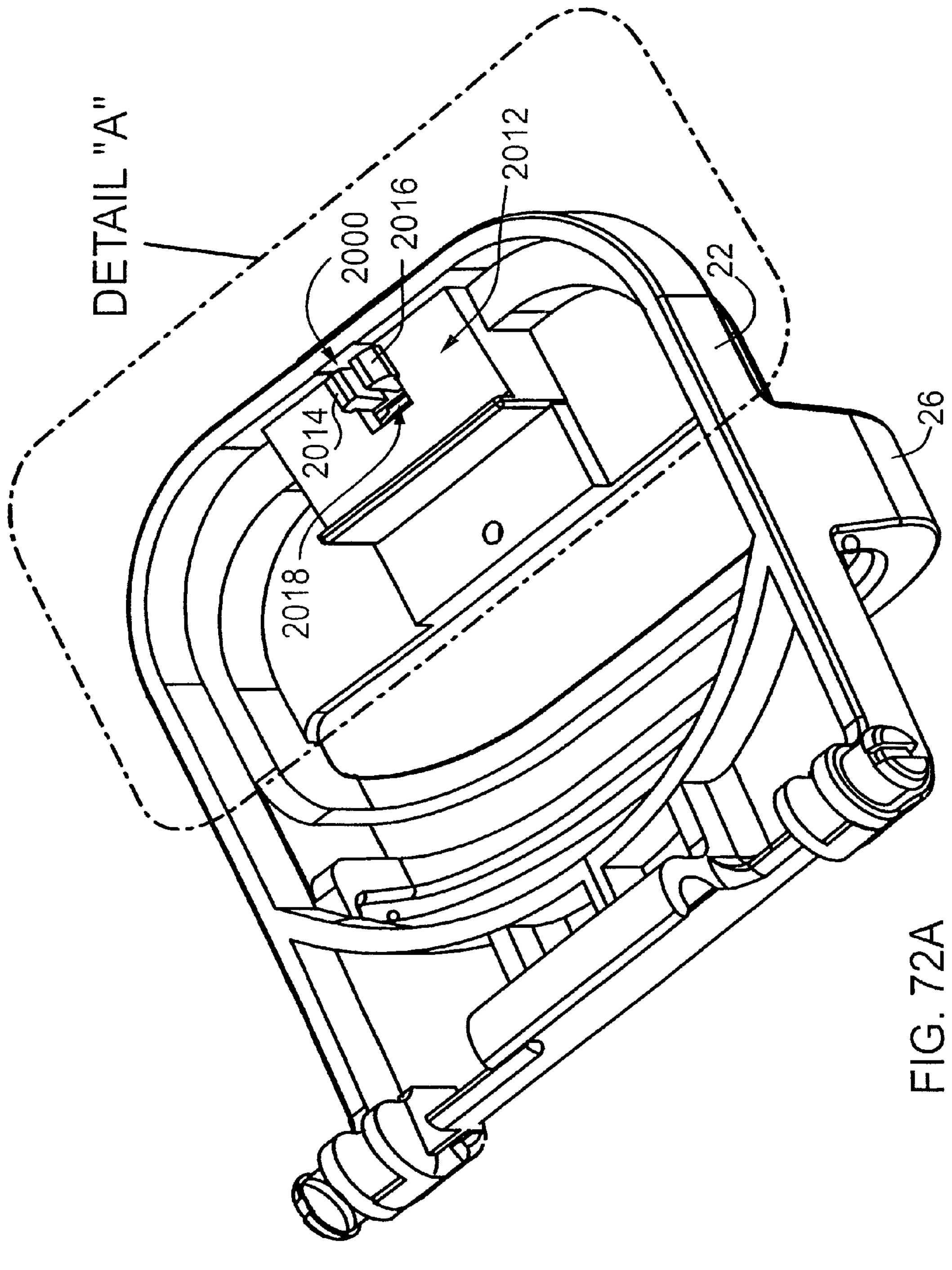
FIG. 72A is another bottom perspective view of the latch and the latch locking mechanism of the container in FIG. 35.
Figure 72B:
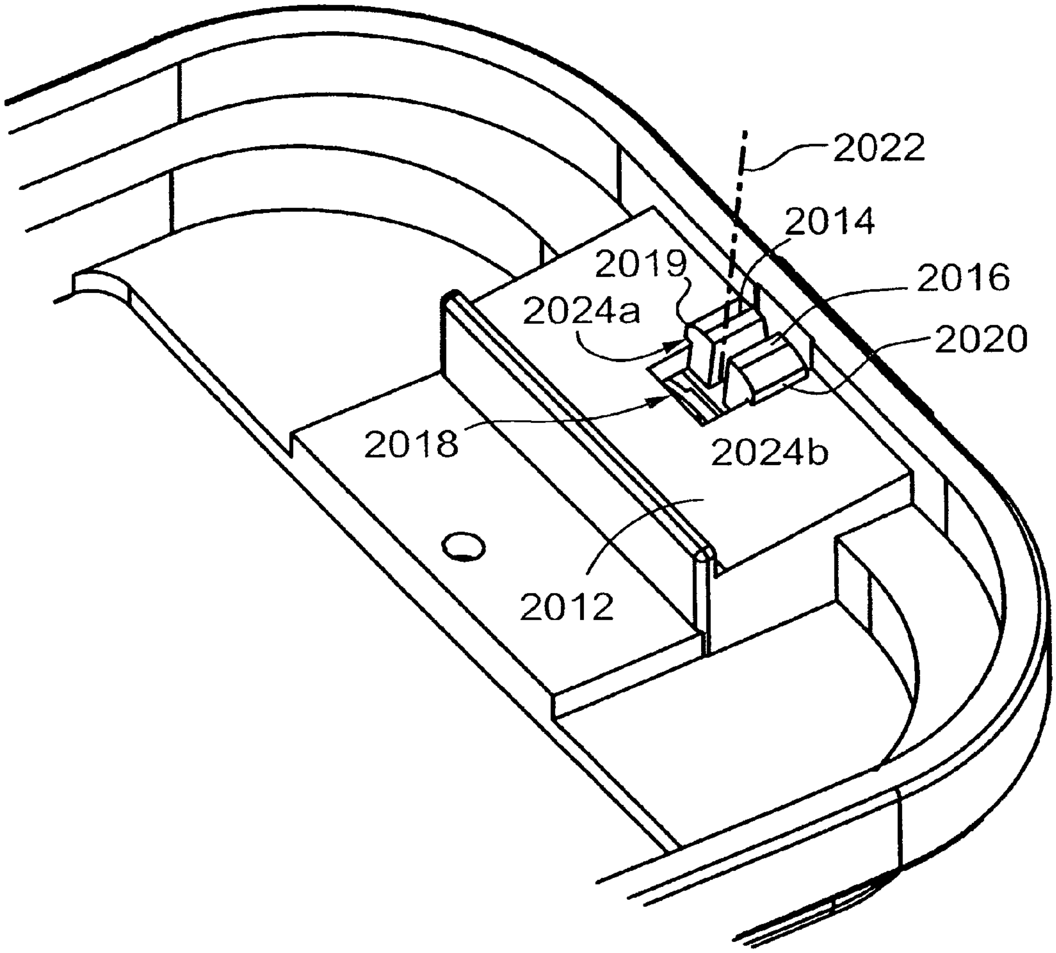
FIG. 72B is an enlarged view of Detail "A" of FIG. 72A.
Figure 73:
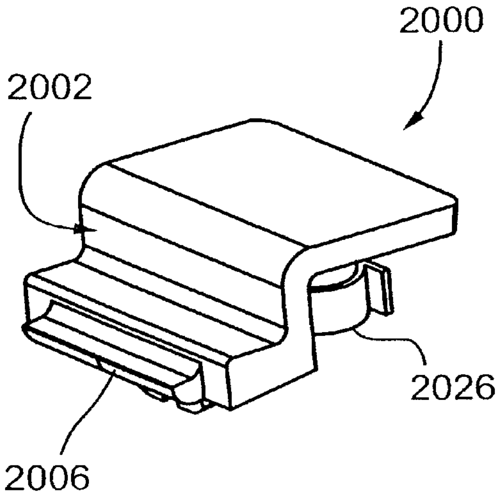
FIG. 73 is a front perspective view of the latch locking mechanism.
Figure 74:
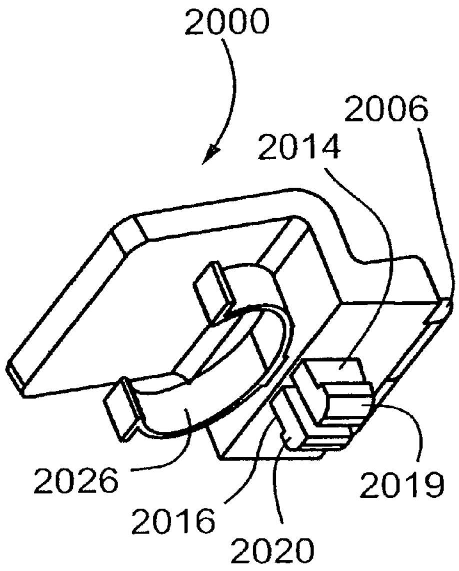
FIG. 74 is a first rear perspective view of the latch locking mechanism.
Figure 75:
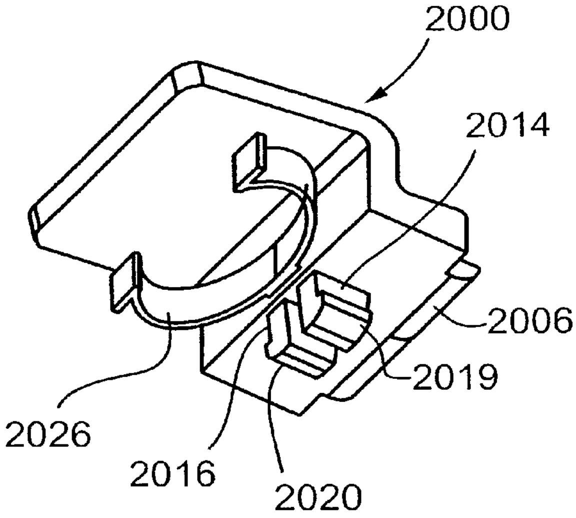
FIG. 75 is a second rear perspective view of the latch locking mechanism.
Figure 76:
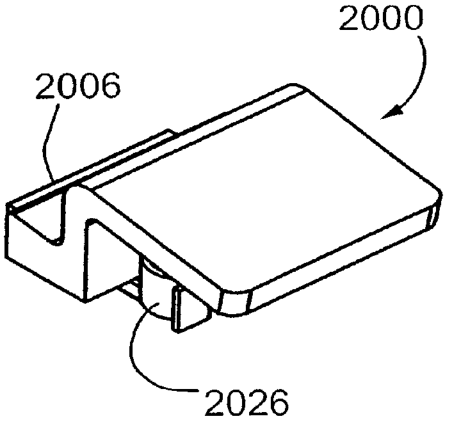
FIG. 76 is a top perspective view of the latch locking mechanism.
Figure 77:
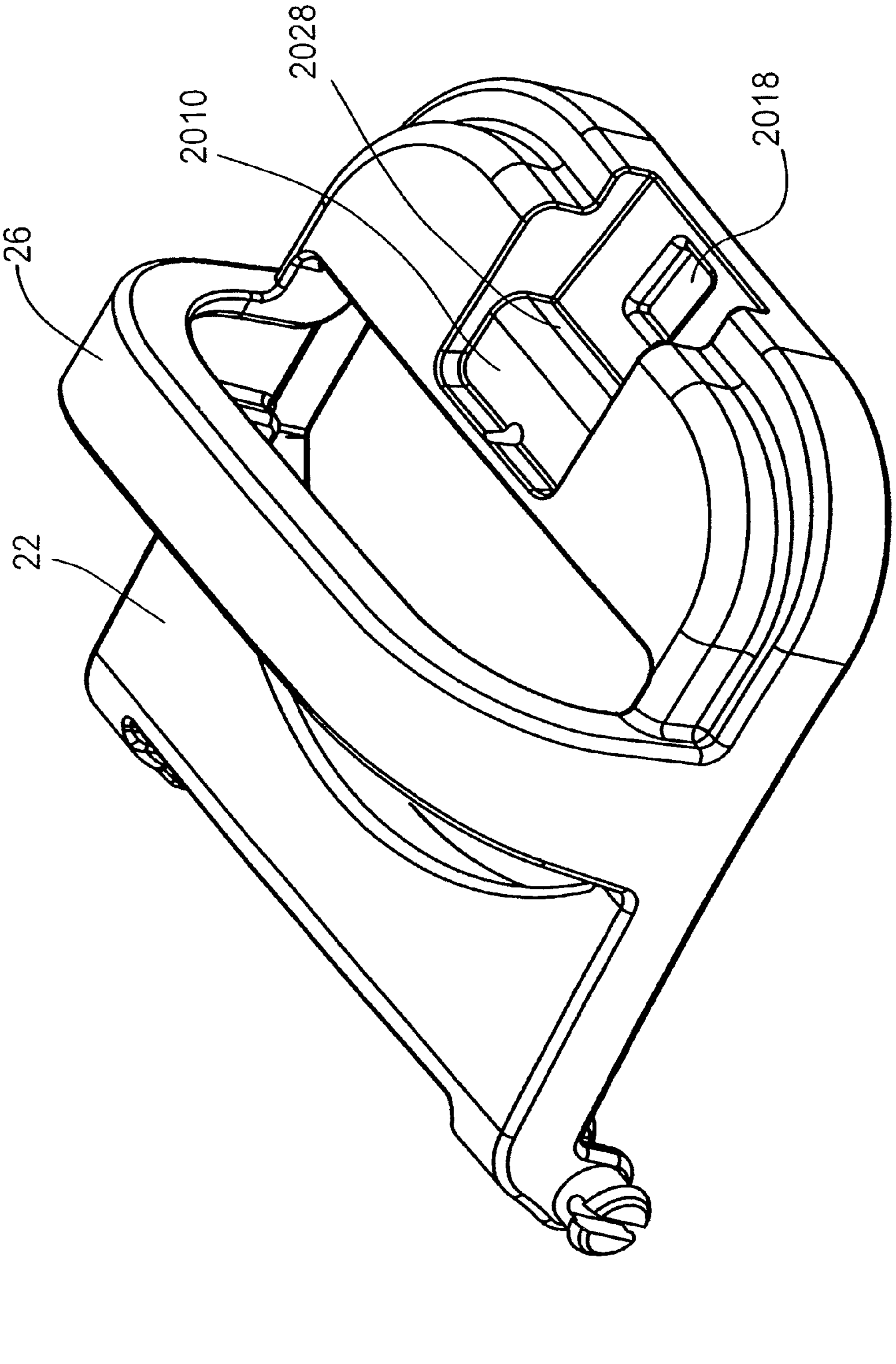
FIG. 77 is a top perspective view of the latch with the latch locking mechanism removed for clarity.

Referring to FIGS. 50, 72A, and 72B, for example, the latch 22 includes a retainer surface 2012, and the latch locking mechanism 2000 includes retainer tabs 2014, 2016, and the retainer surface 2012 co-operates with the retainer tabs 2014, 2106 for retaining the latch locking mechanism 2000 in a coupled relationship with the latch 22.

For example, the latch locking mechanism 2000 is supported by the latch support surface 2010 and includes the retainer tabs 2014, 2016, and the latch 22 includes a latch locking mechanism receiving slot 2018. In this respect, the retainer tabs 2014, 2016 extend through the receiving slot 2018 and the latch 22 co-operates with the retainer tabs 2014, 2016 such that the retainer surface 2012 opposes upwardly movement of the retainer tabs 2014, 2016 relative to the latch 22, and thereby opposes upwardly movement of the latch locking mechanism 2000 relative to the latch 22, and thereby retains the latch locking mechanism 2000 in a coupled relationship with the latch 22. For example, the slot 2018 also functions as guide for facilitating guided movement of the latch locking mechanism between the locked position and the unlocked position.

For example, the retainer tabs 2014, 2016 are a pair of spaced apart retainer tabs 2014, 2016 extending through the slot 2018 (see FIG. 77), and each one of the retainer tabs 2014, 2016 including a respective one of tab projections 2019, 2020 extending orthogonally relative to the axis 2022 of the slot 2019 and being disposed in opposition to the retainer surface 2012 provided on a lower surface 2024 of the latch 22, one tab projection 2019 being opposed by a retainer surface 2012*a* provided on a lower surface portion 2024*a* extending from a side of the slot 2019 opposite to that of a side from which a lower surface portion 2024*b* extends and provides a retainer surface 2012*b* for opposing the other tab projection 2020.

For example, the retainer tabs 2014, 2016 are sufficiently resilient such that, during assembly, the retainer tabs 2014, 2016 are pressed through the slot 2018, causing the retainer tabs 2014, 2016 to approach one another (or, become squeezed together) so as to enable the retainer tabs 2014, 2016 to become fitted through the slot 2018. Once fitted through the slot 2018, the resiliency of the retainer tabs 2014, 2016 forces the retainer tabs 2014, 2016 to move apart relative to one another such that the tab projections 2019, 2020 become disposed in opposition to a respective one of the lower surface portions 2024*a*, 2024*b*.

For example, a biasing element 2026 is provided for acting between latch locking mechanism 2000 and the latch 22 for biasing the latch locking mechanism 2000 towards the locked latch position. For example, the biasing element 2026 is attached to the latch locking mechanism 2000. As a further example, the biasing element 2006 is a thin sheet of arcuate-shaped material, such as a sheet of arcuate-shaped nylon material having a thickness of about 60/1000 of an inch. As a further example, the latch 22 includes a biasing element retainer surface 2028 for exerting a reaction force to oppose force being applied to the biasing element 2026 in a direction which effects movement of the latch locking mechanism 2000 from the locked latch position. When the latch 22 is disposed in the locked lid position and is seated within the cavity 84, and no unlocking force is being applied to the latch locking mechanism 2000, the biasing element 2026 biases the latch locking mechanism 2000 into the locked latch position.

Although the disclosure describes and illustrates various embodiments of the invention, it is to be understood that the invention is not limited to these particular embodiments. Many variations and modifications will now occur to those skilled in the art of headwear. For full definition of the scope of the invention, reference is to be made to the appended claims.

What is claimed is:

1. A refuse container comprising:

a container assembly comprising:

a bin defining a cavity;

a lid rotatably coupled to the bin at a first end, and movable relative to the bin between an open position providing access to the cavity, and a closed position inhibiting access to the cavity;

a pair of opposing brackets integrally formed with the bin and below a second end of the lid opposite the first end of the lid between uppermost and lowermost extremes of the container assembly, each bracket extending outwardly from an external surface of the bin and having opposing inner face portions in laterally spaced relationship such that a space is located between the inner face portions of the brackets;

a pair of receivers located at least partially along is corresponding inner face portion of each bracket and spaced outwardly from the bin relative to the exterior surface of the bin, each receiver comprising an aperture in a portion of the corresponding inner face portion and extending inwardly into a body portion of the bracket located between the corresponding inner face and a corresponding outer face of the bracket such that an interior gap is formed within the body portion of each bracket between the inner face and the outer face of each bracket;

a pair of ribs, each rib located within a corresponding bracket between the inner face portion and the outer face portion of the corresponding bracket and integrally formed with the outer face portion of the corresponding bracket such that each rib extends inwardly relative to the space between the brackets; and a retention bar fixedly coupled to the container assembly by the opposing brackets and completely external to the cavity, the retention bar having opposing ends located within the receivers such that the retention bar spans a length of the space between the inner face portions of the brackets, each end of the retention bar passing through a corresponding aperture and abutting a corresponding rib of the pair of ribs located within the corresponding bracket; and wherein the retention bar is spaced outwardly from the external surface of the bin from which each bracket extends;

wherein the retention bar is substantially horizontally aligned;

wherein the retention bar is in complete fluid isolation from the cavity;

wherein the retention bar is configured to be hooked by a lifting mechanism for automated emptying of the cavity; and wherein the retention bar is rotational within the receivers.

2. The refuse container of claim 1 further comprising:

a locking mechanism for maintaining the lid in the closed position and for providing a visual signal when the lid is in an unlocked condition.

3. The refuse container of claim 2 wherein the locking mechanism comprises:

a detent acting between the lid and the bin; and a latch comprising a handle, and moveable between a locked lid position and the unlocked lid position.

4. The refuse container of claim 3 wherein as the latch is retained in the substantially upright unlocked position, a first visual signal is provided indicating to a refuse collector that the refuse container is laden and a second visual is provided indicating the laden container may be automatically emptied by a refuse collection vehicle having automated refuse container handling equipment without further user interaction with the refuse container.

5. The refuse container of claim 3 wherein the latch is configured to move from the locked lid position to the unlocked lid position in response to application of an unlocking force to the handle; and wherein, when the latch is disposed in the unlocked lid position and the lid is disposed in the closed position, the lid is configured to move from the closed position to the open position in response to an application of a lid-opening force to the handle.

6. The refuse container of claim 5 wherein the unlocking force includes a horizontal component and a vertical component, and wherein the lid-opening force includes a horizontal component and a vertical component, and wherein a direction of the horizontal component of the lid-opening force is substantially opposite to a direction of the horizontal component of the unlocking force.

7. A refuse container comprising:

a container assembly comprising:

a bin defining a cavity;

a lid rotatably coupled to the bin, and movable relative to the bin between an open position providing access to the cavity, and a closed position inhibiting access to the cavity;

a pair of opposing brackets located below the lid between uppermost and lowermost extremes of the container assembly, each bracket extending outwardly relative to an external surface of the bin and in laterally spaced relationship such that a space is located between portions of the brackets, the brackets having opposing inner and outer face portions, the inner and outer face portions being spaced such that body portions of the brackets have an interior gap formed between the inner and outer face portions, the interior gap completely fluidly isolated from the cavity;

a rib located within the interior gaps of each bracket integrally formed with the outer face portion of the corresponding bracket such that each rib extends inwardly relative to the space between the brackets; and a retention bar coupled to each bracket and spanning the space from one bracket to the other bracket wherein opposing ends of the retention bar extend into the interior gap of each bracket, and an exposed portion of the retention bar spans the space between the inner face portions of the brackets, and the end portions of the retention bar abut the ribs; and wherein the retention bar is spaced outwardly from the external surface of the bin from which each bracket extends; and wherein an entire length of the retention bar is completely fluidly isolated from the cavity.

8. The refuse container of claim 7 wherein the lid is rotatably coupled to the bin at a first end, and the brackets are located below a second end of the lid opposite the first end of the lid.

9. The refuse container of claim 8 wherein the retention bar is produced from a material dissimilar to a material from which each bracket is formed.

10. The refuse container of claim 9 further comprising:

a pair of receivers, each receiver associated with a corresponding bracket wherein opposing portions of the retention bar are received by the receivers to retain the retention bar to the refuse container.

11. The refuse container of claim 10 wherein the retention bar is rotational within the receivers.

* * * * *

UNITED STATES PATENT AND TRADEMARK OFFICE

CERTIFICATE OF CORRECTION

PATENT NO. : 8,714,404 B2
APPLICATION NO. : 12/580116
DATED : May 6, 2014
INVENTOR(S) : Narayan Raghunathan et al.

It is certified that error appears in the above-identified patent and that said Letters Patent is hereby corrected as shown below:

In the Claims:

Column 22 (Claim 1), line 45: Delete “is” and insert -- a -- therefor.

Signed and Sealed this
Fourteenth Day of October, 2014

Michelle K. Lee
*Deputy Director of the United States Patent and Trademark Office*